US012791457B2

(12) United States Patent
Kalidindi et al.

(10) Patent No.: US 12,791,457 B2
(45) Date of Patent: Nov. 10, 2026

(54) POWDER BLEND SEGREGATION TESTING APPARATUS AND RELATED METHODS

(71) Applicant: GLOBEPHARMA, INC., Monmouth Junction, NJ (US)

(72) Inventors: Sanyasi R. Kalidindi, Monmouth Junction, NJ (US); Tarun Belwal, Monmouth Junction, NJ (US); Priya P. Vajjhala, Monmouth Junction, NJ (US); Chaitanya V. Kalidindi, Monmouth Junction, NJ (US)

(73) Assignee: GLOBEPHARMA, INC., Monmouth Junction, NJ (US)

( * ) Notice: Subject to any disclaimer, the term of this patent is extended or adjusted under 35 U.S.C. 154(b) by 0 days.

(21) Appl. No.: 19/284,357

(22) Filed: Jul. 29, 2025

(65) Prior Publication Data

US 2026/0092853 A1 Apr. 2, 2026

Related U.S. Application Data

(60) Provisional application No. 63/678,866, filed on Aug. 2, 2024.

(51) Int. Cl.
*G01N 15/00* (2024.01)

(52) U.S. Cl.
CPC ..... *G01N 15/00* (2013.01); *G01N 2015/0019* (2013.01); *G01N 2015/0092* (2013.01); *G01N 2015/0096* (2013.01)

(58) Field of Classification Search
CPC ........... G01N 15/00; G01N 2015/0019; G01N 2015/0092; G01N 2015/0096
See application file for complete search history.

(56) References Cited

U.S. PATENT DOCUMENTS 4,987,784 A 1/1991 Presgrove
5,220,825 A 6/1993 Peterson
(Continued)

FOREIGN PATENT DOCUMENTS

CA 2736942 C 4/2010
CA 2821188 C 7/2017
(Continued)

OTHER PUBLICATIONS

PCT Receiving Office, US Patent and Trademark Office, "International Search Report" and "Written Opinion" issued in PCT/US2025/039720 on Sep. 18, 2025.
(Continued)

*Primary Examiner* — Jacob S. Scott
*Assistant Examiner* — Miraj T. Patel
(74) *Attorney, Agent, or Firm* — Positive Patents LLC; Valerie Neymeyer-Tynkov

(57) ABSTRACT

A powder blend segregation testing apparatus and methods for segregation testing of powder blends, requiring a small sample size, are presented for determination of segregation potential of powder blends under stressed dynamic conditions, offering an invaluable tool to the formulation scientists in the pharmaceutical, food, personal care industries, and any other industry which uses powders, to be able to determine, at formulation development stage, which of their powder blend formulations would resist segregation under stressed dynamic conditions of subsequent commercial scale manufacturing operations, thus meeting the goal of "Quality by Design" approach for manufacturing.

26 Claims, 24 Drawing Sheets

Powder Segregation Tester Assembly Drawing

(56) References Cited

U.S. PATENT DOCUMENTS

| | | | | |
|---|---|---|---|---|
| 5,583,304 | A | 12/1996 | Kalidindi | |
| 6,585,507 | B1 | 7/2003 | Kalidindi | |
| 7,204,164 | B2 | 4/2007 | Kalidindi | |
| 8,235,582 | B2 | 8/2012 | Kalidindi | |
| 8,827,545 | B2 | 9/2014 | Kalidindi | |
| 2011/0000322 | A1 | 1/2011 | Chen | |
| 2015/0020597 | A1 | 1/2015 | Kalidindi | |
| 2016/0370253 | A1 | 12/2016 | Kalidindi | |
| 2017/0010203 | A1* | 1/2017 | Otsuka | B01L 3/502776 |
| 2017/0189877 | A1* | 7/2017 | Abdullah | B01J 8/388 |
| 2019/0145854 | A1 | 5/2019 | Kalidindi | |

FOREIGN PATENT DOCUMENTS

| | | |
|---|---|---|
| DE | 202023002150 | 1/2024 |
| EP | 2703072 B1 | 9/2015 |

OTHER PUBLICATIONS

US Food & Drug Administration, "Warning Letter to Allay Pharmaceuticals" (2021), https://www.fda.gov/inspections-compliance-enforcement-and-criminal-investigations/warning-letters/allay-pharmaceuticals-llc-609023-01272021.

US Food & Drug Administration, "Warning Letter to Aspire Pharmaceuticals" (2022), https://www.fda.gov/inspections-compliance-enforcement-and-criminal-investigations/warning-letters/aspire-pharmaceuticals-inc-630328-11222022.

US Food & Drug Administration, "Warning Letter to Aurolife Pharma" (2020), https://www.fda.gov/inspections-compliance-enforcement-and-criminal-investigations/warning-letters/aurolife-pharma-llc-607087-10162020.

US Food & Drug Administration, "Warning Letter to Izeen Pharma" (2019), https://www.fda.gov/inspections-compliance-enforcement-and-criminal-investigations/warning-letters/izeen-pharma-inc-565311-05162019.

Material Flow Solutions, "The SpecTester" Material Flow Solutions (Gainesville, FL) (2021) https://matflowsol.com/material-flow-solutions-products/spectester.

Deng et al., "An Experimental Study on Free-Surface Rolling Segregation and Correlations with Angle of Repose and Particle Sphericity" Wolfson Centre for Bulk Solids Handling Technology, Univ. Greenwich (Chatham, UK) (2020); https://gala.gre.ac.uk/id/eprint/30093/7/30093%20DENG_An_Experimental_Study_on_Free-Surface_Rolling_Segregation_2020.pdf.

Deng et al., "Correlations Between Segregaton Intensity and Material Properties such as Particle Sizes and Adhesions and Novel Methods for Assessment" (Wolfson Centre for Bulk Solids Handling Technology, Univ. Greenwich (Chatham, UK) (2021).

Jenike&Johanson, "Jenike Fluidization Segregation Tester" Jenike &Johanson (2019); https://jenike.com/services/bulk-material-testing-segregation.

Jenike&Johanson, "Jenike Sifting Segregation Tester" Jenike &Johanson (Tyngsboro, MA) (2019); https://jenike.com/wp-content/uploads/2023/08/SiftingSegregation_brochure_Oct2019.pdf.

Shah et al., "Assessment of Segregation Potential of Powder Blends" Pharmaceutical Development and Technology 12:457-462 (2007); https://pubmed.ncbi.nlm.nih.gov/17963145/.

* cited by examiner

Figure 1: Powder Segregation Tester Assembly Drawing
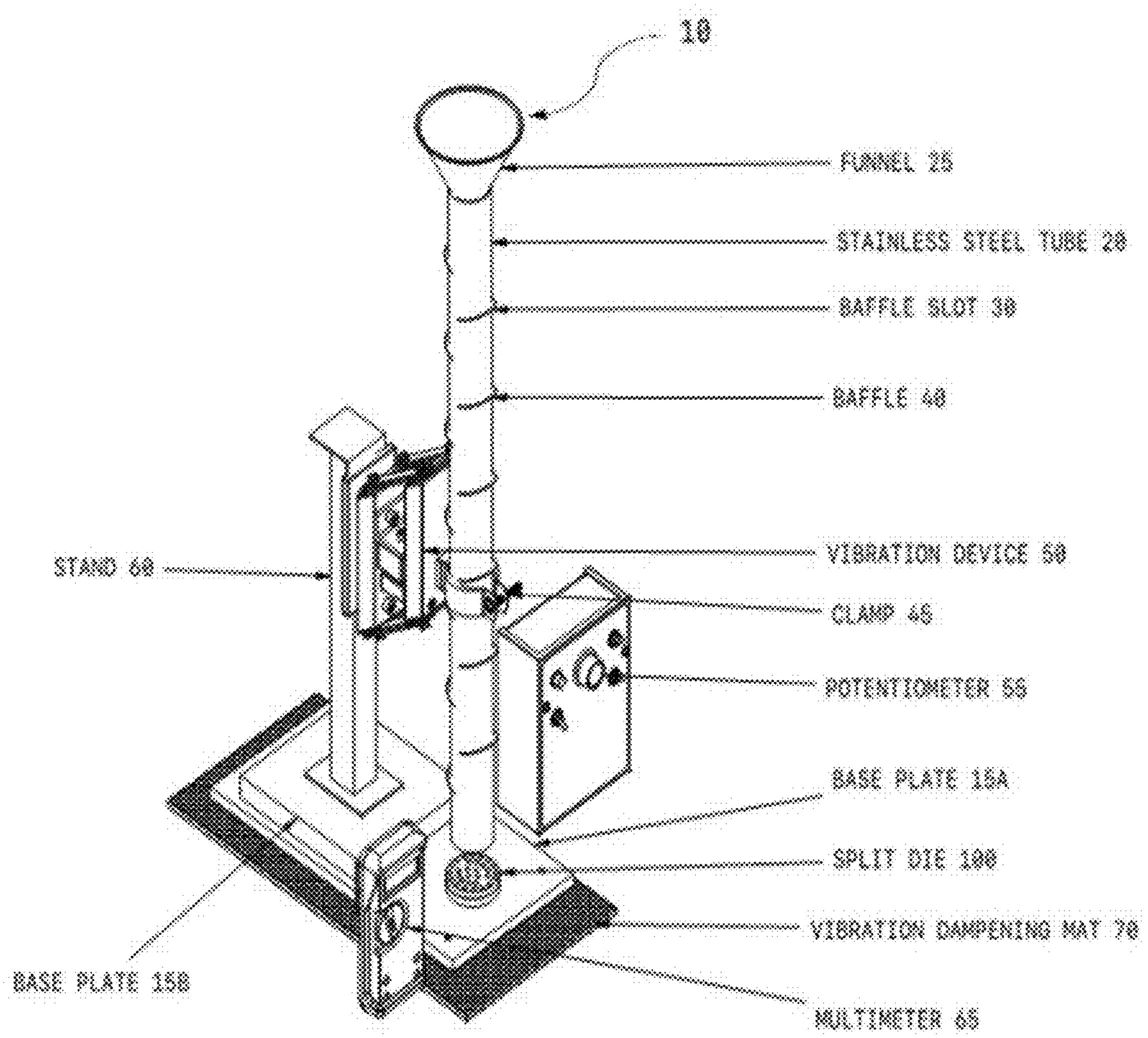

Figure 2: Removable Baffles with Tube
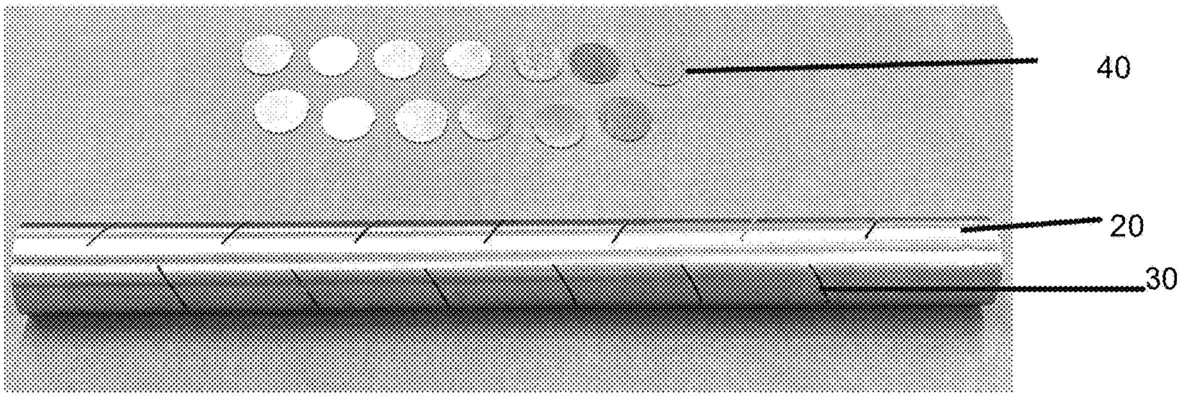
Figure 3: Removable Baffle (40)
Larger diameter: 1.982"
Smaller diameter: 1.837"
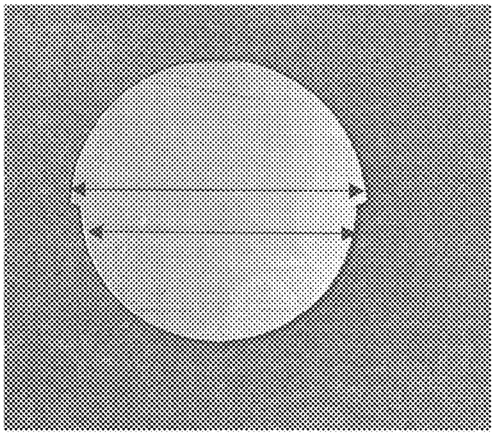

Figure 4A: Powder Segregation Tester Assembly
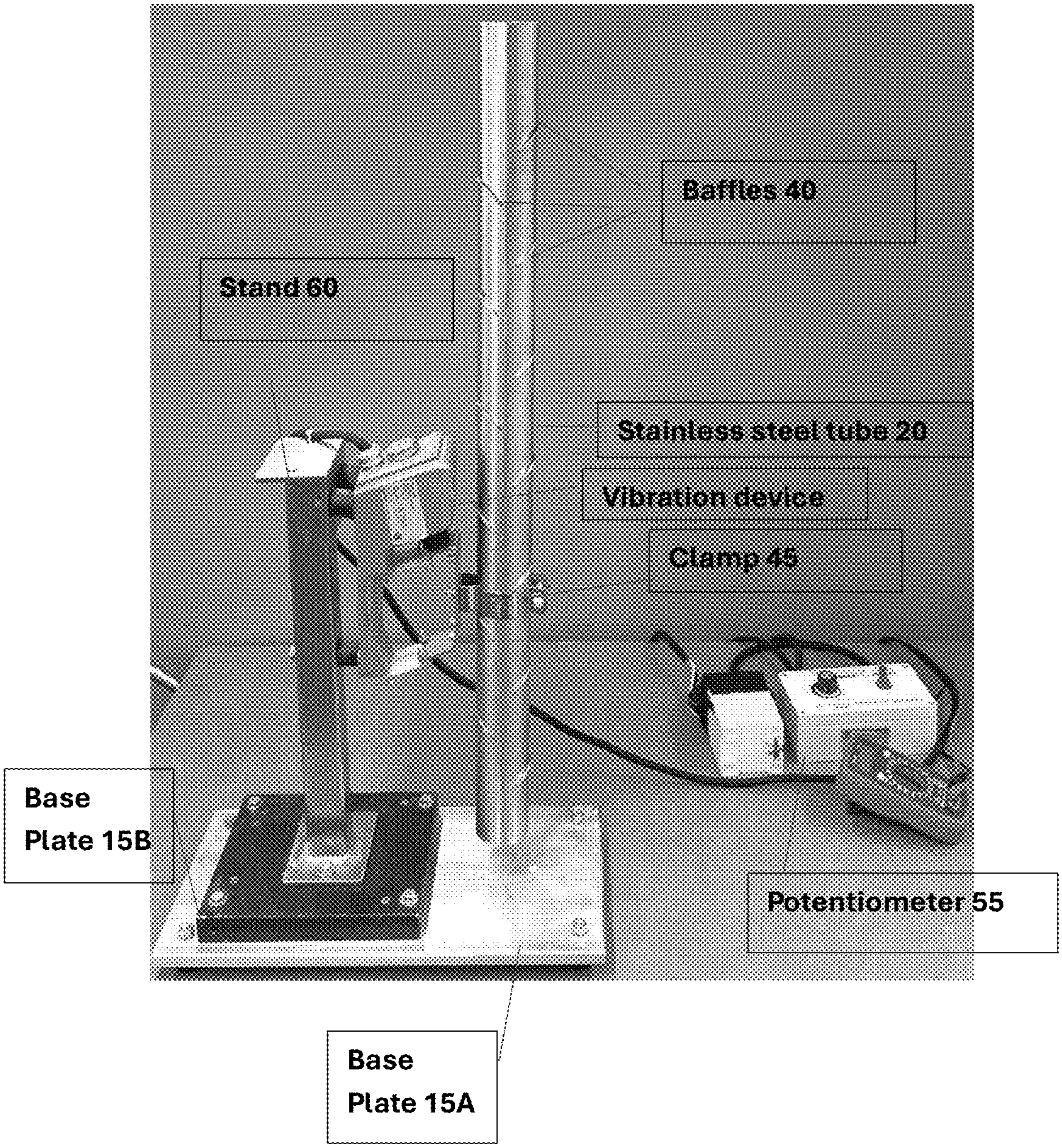

Figure 4B: Manual Tablet Compaction Machine
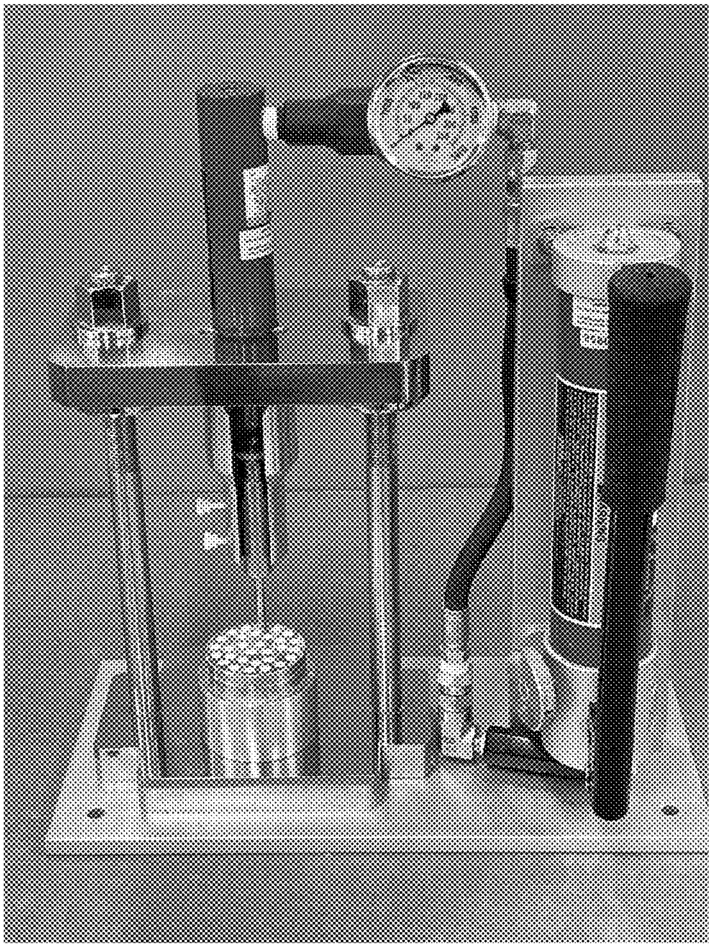

Figure 5: Split Die (Disassembled)
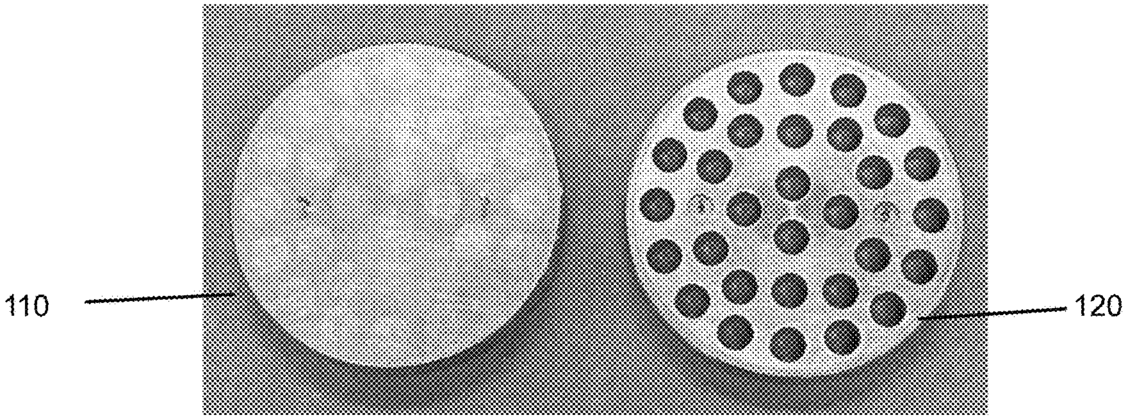
Figure 6: Split Die (Assembled) - 100
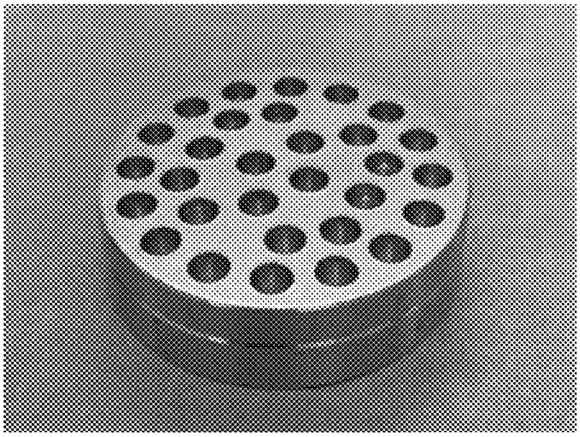
Figure 6A: Photo
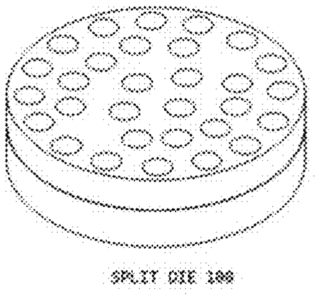
Figure 6B: Drawing Figure 7: Powder Segregation Tester Tube with Baffles Inserted into Slots, Taped and Assembled Split Die Under Tube
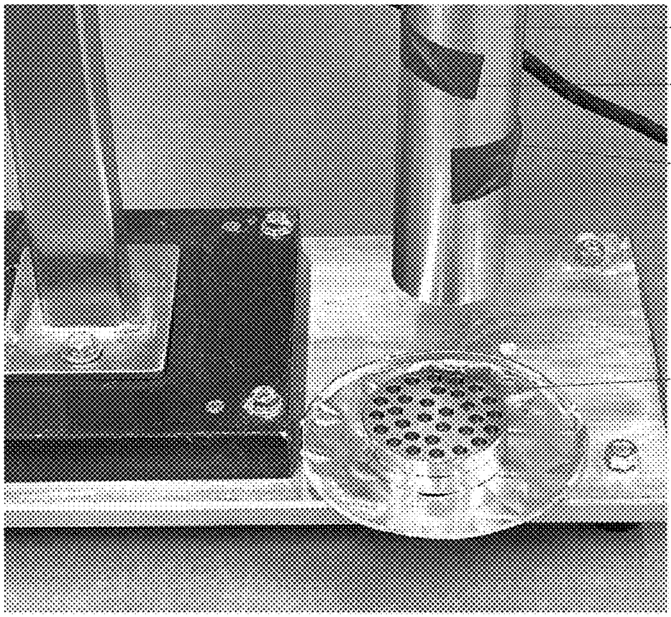
Figure 8: Funnel on the Powder Segregation Tester Tube
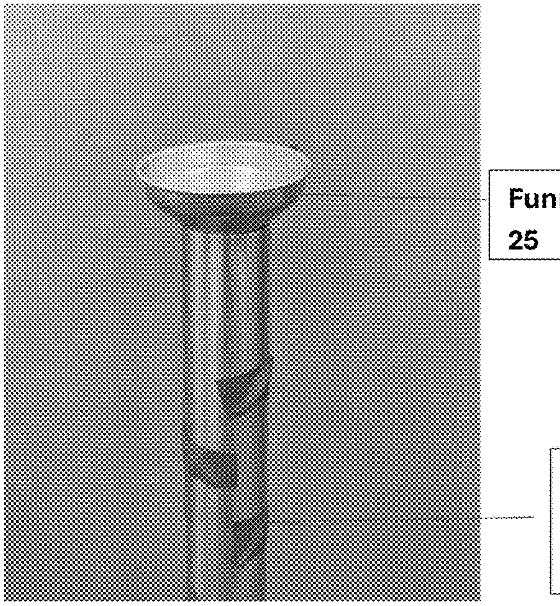

Figure 9: Segregation Tester: Collection and compaction of powder Samples
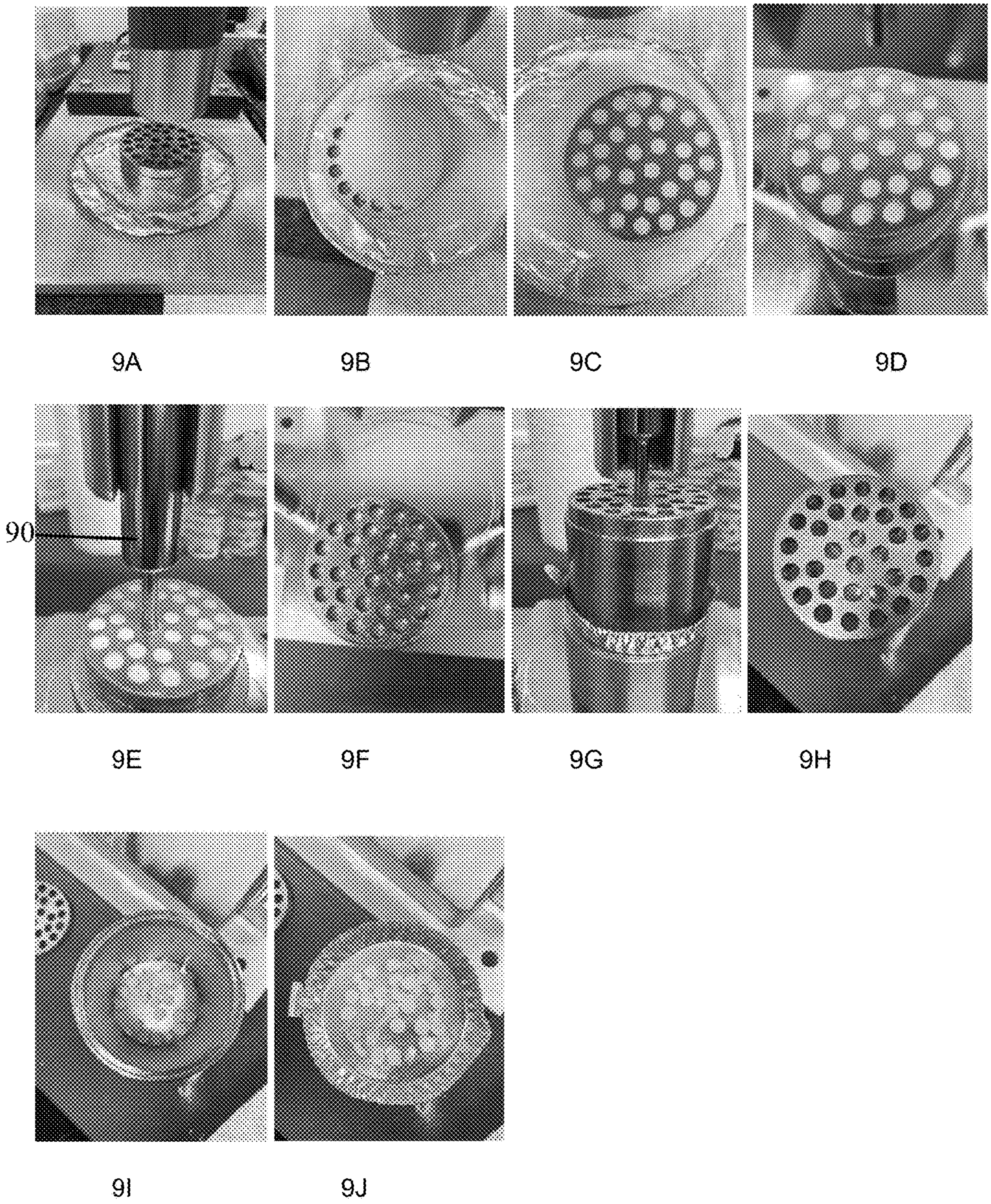

Figure 10: Segregation Tester Tube & Baffle Drawing
FIG. 10B
FIG. 10A
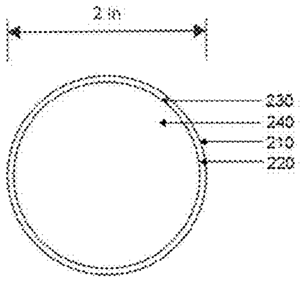
FIG. 10A
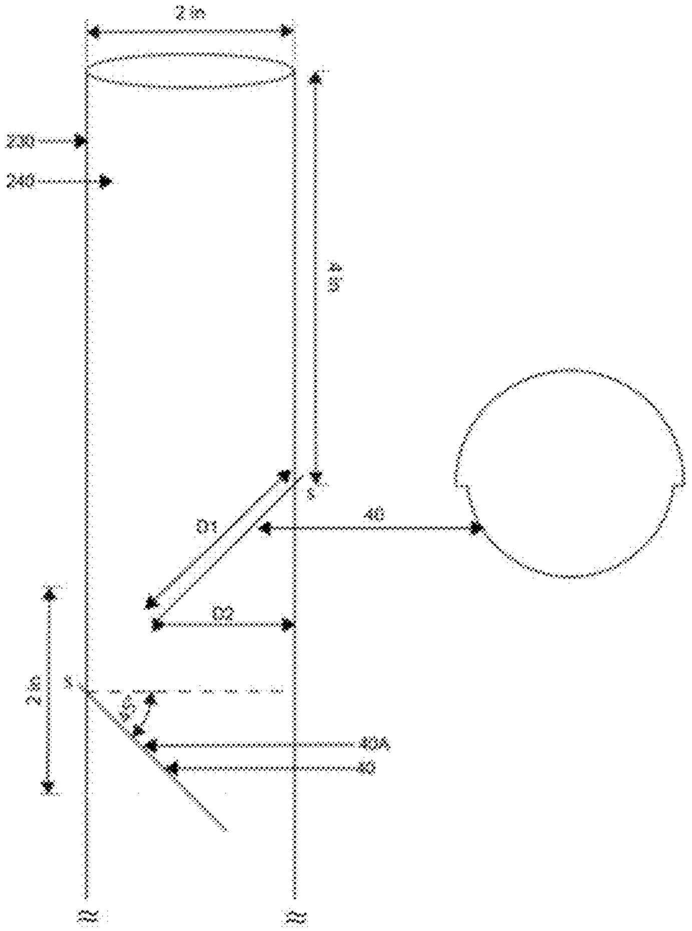
FIG. 10B Figure 11: Acetaminophen Standard Curve
UV Spectrophotometry at 243 nm
X-axis: acetaminophen concentration, µg/ml; Y-axis: absorbance
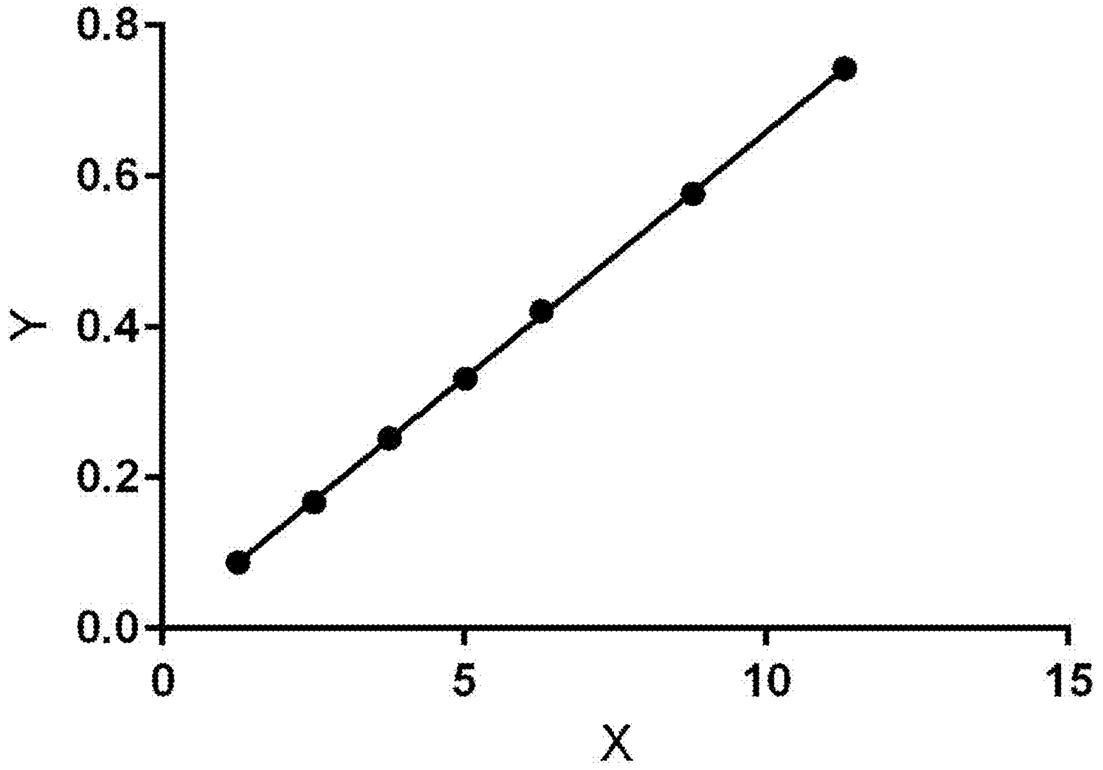

FIG. 12: Lab Blender
Fig. 12 A: Shown with a V-shell attached
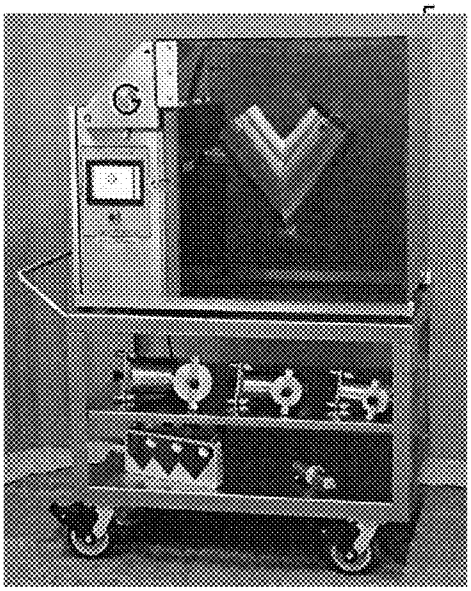
Fig. 12 B: Shown with a bottle blending attachment
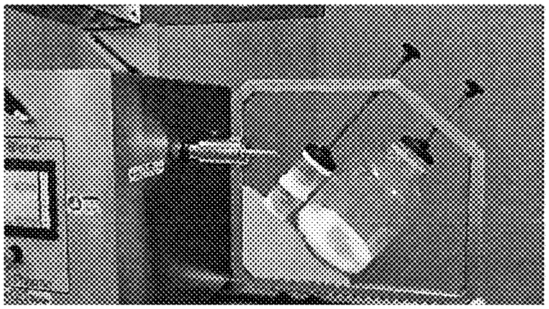
Figure 13: Intensifier Attachments
FIG`. 13 A – SIFT-N-BLEND®
Parts – Screen, Paddle & Mounting Rods
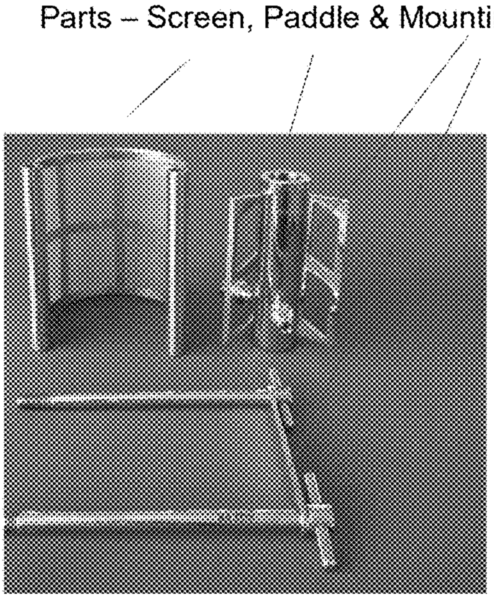
FIG. 13 B - SIFT-N-BLEND®
Assembled
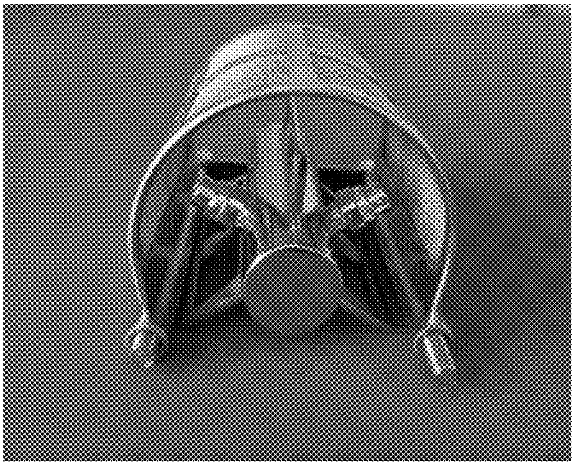

Fig. 13 C – SIFT-N-BLEND® Attachment Mounted on Lab Blender.
Fig. 13 D – High-speed Intensifier bar
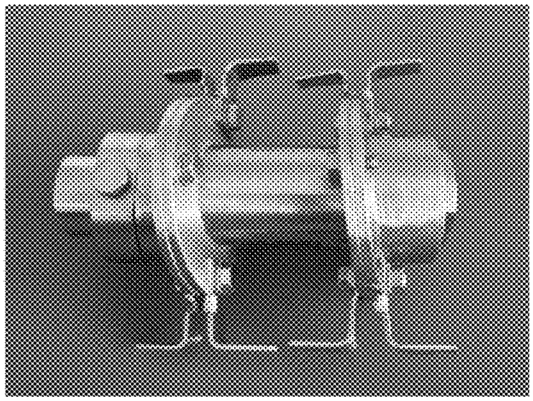
Fig. 13 E: Pin intensifier bar, assembled
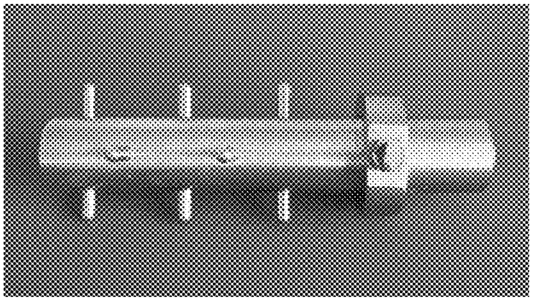

Key: BT: Before Testing; AT: After Testing

| | B | GFOB | GFOB+V20 | GFOB+V30 | GFOB+V40 |
|---|---|---|---|---|---|
| A | 0.61 | 3.08 | 3.08 | 3.86 | 4.63 |
| C | 1.28 | 3.74 | 5.04 | 1.93 | 3.00 |
| E | 1.68 | 4.55 | 6.69 | 4.47 | 6.11 |
| G | 1.69 | 6.00 | 10.50 | 11.34 | 4.45 |
| I | 1.40 | 1.22 | 1.21 | 5.36 | 6.12 |
| J | 1.65 | 1.29 | 5.46 | 3.35 | 3.70 |

Key:

A – MCC:DCP (100:00), C – MCC:DCP (80:20); E – MCC:DCP (60:40); G – MCC:DCP (40:60); I – MCC:DCP (20:80); J – MCC:DCP (00:100)

Key: SNB-LIQ – Wet Blending, SIFT-N-BLEND®; HSI-LIQ – Wet Blending, Higfh-speed I-Bar

POWDER BLEND SEGREGATION TESTING APPARATUS AND RELATED METHODS

CROSS-REFERENCE TO RELATED APPLICATIONS

This application claims the benefit of U.S. Provisional Patent Application No. 63/678,866, filed Aug. 2, 2024, the contents of which are incorporated by reference into the present application in their entirety.

FIELD OF THE INVENTION

The present invention relates to the field of apparatus and methods for testing powder blends for segregation of components, under stressed dynamic conditions, to be able to detect potential segregation problems at the formulation development stage itself so that the formulation can be optimized, before it is scaled up to manufacturing scale, to avoid segregation problems during commercial scale manufacturing, and methods of improving dynamic stability of powder blends.

A powder blend tends to segregate, especially when it is flowing while discharging from a blender, from a hopper to a machine such as a tableting machine or a capsule filling machine, a powder-filling machine, mechanical or pneumatic conveying, etc., and if a blend does not segregate even under such stressed dynamic conditions, it is said to be “dynamically stable.” In other words, such a blend is stable under dynamic conditions.

When a static powder blend is tested for content uniformity, it may pass the content uniformity specifications, but it may fail if tested under stressed dynamic conditions. When only static powder bed content uniformity testing is done, it is often experienced in the industry that such products fail content uniformity specifications under stressed dynamic conditions characteristic of the manufacturing operations.

The present invention offers an apparatus for testing segregation behavior of powder blends under stressed dynamic conditions to detect a potential segregation problem at the formulation development stage so that the formulation can be optimized to avert segregation problems in commercial scale manufacturing, thus helping the “Quality by Design” concept.

BACKGROUND OF THE INVENTION

Many pharmaceutical, food, cosmetic, and chemical products are made by blending powders of different particles sizes and bulk densities that are then compressed into tablets or packaged in unit dose capsules, bottles, pouches, and the like. The content uniformity of the components in the blend, especially any active ingredient, is important. In the pharmaceutical industry, an acceptable level of content uniformity of a drug product in the finished dosage form, Acceptance Value (AV), is set by the United States Pharmacopoeia (USP-NF-2024, <905>), which prescribes the method to determine AV, and the industry follows that specification. However, percentage coefficient of variation (CV, %) or relative standard deviation (RSD, %) of the drug content in the dosage form has also been used with a limit of not more than 6%, but the manufacturer’s internal specification is usually tighter, around 2-3%. CV (RSD) is used in the present invention as a measure of content uniformity so that comparison between different formulations is easier. Content uniformity is crucial when dealing with potent compounds, especially the ones with a low therapeutic index. Although the powder blend may have an acceptable level of content uniformity when the blend is prepared, further processing, e.g., auger feeding, vibration feeding, screw feeding, vacuum transfer, or just gravity flow from a hopper to a machine may cause a degree of segregation of the components, leading to failure of content uniformity specifications of the resulting dosage form, such as tablets or capsules; this is called dynamic instability. For example, if a pharmaceutical powder blend is not uniform in its content of active pharmaceutical ingredient (API), the resulting dosage form may be ineffective if the unit dose content is low, or dangerous if the unit dose content is high. Similarly, if one of the ingredients in a powder drink mix, for example, is an artificial sweetener, drinks made from different pouches of such a mix, in which components are not uniform, will taste differently. Another example is a disintegrant, used in solid pharmaceutical dosage forms (tablets and capsules, for example) typically at a level of 2-4% to help the dosage form disintegrate when it comes in contact with stomach fluids. A disintegrant is a critical component in a solid dosage formulation to ensure proper disintegration and dissolution of the API, and if the disintegrant segregates, some tablets/capsules may fail the dissolution specification. Thus, it is very important that the content uniformity, especially of the active ingredient, in the dosage forms be within the specifications.

Powder blenders used in different industries include ribbon blenders, plough mixers, pony mixers, double-cone mixers, V-blenders, bin-blenders, and the like. Among these blenders, ribbon blenders, plough mixers and pony mixers are stationary with mixing blades or paddles doing the mixing inside, while double-cone mixers, V-blenders and bin blenders are tumbling mixers, which rotate on their horizontal axes, and mixing takes place inside as the powders tumble, dividing and combining the powders in every turn. The tumble blenders are the most commonly used in the pharmaceutical industry because they yield better content uniformity than the stationary blenders. The tumbling blenders are also available with optional intensifier attachments inside the blender vessel, which rotate at high speed, independently of the blender vessel, and help improve content uniformity. Examples of such intensifiers are the high-speed intensifier bars and pin intensifier bars offered by Gemco (Middlesex, NJ, USA) and Patterson-Kelley Industries, which was acquired by Buflovac (Buffalo, NY, USA) and are the most widely used. Another intensifier attachment is SIFT-N-BLEND® (GlobePharma, Monmouth Junction, NJ, USA), which has a semi-tubular screen fixed to the inside trunnion of the tumbling blender vessel, with a paddle independently rotating at high speed inside the screen. The screen turns along with the blender vessel picking up some powder while this powder is pushed by the independently rotating paddle through the screen at every rotation of the blender, improving blend homogeneity by repeated passing of the powder through the screen while blending.

Content uniformity issues in powder blends and tablets/capsules are a common area of concern, as they directly impact the quality, safety, and efficacy of drug products. The U.S. Food and Drug Administration (FDA) issues warning letters to pharmaceutical manufacturers when significant violations of Current Good Manufacturing Practices (GMP) are observed during inspections. For example, FDA cited a manufacturer for failing to ensure that tablets met content uniformity specifications and failing to adequately investigate out of specification (OOS) results, and failing to implement corrective actions to address the root cause of the variability (https://www.fda.gov/inspections-compliance-enforcement-and-criminal-investigations/warning-letters/izeen-pharma-inc-565311-05162019). Another manufacturer was cited by FDA for failing to adequately investigate content uniformity problems in tablets (https://www.fda-.gov/inspections-compliance-enforcement-and-criminal-investigations/warning-letters/aurolife-pharma-llc-607087-10162020). The FDA cited another company for failing to ensure proper blend uniformity during the manufacturing process, which led to content uniformity issues in the final tablets, saying the firm did not adequately investigate or address the root cause of the variability (https://www.fda-.gov/inspections-compliance-enforcement-and-criminal-investigations/warning-letters/aspire-pharmaceuticals-inc-630328-11222022). The FDA sent a warning letter to another company with observations that the company failed to ensure proper content uniformity in tablets due to inadequate control of the blending process (https://www.fda.gov/inspections-compliance-enforcement-and-criminal-investigations/warning-letters/allay-pharmaceuticals-llc-609023-01272021). The above examples of the FDA's warning letters to the manufacturers on content uniformity of powder blends and the resulting dosage forms illustrate the severity of the issue.

Powder blends are usually tested for drug content uniformity by taking unit-dose samples from multiple locations of the powder bed in the blender, while it is stationary, or from drums/bins after discharging the blend, and analyzing for drug content in the powder samples. Such sampling from a static powder bed may not give a true indication of drug content uniformity since the powder blend undergoes stressed dynamic conditions during the subsequent manufacturing steps, such as flowing from hoppers, pneumatic conveying, tableting and encapsulation and powder filling on high-speed machines, etc. The root cause of the content uniformity issues with powder blends and the resulting solid dosage forms is the lack of dynamic stability of the powder blends. Ideally, a powder blend should be formulated to resist segregation and remain dynamically stable under stressed conditions during further handling or processing, subsequent to the blending operation, so that any segregation problem during commercial scale production resulting in the product failing content uniformity specifications and requiring re-work or re-formulation can be averted. Thus, powder blend formulations should be tested for segregation potential, under stressed dynamic conditions, at the formulation development stage itself to determine which formulation most resists segregation and remains dynamically stable and if necessary, can be reformulated. However, at the formulation development stage, R&D batch sizes are too small, and the processing times are typically too short for a segregation problem to be detected, as segregation is a time dependent phenomenon—the longer the powder blend is on the machine the higher the probability of segregation to occur. Thus, a segregation testing apparatus, designed to test powder blends for segregation potential under stressed dynamic conditions, is necessary.

With regard to the preparation of pharmaceutical compositions, when a formulation scientist is assigned to develop a formulation, for example for a new drug substance, the scientist may perform tests with the drug substance to determine bulk density, particle size distribution, melting point, incompatibilities with different excipients, and the like, which are called pre-formulation studies. Based on the information gathered, the scientist will prepare an experimental design to prepare and test multiple formulations, with the active ingredient and different excipients, to determine which formulation would provide the best content uniformity of the active ingredient and other physical properties, such as flowability, compactability, and the like. Content uniformity of a powder blend is tested by usually taking samples from multiple locations of a static powder blend and analyzed for the active ingredient in each sample and Acceptance Value (AV) is calculated as per the method in USP-NF-2024 <905>. If the AV is within the USP specifications, then the formulation is deemed to pass quality control. However, what is more important is that the selected formulation retain its content uniformity during the subsequent operations such as tableting on a high-speed tablet press, filling into capsules on a high-speed capsule filling machine, or while the powder is filled into pouches or jars, where the powder is subjected to gravity flow, vibrational flow or centrifugal flow and machine vibrations (stresses). Another good example to illustrate such a problem is the bottles/jars containing nutritional blends, which are composed of multiple ingredients such as protein powders, vitamins, minerals, sweeteners, and flavors, shipped across the country in trucks, with possibility that there will be segregation of the components due to vibrations and shocks from road transportation by the time they reach their destination. Such formulation concerns are also relevant to powdered blend compositions other than or in addition to pharmaceutical compositions, such as food and beverage powder compositions containing an ingredient such as a sweetener, a coloring agent, a flavoring agent, a vitamin, a mineral, and the like, which are usually present in very low concentrations, and are subject to segregation.

An apparatus and method for testing powder properties is disclosed in U.S. Pat. No. 5,583,304 to the present inventor. The apparatus disclosed is mounted within a three-compartment housing that has a hopper connected to a programmable vibration device to simulate production conditions. There are certain problems with this apparatus, for example: (a) powder segregation does not occur when a static powder bed is subjected to vibration; (b) the flow of the powder from the hopper is impeded because the powder path width reduces from the hopper stem to the funnel die stem; (c) the flow of the powder is also hampered by a butterfly valve in the stem of the hopper; and (d) reproducibility is unreliable because the vibration device is mounted to the wall of the enclosure at a location remote from the hopper.

Another apparatus by the present inventor, disclosed in U.S. Pat. No. 7,204,164, is an improvement over the apparatus of U.S. Pat. No. 5,583,304 by (a) altering the geometry of the hopper stem to improve powder flow; (b) incorporating a new gate system to control the powder flow; (c) providing a technique for taking multiple unit-dose samples of the powder at predetermined intervals during testing; (d) directly linking the vibration device to the hopper for maximum vibration transmission, (e) assuring that the vibration intensity is reproducible; and (f) providing an apparatus for studying segregation potential, testing particle size distribution and flow rates of powders, resulting in a versatile apparatus. The apparatus of U.S. Pat. No. 7,204,164, though much better in design than the apparatus of U.S. Pat. No. 5,583,304, still has several drawbacks, such as sampling with a sampling thief at different time points during testing disturbs the powder bed, different blends flow at different rates from the hopper, some blends may require larger gate opening than others due to larger particle size distribution, and the like; all such problems lead to irreproducible results.

U.S. Patent Publication No. US 2015/0020597 (application Ser. No. 14/328,907), filed by the same inventor, describes a stressed powder segregation apparatus and method that utilizes an ascending spiral channel which is connected to a vibration device. A powder sample is placed at the bottom of the ascending channel and subjected to vibration which causes the powder to travel upwards on the spiral channel. The particles of different components tend to travel at different speeds and segregate along the spiral channel. When the powder exits after traversing the spiral channel, it fills a number of cavities in a split sampling die for compaction into tablets and analysis for content uniformity. Although this apparatus and method is effective with a small sample, such as 10 g, there are two disadvantages: (a) each type of powder or powder blend travels at a different speed on the spiral channel depending on its flow characteristics, bulk density, particle size and particle morphology, which means each type of powder or powder blend is subjected to vibration for different time periods; and (b) the testing time cannot be controlled because one can collect the powder only when it exits the spiral channel thus, intermittent sampling is not possible.

A further apparatus and method for powder blend segregation testing is described in U.S. patent publication No. US 2016/0370253 (application Ser. No. 14/744,649) to the present inventor. This invention involves placing a powder blend sample on a membrane that is vibrated to cause segregation of powder components. The segregated components are transferred to a split die and compressed into tablets for uniformity analysis. It has been determined that this invention, while functionally operational, is limited to segregation simply based on vibration in a horizontal plane. In addition, it was noticed that the powder segregates very fast but it does not remain segregated upon continuation of the test and all of it happens so quickly, it is not possible to get consistent results.

US20190145854A1 teaches a powder blend segregation testing apparatus and method, where powder is moved via vibration down a number of very thin (e.g. 0.076 mm (0.003 inch) thick), semi-rigid membranes mounted in a column, each membrane being at a shallow downward angle from horizontal such as 5 to 30° and extending with alternating angles and close placement across the diameter of the column, with a gap at the lower end of the membranes to allow powder to drop to the next membrane and overall allow testing of segregation of a powder blend. The membranes are each supported on cylindrical segments that are assembled into a column, and the column is mounted in a housing with a vibrator. With the vibrator actuated, the powder blend was supposed to flow down the membranes and fall freely into a collecting cup at the bottom, and tablets are formed of the segregated powder blend and analyzed for component uniformity. This apparatus did not work properly as the powder was not flowing freely and consistently on the vibrating membranes, leading to irreproducible results. In addition, the membranes were too few, too flimsy and mounted too close to each other for the powder to flow enough distance to cause segregation.

None of the above-discussed inventions of the present inventor was ever practical for use because of the drawbacks of each of these inventions. Thus, there is a need for an apparatus for testing the segregation potential of powder blends under stressed dynamic conditions, which does not suffer from the problems discussed earlier, quick and easy with only a small sample needed for testing and will give accurate and reproducible results, while offering flexibility to scientists to be able to change experimental conditions for evaluation of different formulations and select the formulation which shows the least potential for segregation under stressed, dynamic conditions.

Several powder segregation testers have been developed by other companies to assess the segregation tendencies of powders and granular materials, each utilizing different working principles, as described below:

(a) The SPECTester, developed by Material Flow Solutions, Inc., 5921 N County Rd 225 Gainesville, Florida 32609 (https://matflowsol.com/material-flow-solutions-products/spectester), uses vibration to induce powder flow on a tray and spectroscopy is used to analyze segregation patterns in the flowing powder by detecting unique light spectra signatures of the components. However, its application is limited to mixtures of ingredients with distinct spectral signatures and a maximum of six unique components, making it unsuitable for a broader range of powder formulations. In addition, spectral techniques require extensive validation of any formulation change, even a minor one, making such an apparatus unsuitable for formulation optimization, where usually several formulation changes are made. The reliability of spectral techniques for content uniformity determination, especially on low dose products, is also questionable.

(b) The QPM Segregation Tester (https://gala.gre.ac.uk/id/eprint/30093/7/30093%20DENG_An_Experimental_Study_on_Free-Surface_Rolling_Segregation_2020.pdf), developed by Wolfson Centre for Bulk Solids Handling Technology, Faculty of Engineering & Science, University of Greenwich, Central Avenue, Chatham ME4 4 TB, UK, quantifies segregation intensity in heap formations caused by rolling and percolation mechanisms. While scalable for industrial processes, it requires a large sample size (~0.5 liters per test) and is less effective for highly cohesive powders. Such a technique is not suitable for content uniformity determination of pharmaceutical powder blends.

©The Jenike Fluidization Segregation Tester (https://jenike.com/services/bulk-material-testing-segregation), developed by Jenike & Johanson, Inc., 400 Business Park Drive, Tyngsboro, MA 01879, evaluates segregation due to fluidization, where entrained air leads to vertical separation of fine and coarse particles. Fluidization is not representative of what happens when a powder blend flows through hoppers or filling machines and subjected to vibrations.

(d) Similarly, the Jenike Sifting Segregation Tester (https://jenike.com/wp-content/uploads/2023/08/SiftingSegregation_brochure_Oct2019.pdf), developed by Jenike & Johanson, 400 Business Park Drive, Tyngsboro, MA 01879 measures segregation in a powder blend sample flowing by gravity from one hopper into another and testing samples taken at different intervals as the powder flows out of the second hopper. No baffles or vibration is used to provide stressed conditions for segregation segregation and thus cannot predict what will happen in prolonged manufacturing operations. In addition, this test would require large amount of sample to pass through two hoppers.

(e) The Tube Drop Test developed by Shah et al. (https://pubmed.ncbi.nlm.nih.gov/17963145/), is a simple method that assesses fluidization-based segregation by pouring powder through a tube and collecting fractions for analysis. Again, here the powder sample flows down a tube by gravity only and no baffles or vibration are used to stress powder segregation, and thus, cannot predict what will happen in prolonged operations.

In contrast to the purpose of the above discussed powder segregation testers, which is to find segregation behavior of a powder blend, a powder blend segregation tester of the present invention may be used to predict the segregation potential of a powder blend when run for long times on production machines in subsequent manufacturing operations, such as compressing into tablets on a rotary tablet press or filling into capsules on capsule filling machines or filling into pouches or jars on packaging machines. In order to understand the segregation potential of a powder blend, the powder blend has to be subjected to realistic stressed conditions, such as providing baffles in the path of powder flow and optionally subjecting the powder to different levels of vibration during powder flow, so a powder blend may be identified and optionally selected as a blend that will resist segregation even under application of stressed conditions. The powder blend segregation tester of the present invention can achieve this goal, as demonstrated by extensive experimentation, thus helping the "quality by design" approach recommended by the Food and Drug Administration. In addition, the sample size required for testing on the powder blend segregation tester of the present invention is much smaller, about 30 cc for each test, compared to that required by the competitor products described above.

There is a need for an apparatus for testing the segregation potential of a powder blend under stressed conditions, which does not suffer from the problems discussed above, and which will give reliable and reproducible results, enabling a formulator to select the formulation which shows the least potential for segregation under stressed conditions. Also, there is a need for a method for making powder blends which resist segregation and remain dynamically stable, for instance, more efficiently than the methods currently available on the market.

BRIEF SUMMARY OF THE INVENTION

The present invention is directed to a powder blend segregation testing apparatus comprising a tube and 2 or more baffles, said tube comprising a first end, a second end, a wall, and an interior channel, wherein said wall of the tube defines said interior channel and connects said first end of the tube to said second end of the tube; and each baffle comprising a striking surface facing the first end of the tube, wherein said baffle extends from said tube wall into said interior channel and away from said first end of the tube at a baffle angle of about 130° to about 160° (that is, about 40° to about 70° below horizontal when the tube is positioned vertically); and wherein 2 or more baffles are positioned along the length of the interior channel in succession in a cascade formation. As indicated above, the baffles extend downward partially into the interior channel of the tube, at an angle and arrangement to allow flow of the powder by gravity, in a cascading manner from one baffle to the one on the opposite side and ultimately exiting the tube on to a sample collecting split die with multiple cavities, designed for unit-dose sampling. The baffles may be permanently positioned in the testing apparatus or may be removable. In an embodiment, the testing apparatus baffles are separate from each other, for instance, in a kit, packaged together or independently.

The present invention is also directed to design of a powder blend segregation testing apparatus, which subjects the powder to flow either under vertical gravity flow over the baffles or under vertical gravity flow over baffles combined with stressed conditions, such as different levels of vibration, vacuum conveying, and/or the like, to evaluate the segregation potential of the powder blend.

The present invention is also directed to helping the formulation scientist to detect a potential segregation problem at the formulation development stage itself so that the formulation may be optimized to minimize or eliminate the segregation problem in commercial scale manufacturing.

Thus, in an embodiment, or in jurisdictions where appropriate, an objective of the present invention is or may be to offer an apparatus and methods for testing the segregation potential of powder blends under stressed conditions, which does not suffer from the problems discussed earlier with previous inventions, and will give reliable and reproducible results, enabling the formulator to select the formulation which shows the least potential for segregation under stressed conditions.

Another embodiment and/or objective of the present invention is to offer a solution to make a powder blend which resists segregation and remains dynamically stable more efficiently than the methods currently available in the market.

In addition, the present invention is directed to a powder blend segregation testing apparatus baffle, for instance as shown and discussed throughout this application. A baffle is rigid and impermeable to a powder blend and comprises a striking surface. Also, a baffle may be sized for insertion into a baffle slot of the wall of the tube of a powder blend segregation testing apparatus.

In addition, the present invention is directed to a method of testing a powder blend for segregation of a powder blend component and/or segregation potential of the powder blend comprising the steps of: (a) providing a powder blend comprising at least two components; (b) introducing the powder blend into the first end of the tube of the powder blend segregation testing apparatus to allow flow of the powder blend through the tube interior channel and across 2 or more baffles positioned in the tube interior channel in succession in a cascade formation; and (c) determining the segregation of a powder blend component from the powder blend and/or the segregation potential of the powder blend.

BRIEF DESCRIPTION OF THE DRAWINGS AND PHOTOGRAPHS

FIG. 1 is an illustration showing a perspective view of a powder blend segregation testing apparatus 10 of this invention. The apparatus 10 may be used for instance to determine the segregation potential of a powder blend. The apparatus 10 comprises a 30" long tube 20 (for instance, made of stainless steel) having a 2" outer diameter with a wall thickness of 1/16". The baffle slots 30 provide a 45 degree baffle angle. The tube includes 13 baffle slots 30 starting at 4" from the top, on alternative sides of the tube 20, with 2" distance between the slots 30. Each baffle slot 30 accommodates a removable stainless steel baffle 40. The tube is fixedly attached to an electromagnetic vibration device 50 by means of a clamp 45, whose amplitude of vibration is controlled by a potentiometer 55. The vibration device 50 is mounted on a vertical stand 60 with solid steel base 15B, which is fixed to another base plate 15A, made of aluminum, which is placed on a vibration dampening rubber mat 70. A multi-meter 65 may be used to set the level of vibration instead of the potentiometer 55.

FIG. 2 is a photograph showing a stainless steel tube 20 with baffle slots 30 cut into the tube to form a 45-degree baffle angle, and 13 removable baffles 40. The baffles have a visibly larger (e.g. wider) end and a smaller end to aid in placement of the baffles in the tube baffle slots. The smaller end of the baffle is inserted into a baffle slot and extends into the interior channel of the tube. The large end of the baffle forms an angled notch and helps to hold the baffle in place.

FIG. 3 is a photograph showing a close-up view of a removable baffle 40. The part of the baffle which goes inside the tube has a diameter of 1.837" and the part of the baffle that stays outside of the tube has a diameter of 1.982". These dimensions are for a tube with an outside diameter of 2.0" and wall thickness of 0.049", and the baffle dimensions will change if the tube diameter and the wall thickness change.

FIG. 4A is a photograph showing a side view of a powder blend segregation testing apparatus 10 of this invention with the removable baffles 40 inserted into the baffle slots 30 on the tube 20, which may be wrapped in tape (tape may be used for instance as a temporary measure, as shown in FIGS. 7 and 8) to prevent the baffles 40 from rattling and the powder from leaking through the baffle slots when the tube 20 is subjected to vibration with the vibration device 50.

Instead of the blue tape to wrap the baffles 40, saran wrap, clear plastic tape, custom covers, Velcro® tape, or a plastic sleeve on the entire external body of the tube except where the tube is attached to the vibration device, may be used.

FIG. 4B shows a manual tablet compaction machine 90 to compress the powder samples collected into a multiple cavity split die 100 into tablets and then for ejecting the tablets from the die. The baffles 40, when inserted into the slots 30, block the tube 20 partially, allowing the powder blend to cascade down the baffles and exit at the end of the tube where it is collected into the multiple cavity split die 100.

FIG. 5 is a photograph showing the bottom part 110 and the top part 120 of the split die, illustrated in FIG. 1. The bottom part 110 is solid while the top part 120 has cavities. The bottom part 100 has two pins which fit snugly into two silicone bushings on the bottom side of the top part 120 to form the assembled split die 100, shown in FIG. 6.

FIG. 6A is a photograph and FIG. 6B is a drawing showing an assembled split die 100. The two parts (bottom 110, top 120) of the split die 100 snap together to form the functional die.

FIG. 7 is a photograph showing the lower part of the powder segregation tester tube 20, with the baffles 40 inserted into the slots 30 and the assembled split die 100 placed underneath the bottom end of the tube.

FIG. 8 is a photograph showing the top end of the tube 20 with a funnel 25. The funnel aids the introduction of a powder blend into tube 20. Funnel 25 is optional.

FIG. 9 is a series of photographs showing steps for collecting samples and preparing tablets according to the present invention. Reading from left to right: FIG. 9A shows a split die (also shown e.g. in FIGS. 1, 5-7) placed under the bottom end of a tube 20 of the present invention, ready for sample collection; FIG. 9B shows a split die with powder sample collected on top of the assembled die 100 after the segregation test was conducted. FIG. 9C shows the assembled split die with the powder sample scraped evenly across its surface. FIG. 9D shows powder samples ready for compression. FIG. 9E shows a powder sample being compressed by a tablet compaction machine 90; FIG. 9F shows the split die after all samples have been compressed; FIG. 9G shows ejection of tablets from the die using the tablet compaction machine 90; FIG. 9H shows the split die after all the tablets have been ejected; FIG. 9I shows tablets in an aluminum dish under an ejection cup; and FIG. 9J shows tablets in an aluminum dish ready for content uniformity testing.

FIG. 10A is an illustration of a horizontal cross-section of a tube of this invention (not shown at scale), showing the exterior surface 210 of the wall of the tube, wall 220 of the tube, interior surface 230 of the wall of the tube, and interior channel 240. The thickness of the wall is represented by the distance between 210 and 230, which is 0.049" in this illustration, the outer diameter of the tube is represented by the diameter of the outer circle (exterior wall surface 210), which is 2.0" in this illustration, and the diameter of the tube interior channel is represented by the diameter of the inner circle (interior surface wall 230), which is 1.951".

FIG. 10B is an illustration of a vertical cross-section of the interior channel of a tube of this invention, showing the interior surface 230 of the wall of the tube and the interior channel 240. Two baffle slots are visualized in a side perspective view as point "S" at their intersection with the interior surface wall 230 of the tube. A side view of two baffles 40 (one in each slot S) is shown in a zig zag arrangement, each baffle having a length D1 extending from the baffle slot (point S) into the interior channel 240 of the tube, each baffle oriented about 45 degrees downward from horizontal (baffle angle 40A), extending from the baffle slot (point S) into the interior channel 240 in a downward, declining position, with the end of the baffles measuring a horizontal distance D2 from the interior surface 230 into the interior channel, where D2 is greater than 50% of the diameter of the interior channel (e.g. >1 inch for a tube with a 2" outer diameter). In an embodiment, D2 is 50-75% or e.g. 50% to up to 80% of the channel diameter. The two baffle slots (shown as points S) are oriented 180 degrees from each other as shown by their positioning on opposing sides of the interior wall surface 230, with one baffle slot(S) positioned 2" above the other baffle slot(S). Pictured to the side is a top perspective view of a baffle of the present invention, showing the larger and smaller portions of a baffle.

FIG. 11 is a graph showing a standard curve for acetaminophen, used as a model drug, where X is the concentration of acetaminophen in solution (ug/ml), and Y is absorbance of the solution as measured on a UV spectrophotometer at wavelength 243 nm.

FIG. 12A is photo of a MaxiBlend® lab blender with a V-shell mounted. Vessels of different shapes (V-shell, Bin shell or Double cone shell) and different sizes (4, 8 and 16 quart), as well as a bottle blending attachment, may be used interchangeably on this blender. This lab blender has a provision for an intensifier drive, which allows an intensifier to be mounted inside the blender shell. The blender shell turns at 25 rpm, while the intensifier turns independently of the blender shell at variable speed of up to 2500 rpm. The intensifier helps improve the homogeneity of the powder blend.

FIG. 12B is a bottle blending attachment shown attached to the lab blender. The bottle blending attachment allows blending of powders in bottles by mimicking the action of a V-shell blending. Small amounts of powders may be blended in bottles. However, bottle blending does not allow the use of intensifier attachment. When bottled blending has to be used, the powders are blender for a few minutes first, taken out, passed through a sieve manually and re-blended for a few additional minutes to assure blend homogeneity.

FIGS. 13A, 13B and 13C are photos of the SIFT-N-BLEND® intensifier attachment, in parts, assembled and mounted in a V-shell, respectively. This attachment was granted patents to the present inventor (U.S. Pat. Nos. 8,235,582; 8,827,545; CA 2736942C; CA 2821188C and EP2703072B1). This attachment consists of a screen, either made of wire mesh or a perforated stainless steel sheet, a pair of mounting rods, and a paddle. This assembly is mounted inside the blending vessel on the hub of the shell; thus, it turns at the same speed as the shell, with the paddle independently turning at a variable speed of up to 2500 rpm), and as it turns, some powder enters the screen, and the paddle inside the screen breaks any lumps in the materials. Thus, this attachment helps eliminate the need for pre-screening of the powder ingredients to break lumps before loading into the blender. With this attachment, both the screen as well as the paddle are available in segments which can be joined inside the blender, thus making mounting, disassembly and cleaning on commercial scale blenders easier than with a high-speed intensifier bar or a pin intensifier bar described below.

FIG. 13D is a photo of the high-speed intensifier bar attachment. This attachment consists of a shaft with round plates mounted at an angle and knife blades. As it turns inside the blender vessel, at a variable speed of up to 2500 rpm, independent of the blender vessel, the angled plates move the powders and the knife blades break any lumps. This attachment suffers from two disadvantages-heavy weight as a result of single-piece construction, and has too many parts, making it difficult to mount inside the blender vessel, dismount and clean, especially with large volume commercial scale blenders.

FIG. 13E is a photo of the pin intensifier bar attachment. This attachment consists of a shaft with round, straight pins. As it turns inside the blender vessel, at a variable speed of up to 2500 rpm, independent of the blender vessel speed, the round pins break any lumps. This attachment also suffers from the same disadvantages as the high-speed intensifier bar (FIG. 13D)—heavy weight as a result of single-piece construction, making it difficult to mount inside the blender vessel, dismount and clean, especially with large volume commercial scale blenders.

The three intensifier attachments described above are commercially available.

FIGS. 14 and 15 show graphs of experiments in which the proof-of-concept of the powder blend segregation tester of the present invention was studies using two different doses of acetaminophen as the model drug (4 mg and 0.5 mg respectively) using combinations of microcrystalline cellulose and dicalcium phosphate dihydrate in different proportions as fillers.

FIG. 14 is a graph showing content uniformity of acetaminophen in powder blends including 4 mg of acetaminophen per dose. The powder blends were prepared by bottle blending the formulations described in Tables 1-6, in the lab blender shown in FIGS. 12A and 12B as per the procedure described in Table 7. Fillers, microcrystalline cellulose (MCC) and dicalcium phosphate dihydrate (DCP) were used in the powder blends in a MCC-DCP filler mix having different proportions (0 to 100%). The content uniformity of acetaminophen in the powder blends was tested before segregation testing (BT) and after segregation testing (AT) using gravity flow over baffles (GFOB) method in a powder blend segregation testing apparatus of the present invention having a 30" long tube.

FIG. 15 is a graph showing content uniformity of acetaminophen in powder blends, having 0.5 mg of micronized acetaminophen per dose, after gravity flow of the powder blends over baffles of a powder blend segregation testing apparatus of this invention, optionally with vibration also added to the apparatus tube and baffles. Powder blends were prepared by dry blending formulations A, C, E, G, I, and J described in Tables 9-14, using the lab blender shown in FIG. 12A with a SIFT-N-BLEND® intensifier attachment as shown in FIGS. 13A-13C. Microcrystalline cellulose (MCC) and dicalcium phosphate dihydrate (DCP) were included in the powder blends in different proportions and subjected to segregation testing in a powder blend segregation testing apparatus of the present invention, under conditions of gravity flow over baffles alone, as well as stressed conditions combining testing the powdered blends with gravity flow over baffles in combination with vibration.

Formulation A included a proportion of MCC:DCP of 100% MCC: 0% DCP; Formulation C included a MCC:DCP proportion of 80%: 20% (80:20), Formulation E included a MCC:DCP proportion of 60:40, Formulation G included a MCC:DCP proportion of 40:60, Formulation I included a MCC:DCP proportion of 20:80, and), Formulation E included a MCC:DCP proportion of 0:100. Procedure for blending is presented in Table 15.

In FIGS. 16-27 below, only microcrystalline cellulose was used as the filler, and the effect of other parameters, such as the dose of acetaminophen (, dry blending technique vs wet blending technique, type of intensifier attachment-SIFT-N-BLEND® (SNB), high-speed intensifier bar (HSI) or pin intensifier bar (PIN), speed of the intensifier (1500, 1000 and 500 rpm), length of the segregation tester tube and particle size of acetaminophen powder, on the segregation behavior of the powder blends were studied in different experiments.

FIG. 16 is a graph showing average content uniformity of acetaminophen in powder blends including 0.5 mg of acetaminophen per dose. Powdered blends were prepared by different dry blending techniques, specifically, with a SIFT-N-BLEND® intensifier attachment (FIG. 13A-13C) ("SNB-DRY"), with a High-Speed I-Bar intensifier attachment (FIG. 13D) ("HSI-DRY"), or with a PIN I-Bar intensifier attachment (FIG. 13E) ("PIN-DRY"). Only microcrystalline cellulose (MCC) was used as a filler binder. The lab blender was engaged at 1500 rpm speed. Powder blends were subjected to segregation testing in a powder blend segregation testing apparatus of the present invention having a 30" long tube. Statistical significance is indicated by different letters, highlighting differences in means at $p<0.05$ (*), $p<0.01$ (), and $p<0.001$ (*).

FIG. 17 is a graph showing average content uniformity of acetaminophen in powder blends including 0.5 mg of acetaminophen per dose. Powdered blends were prepared by different dry blending techniques, specifically, with a SIFT-N-BLEND® intensifier attachment (FIG. 13A-13C) ("SNB-DRY"), or with a High-Speed I-Bar intensifier attachment (see FIG. 13D) ("HSI-DRY"). Only microcrystalline cellulose was used as a filler binder. The lab blender was engaged at 1000 rpm speed. Powder blends were subjected to segregation testing in a powder blend segregation testing apparatus of the present invention having a 30" long tube.

FIG. 18 is a graph showing average content uniformity of acetaminophen in powder blends including 0.5 mg of acetaminophen per dose. Powdered blends were prepared by different dry blending techniques, specifically, with a SIFT-N-BLEND® intensifier attachment (FIG. 13A-13C) ("SNB-DRY"), or with a High-Speed I-Bar intensifier attachment (FIG. 13D) ("HSI-DRY"). Only microcrystalline cellulose was used as a filler binder. The lab blender was engaged at 500 rpm speed. Powder blends were subjected to segregation testing in a powder blend segregation testing apparatus of the present invention having a 30" long tube. Statistical significance is indicated by different letters, highlighting differences in means at $p<0.05$ (*).

FIG. 19 is a graph showing average content uniformity of acetaminophen in powder blends including 0.5 mg of acetaminophen per dose. Powdered blends were prepared by different dry blending techniques, specifically, with a SIFT-N-BLEND® intensifier attachment (FIG. 13A-13C) ("SNB-DRY"), with a High-Speed I-Bar intensifier attachment (FIG. 13D) ("HSI-DRY"), or with a PIN I-Bar intensifier attachment (FIG. 13E) ("PIN-DRY"). Only microcrystalline cellulose was used as a filler binder. The lab blender was engaged at 1500 rpm speed. Powder blends were subjected to segregation testing in a powder blend segregation testing apparatus of the present invention having a 10" long tube.

Figure 23:
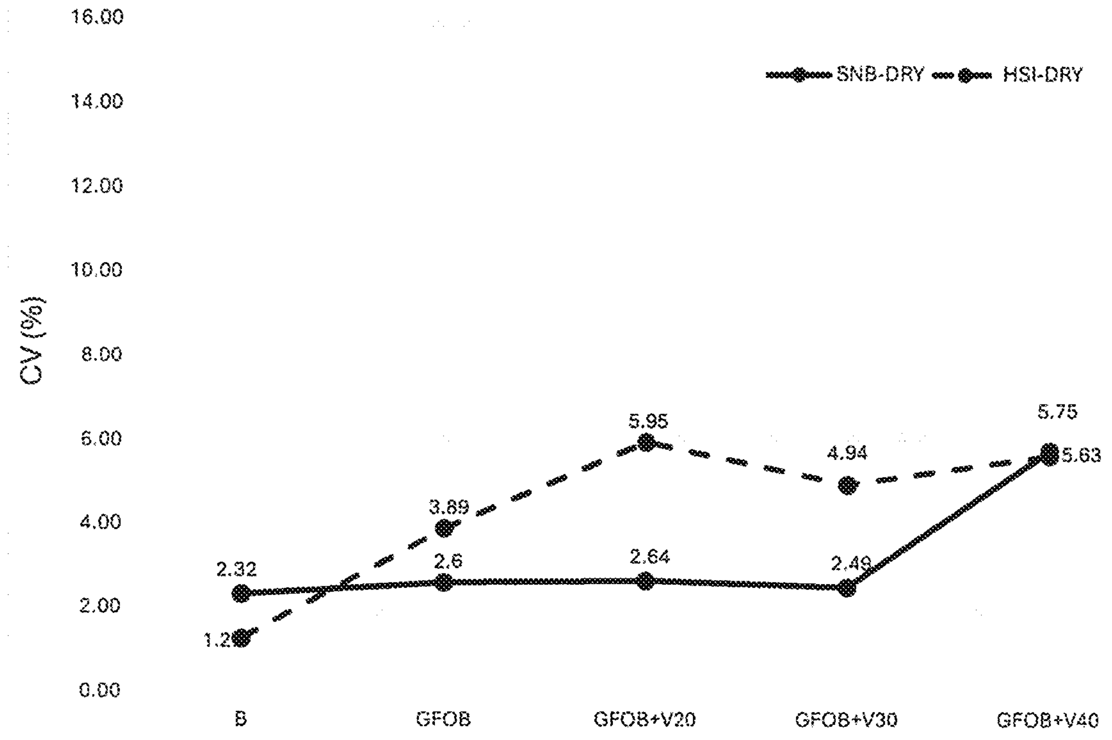

FIG. 23 is a graph showing content uniformity of acetaminophen in powder blends, including 0.1 mg acetaminophen per dose. Powder blends were prepared by dry blending in a V-shell on a lab blender using a SIFT-N-BLEND® intensifier attachment (SNB-DRY) or a high-speed intensifier bar (HSI-DRY). Microcrystalline cellulose was used as a filler binder. The lab blender was engaged at 1500 rpm speed. Powder blends were subjected to segregation testing in a powder blend segregation testing apparatus of the present invention having a 30" long tube.

Figure 24:
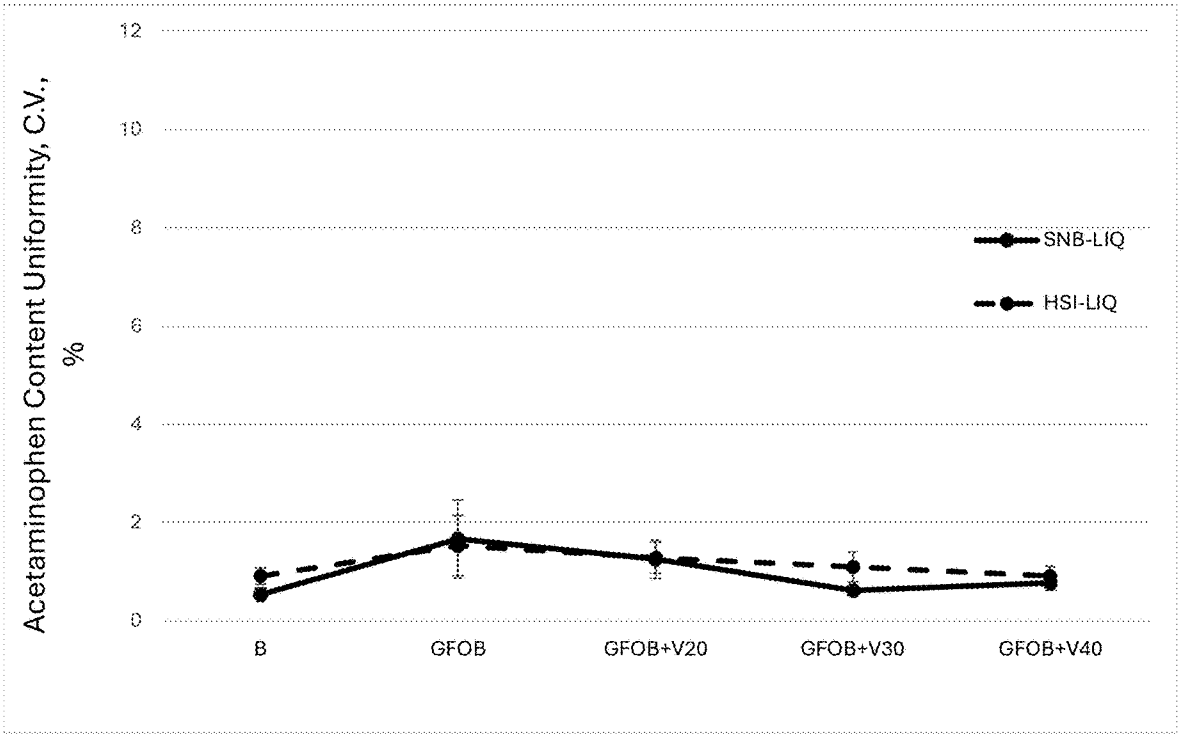

FIG. 24 is a graph showing content uniformity of acetaminophen in powder blends including 0.5 mg of acetaminophen per dose. Powder blends were prepared by wet blending in a V-shell on a lab blender using SIFT-N-BLEND® ("SNB-LIQ") or high-speed intensifier bar ("HSI-LIQ"). The lab blender was engaged at 1500 rpm speed. using only microcrystalline cellulose as a filler binder, at 1500 rpm and subjected to segregation testing with 30" long tube.

Figure 25:
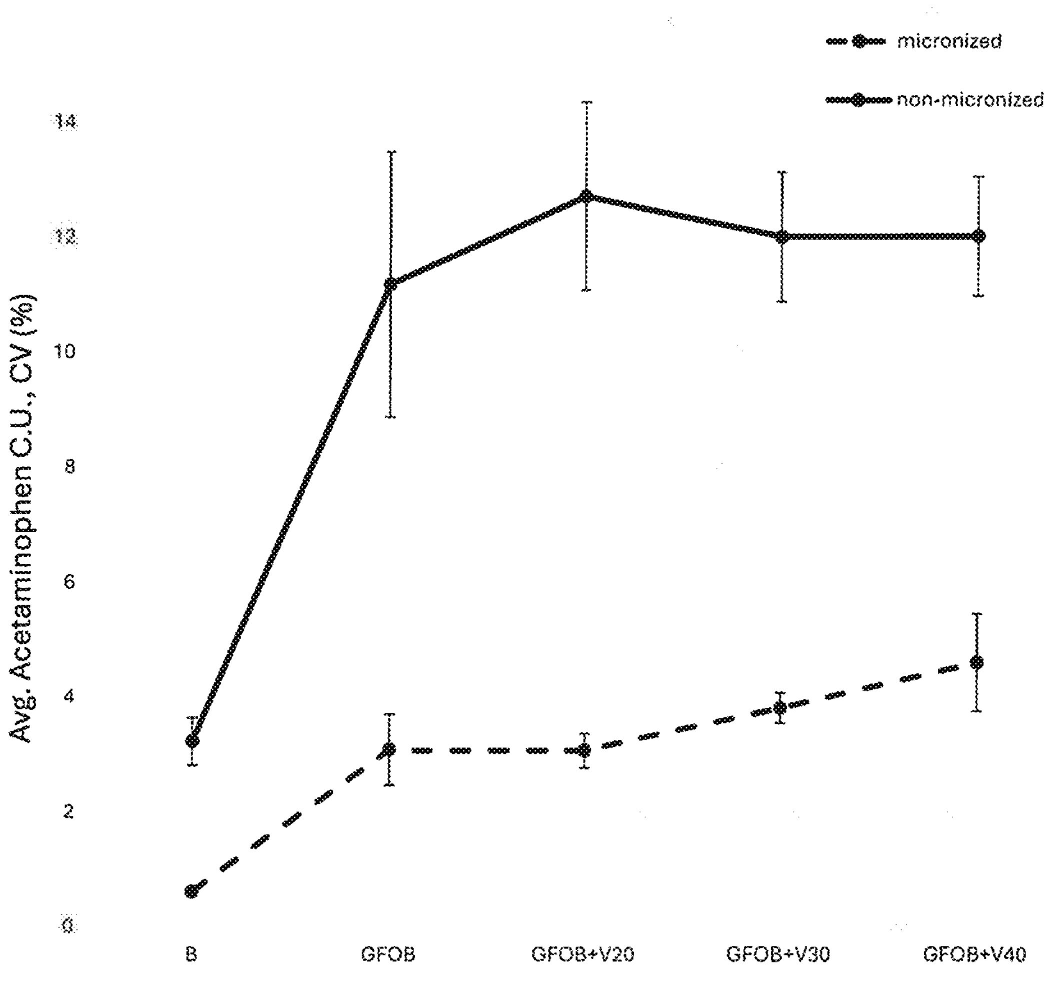

FIG. 25 is a graph showing average content uniformity of acetaminophen in powder blends containing 0.5 mg acetaminophen per dose, prepared by using acetaminophen powders of two different particle sizes and SIFT-N-BLEND® dry blending technique (SNB-DRY). Only microcrystalline was used as a filler, the blender was run at 25 rpm and the intensifier at 1500 rpm speed and subjected to segregation potential testing using 30" long tube.

Figure 26:
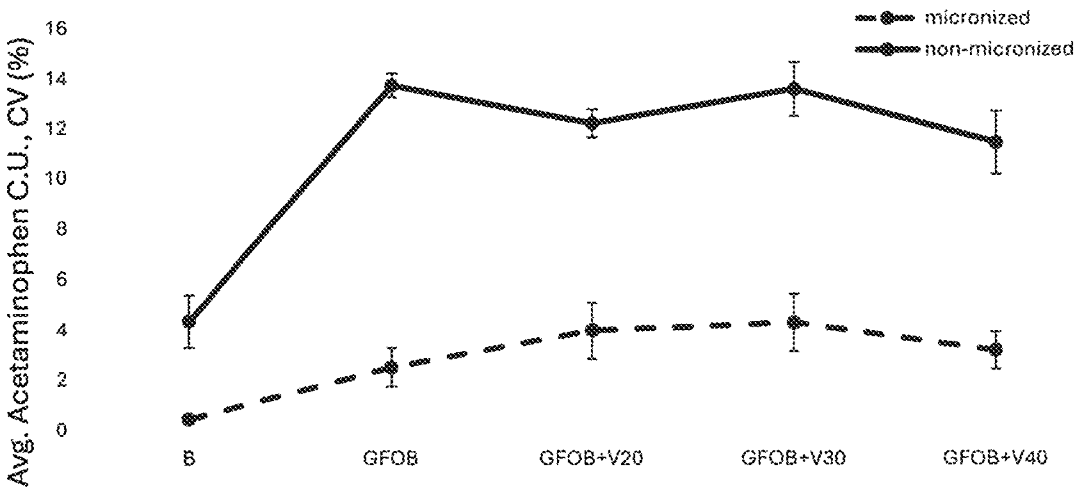

FIG. 26 is a graph showing average content uniformity of acetaminophen in powder blends containing 0.5 mg acetaminophen per dose, prepared by using acetaminophen powders of two different particle sizes and high-speed intensifier bar dry blending technique (HSI-DRY). Only microcrystalline was used as a filler, the blender was run at 25 rpm and the intensifier at 1500 rpm speed and subjected to segregation potential testing using 30" long tube.

Figure 27:
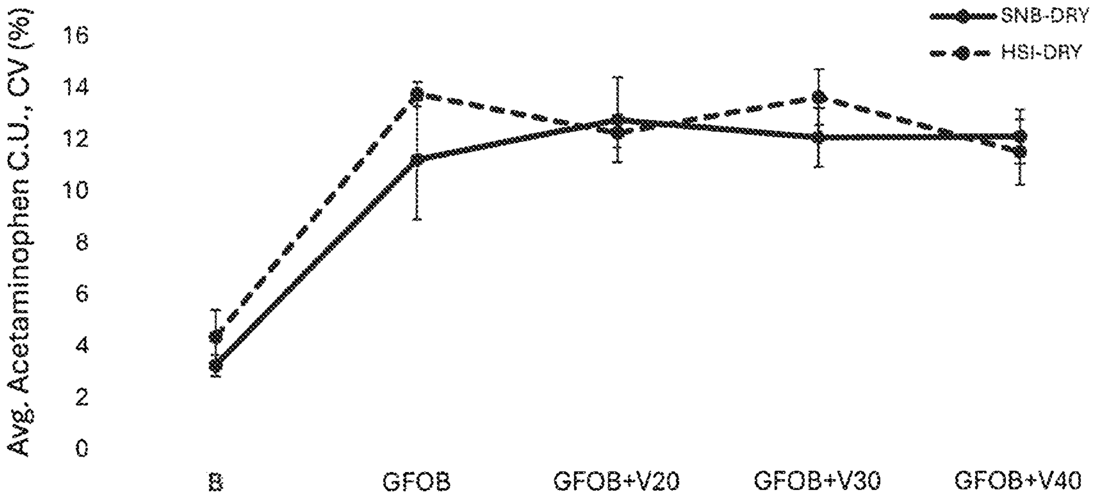

FIG. 27 is a graph showing comparison of average content uniformity of non-micronized acetaminophen in powder blends with 0.5 mg acetaminophen per dose, prepared by SIFT-N-BLEND® and high-speed intensifier bar dry blending techniques at 1500 rpm speed, and subjected to segregation potential testing using 30" long tube

DETAILED DESCRIPTION OF THE INVENTION

The definitions and discussion below are intended to guide understanding but are not intended to be limiting with regard to other disclosures in this application. References to percentage (%) in compositions of the present invention refers to the % by weight of a given component to the total weight of the composition being discussed, also signified by "w/w", unless stated otherwise. Values including±are represented in mean±SD unless indicated otherwise.

With reference now to the drawings, photos, and graphs, a new powder blend segregation testing apparatus generally designated by reference numeral 10 is described herein, along with related methods.

According to the present invention, a "powder blend segregation testing apparatus" comprises two or more baffles extending into the interior channel of a tube, such that when the apparatus is in vertical position, ready for use, a powder blend introduced into the top end of the tube flows downward through the interior channel of the tube and over the baffles, exiting the bottom end of the tube to a powder collector. In a powder blend segregation testing apparatus of this invention, baffles are positioned in the tube in succession (one after the next) in a cascade formation so that a powder blend flowing from first end to second end of the tube will strike the striking surface of each baffle of the cascade formation, the powder blend striking one baffle striking surface after the next, forming a cascade (i.e. the powder blend cascading) across the baffles. Without being bound by theory, segregation of the substances in the powder blend occurs from the flow over the baffles, which may occur due to gravity flow or further for instance due to a combination of gravity flow over the baffles combined with application of vibrational or other mechanical stress in the tube or e.g. the application of a vacuum. Without being bound by theory, the application of vibration accelerates segregation in an apparatus of this invention; also, the application of a vacuum or other mechanical stress accelerates segregation of the powder blend. In an embodiment, the tube is constructed to provide flexibility in adjusting the distance between the baffles, and/or in adjusting the angle of the baffles (including the baffle angles and/or angle for cascade flow), and/or the shape of the tube such as a square, rectangular, oval, etc., and/or length of the tube, and/or diameter of the tube and/or to allow for the application of different levels of vibration, vacuum, or other stress to the powder in the tube.

In an embodiment, the angle provided by a baffle inserted into a baffle slot or otherwise mounted, attached, or present in a tube of the present invention is the "baffle angle". In an embodiment, the baffle angle is defined by the baffle slot. Other modes of mounting and/or extending a baffle to the interior surface of a tube of this invention are also acceptable. The baffle angle is a downward angle such as 45° from horizontal at the point of entry or attachment of a baffle into the interior channel of the tube. See for instance the 45° baffle angle shown in FIG. 10B (40A). In an embodiment, a tube of the present invention includes baffle slots which, when baffles are inserted, provide baffle angles of about 40 to about 70 degrees below horizontal, as described throughout this invention, including for instance baffle angles of or about 45 degrees. These baffle angles in part promote flow of the powder blend through the tube and prevent accumulation of the powder blend on the baffles or generally throughout the tube. In an embodiment, all baffle slots of a tube of this invention provide approximately the same baffle angle (e.g. all 45° as in the Figures, or all 50°, or all) 60°; in an embodiment, baffle slots of a tube of this invention may provide different baffle angles, for instance within the range of and including 40 to 70° below horizontal.

Without being bound by theory, powder flow in the interior channel of the tube is by gravity, and may in addition be due to vibrational flow, the application of a vacuum, or other mechanisms. The powder blend flows freely when in the tube and does not accumulate on the baffles or elsewhere in the tube. In an embodiment, the tube and the baffles may be made of sanitary electropolished stainless steel, and further may be coated with a non-stick material, such as PTFE (e.g. Teflon®), to further prevent sticking of the finer ingredients in the powder blend to the baffles and/or the interior of the tube. In an embodiment, the flow of powder blend, whether segregated or unsegregated, in the interior channel of the tube is the same or about the same throughout the segregation process. Upon exiting the tube, the powder is collected by a collector device such as a split sampling die having multiple cavities, placed below the bottom end of the tube. See for instance FIG. 9. In such embodiment, the excess powder on the die is scraped off and the powder in each die cavity is then compressed into a tablet, for instance with a manual tablet compaction machine (FIG. 4B) as described in U.S. Pat. No. 6,585,507B1, granted to the inventor of the present application. Thereafter, the compressed tablets are analyzed for content uniformity. Coefficient of variation (CV, %) of the active ingredient in the sample tablets is used in this invention to compare between the formulations for the sake of ease of comparison. CV, calculated for the content uniformity of an ingredient in the tablets, such as an active pharmaceutical ingredient, is normalized to the tablet weight, and is an indicator of the segregation potential of the powder blend; the higher the coefficient of variation, the higher the segregation potential, and possibly the less desirable the formulation. Optionally, a vacuum is applied to the tube, for instance by connecting the lower end of the tube to a vacuum chamber; in an embodiment, powder samples are collected from the vacuum chamber by placing a split sampling die inside the vacuum chamber and then compacting the unit-dose powder samples into tablets, as described earlier for segregation analysis. In an embodiment, the powder is collected after exiting the lower end of the tube into a die with larger cavities and the powder in each cavity is individually tested for particle size distribution and compared with particle size distribution of the powder in the other cavities. In an embodiment, 10 g or more of the powder blend is introduced into the tube, for instance for the determination of content uniformity of an active ingredient or a minor ingredient, such as a disintegrant, sweetener, color, flavor, and the like. In an embodiment, a large enough die to accommodate 10 cavities or more is used to collect the powder blend as it exits the baffle tube, each cavity having a 1-30 cc capacity; said embodiment may for instance be used to facilitate particle size distribution of the powder from each cavity. In an embodiment, a tube may have a 6 inch to 8 inch diameter, with baffles of appropriate size, allowing for the testing of a large sample of powder blend and optionally collection into a collector for particle size distribution analysis According to the present invention, a "powder blend" refers to two or more substances that are mixed, stirred, blended, intermixed, and/or otherwise combined together in powdered form. In an embodiment, a "powder blend" of this invention comprises, consists essentially of, or consists of, a powder having two or more substances mixed, stirred, blended, intermixed, and/or otherwise combined together. In an embodiment, a powder blend of this invention is and/or appears to be homogenous, or uniform, for instance through visual or other measurement. In an embodiment, particles of a powder blend of this invention, including in an embodiment particles of components of a powder blend, have a particle size of about 1 micron to about 3000 microns, including for instance 1, 5, 10, 50, 100, 250, 500, 1000, 2000, or 3000 microns, or for instance including exactly or about 2 to 2900 microns, 10-1000 microns, 1000-2000 microns, 2000 to 3000 microns, and so forth, for instance as described with regard to ranges throughout in this application.

In an embodiment, the powder blend comprises substance 1 and substance 2. In an embodiment, substance 1 is a different chemical substance than substance 2. In an embodiment, substance 1 is the same chemical substance but in a different form or combination than substance 2. Various powder blends are described throughout this application using acetaminophen as a model drug.

In an embodiment, a powder blend of this invention is a pharmaceutical composition (including for instance a formulated pharmaceutical product, said pharmaceutical composition comprising at least one active pharmaceutical ingredient, and/or for instance comprising a disintegrant); a food composition for instance a powdered substance to be eaten as a food, or as a food additive, or as a food supplement; a beverage composition for instance a powdered substance to be added to a liquid or semi- or quasi-liquid substance and ingested by drinking (e.g. a matcha tea, infant formula, typical drink mix where powder is added to water or other liquid to form beverage, nutritional or dietetic or health-oriented shakes), or as a beverage additive (e.g. powder to be added to existing beverage, such as a sweetener or flavoring for instance to coffee or tea), or as a beverage supplement (e.g. powdered supplement for instance including vitamins, minerals, proteins, or other desirable substance to be added to a liquid to form a beverage for consumption by a user), for instance a powdered substance for packaging in bulk or packets and for addition into a beverage of choice; and/or a cosmetic composition, for instance for addition to other components or for instance for direct application to the skin (e.g. face and/or body). In an embodiment, a powder blend of this invention may be a product for sale or a composition that will undergo further processing. Powder blends of the present invention include those described throughout this application, as a whole or per any individual component.

According to the present invention, "segregation" refers to separation of at least one substance from a powder blend of this invention. In an embodiment, a powder blend consists of two substances-substance 1 and substance 2. Segregation of such powder blend is the separation of substance 1 and substance 2. In an embodiment, such separation is measurable by an apparatus of this invention. In an embodiment, a powder blend is comprised of more than 2 substances. Segregation of such a powder blend comprises the separation of at least 1 substance, for instance a substance 1, from the powder blend as a whole, or for instance from one, two, three, or more substances in the blend. In an embodiment, segregation is a loss or reduction of homogeneity or uniformity in a powder blend. Without being bound by theory, segregation occurs in a powder blend segregation testing apparatus of this invention from the flow over the baffles, vibrations, or other mechanical stress in the tube, and optionally in addition, upon exiting the tube and undergoing collection. In an embodiment, changes in a powder blend tested according to the present invention, or lack of changes in the powder blend after testing, may be visualized or otherwise identified as the blend exits the tube, for instance if a segregated and/or non-segregated component has a different color, texture, or other readily ascertainable characteristic, or quantified by analyzing the samples by spectrophotometry, chromatography or any other acceptable method.

According to the present invention, a "tube" refers to an elongate object, for instance like a pipe, having a first end and a second end and a rigid wall, said wall comprising an exterior side, an interior side, and a wall thickness, said interior side defining an interior channel through the tube from said first end to said second end. When the tube is vertically oriented, said first end is placed above said second end of a tube of this invention, for instance as shown in FIG. 1. In this orientation, the first end may also be referred to as the "top" end, and the second end as the "bottom" end.

Further, a tube of the present invention comprises two or more baffles extending into the channel. In an embodiment, a baffle of the present invention extends into an interior channel of a tube of this invention by about 50% to about 75% of the diameter of the interior channel, for instance as shown and discussed in FIG. 10B. Also, in an embodiment said interior channel has a uniform or mostly uniform cross-section (horizontal and/or vertical) and is entirely contained within the interior side of the channel, such that the interior channel does not pass through the tube wall thickness or exterior surface of the tube. In an embodiment, the exterior wall is in the form of a circle, oval, square, rectangle, or other regular or irregular shape. In an embodiment, the interior wall is in the form of a circle, oval, square, rectangle, or other regular or irregular shape. In an embodiment, the present invention includes a round tube having a round interior and round wall. In an embodiment, a tube of the present invention is in the shape of a hollow cylinder with a rigid wall having a circular cross-section in both the exterior and interior surface of the tube wall, for instance as pictured and discussed in part regarding FIGS. 1, 4, and 10. In an embodiment, an "elongate" tube of this invention has a greater length than the diameter or other cross-section width. For instance, in an embodiment, an elongate tube of this invention has a diameter of about 2 inches and a length of about 10 inches to about 30 inches, such that the tube length is about 5 to about 15 times the tube diameter. In an embodiment, the tube length of this invention is about 4 to about 17 times the tube diameter, including for instance, 4, 5, 6, 7, 8, 9, 10, 11, 12, 13, 14, 15, 16, or 17 times the diameter, or about those amounts, or any amount including or between 4 and 17. In an embodiment, a tube of this invention has a baffle slot penetrating through the tube wall, to allow the removable insertion or removal of a baffle. In a powder blend segregation testing apparatus of this invention, the tube is placed in a vertical position, with the first end above the second end, such that the tube is positioned, for instance, at a 90° angle to a horizontal surface, or for instance about 90°, such as 89°-91°. In an embodiment, the tube is considered positioned vertically so long as powder flows freely through the apparatus tube. The vertical positioning of the tube allows a powder blend introduced into the top end of the tube to flow through the tube via gravity flow, over one or more baffles, and then exit through the second (lower) end of the tube. In an embodiment, the wall of a tube of this invention is made of stainless steel, aluminum, plastic, or other rigid material for instance including bamboo, resin, or other materials. In an embodiment, a tube wall is made of or its interior lined with an inert substance. In an embodiment, the tube wall is made of stainless steel or plastic. In an embodiment, the tube wall is stainless steel. In an embodiment, the interior surface of the tube wall is smooth (and in an embodiment, seamless) to allow free flow of the powder blend, except for where baffles attach to the interior wall and extend into the interior space of the tube, or other desired constructions. In an embodiment, the interior surface of the tube and the baffles are coated with a non-stick material such as PTFE (e.g. Teflon®) for instance to prevent the finer components of the powder blend from sticking. In an embodiment, the wall of the tube is rigid, in that it will maintain its structure throughout use, including under conditions of powder flow across baffles, the application of vibrations to the tube, and/or the application of vacuum for instance to the lower end of the tube. In an embodiment, a tube of this invention, from top end to bottom end (i.e. first end to second end) is about 10 inches to about 30 inches long. In an embodiment, an interior channel of this invention from top end to bottom end (i.e. first end to second end) is about 10 inches to about 30 inches long.

In an embodiment, a tube of this invention having a circular cross-section is 2 inches in diameter and/or about 2 inches in diameter, for instance, about 1¾ inches, about 2¼ inches, or about 1¾ inches to about 2¼ inches. In an embodiment, the diameter of the tube may be 1 inch to 20 inches, for instance about 2, 3, 4, 5, 6, 7, 8, 9, or 10 inches, or more. In an embodiment, the tube length is about 10, 15, 20, 25, or 30 inches long. In an embodiment, the tube channel length is about 10, 15, 20, 25, or 30 inches long. In an embodiment, a tube of this invention is straight or mostly straight, for instance without a visible bend, or without an intentional bend, or for instance according to a standard level. In an embodiment, a tube of this invention is a 30 inch long stainless tube, 2 inches in diameter (internal diameter or external diameter), mounted vertically, having a wall thickness of about 1/16 inch, with 45° angle baffle slots cut starting at 4 inches from the top of the tube, on alternative sides of the tube, with a 2 inch vertical distance between the baffle slots (for instance as shown in FIG. 10B), and with each baffle slot able to accommodate or accommodating a removable stainless steel baffle. In an embodiment, a baffle slot is about 2 inches above and/or below another baffle slot of this invention. In an embodiment, a baffle slot is about 1.5 to about 3 inches above and/or below another baffle slot of this invention. In an embodiment, a tube having a length of 30 inches includes at least, including exactly, 13 baffle slots. In an embodiment, a tube having a length of 12 inches includes at least, including exactly, 5 baffle slots. It is noted that such slot placement provides a larger distance between baffles of the present invention than for instance membranes described in US 20190145854, allowing the powder to fall freely for a longer distance between baffles, and providing more opportunity for segregation to occur, if the powder blend is susceptible to segregation. In US 20190145854, the very thin membranes were not uniformly held in place and so vibration was not uniformly applied to the membranes; also, the vertical distance between membranes in US20190145854 was not sufficient to cause enough free fall of the powdered blend to affect (or effect) segregation. Further, indirect application of vibration in US20190145854 did not allow for effective control of vibration; and roughness of the membranes may have hampered the flow of powder through the US20190145854 device.

In an embodiment, a tube of this invention is removably attached to an electromagnetic vibration device, whose amplitude of vibration is controlled for instance by a potentiometer. In an embodiment, vibration is applied directly to the tube by the potentiometer. Without being bound by theory, direct application of vibration to a tube of this invention provides consistency and reproducibility to segregation tests. In an embodiment, the vibration device is mounted on a vertical stand with solid steel base, which is placed on a vibration dampening rubber mat. In an embodiment the tube is held tightly by a clamp, and the clamp is attached (e.g. fixedly attached) to the vibration device. In an embodiment, the vibration device is set to a vibration setting, said vibration setting able to be precisely read on a voltmeter connected to the vibration device with a potentiometer. This allows precise control of vibration applied to the tube of the present invention. In addition, in an embodiment, a donut ring force sensor is incorporated e.g. on the clamp. This allows for precise and reproducible application and control of clamping pressure on the tube, which in turn allows consistent level of vibration of the tube of the present invention.

In an embodiment, removable baffles and/or other components of this invention may be temporarily or permanently fixed in place.

According to the present invention, a "baffle" is a barrier that disrupts the flow of powder through the interior channel of a tube of a powder blend segregation testing apparatus of this invention. In an embodiment, powder flow when the apparatus is in use is disrupted by striking a baffle surface, but is not halted such that it accumulates and stays on the baffle, thus preventing following powder blend particles from having only partial access to the baffle. According to the present invention, powder is not intended to pile up or pool or otherwise stay on a baffle of this invention but rather is intended to flow freely and continuously through the apparatus. A baffle extends into the interior channel of the tube. When a tube of this invention is positioned vertically (i.e. 90°, or about 90° from horizontal) and the powder would fall freely through the tube without the baffles; Thus, primary obstacles to flowing powder are the baffles.

A baffle extends into the interior channel of the tube at a downward angle (see for instance FIG. 10B). In an embodiment, a baffle extends into the interior tube channel at an angle, downward of horizontal when the tube is in a vertical position, of about 40 to about 70 degrees, including any smaller range or number within this range, such as for instance 40 degrees, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 degrees, or any downward angle falling within about 40 to about 70 degrees. In an embodiment, a baffle extends into the interior tube channel at an angle, downward of horizontal when the tube is in a vertical position, of 45 degrees from the interior surface of the tube. In an embodiment, a baffle extends into the interior tube channel at an angle, downward of horizontal when the tube is in a vertical position, of about 40, 50, 60, or 70 degrees from the interior surface of the tube (See for example FIG. 10B, angle 40A). In an embodiment, one or more baffles extend into the interior channel of the tube at the same angle. In an embodiment, all baffles of an apparatus of this invention extend into the interior channel of the tube at the same angle (or about the same angle).

When in use, a powder blend is introduced into the top end of a tube of this invention and flows through the interior channel of the tube to the bottom end of the tube, striking one or more baffles along the way. In an embodiment, a baffle presents a striking surface to a powder blend flowing through a powder blend segregation apparatus of the present invention. In an embodiment, the striking surface is smooth. In an embodiment, the striking surface is smooth, solid, rigid, and impermeable to powder blend. In an embodiment, a baffle of this invention has a thickness of at least 0.05 inches, for instance, about 0.06 inches to about 0.1 inch, such as about 0.06 inches, about 0.0625 inches (1/16$^{th}$ inch), about 0.07 inches, about 0.075 inches, about 0.08 inches, about 0.085 inches, about 0.09 inches, or about 0.1 inch (1/10$^{th}$ inch). In an embodiment, a baffle is made of stainless steel and/or plastic, or other acceptable substance for presenting a smooth, solid, rigid, impermeable striking surface to powder flowing through the tube.

In an embodiment, a baffle presents a flat striking surface to powder flowing through an apparatus of this invention. Without being bound by theory, the flat striking surface provides consistency in the treatment of powder flowing through the invention, rather than for instance an irregular or rounded shape, which may present different drop lengths and increased opportunities for powder to pile up on a baffle. In an embodiment, a baffle of this invention is flat on both sides and has a rounded shape for instance as shown in FIGS. 2 and 3 and in part in FIG. 10. In an embodiment, a baffle surface is rounded. In an embodiment, baffles are placed in a zig zag arrangement, at about 180° to each other on opposing sides of the tube and with a vertical distance of 2 inches or about 2 inches or e.g. about 1, 1.5, 2.5, or 3 inches above and/or below another baffle on the tube interior wall of the tube channel, for instance as shown in FIG. 10B. In an embodiment, baffles are placed at 180° or about 180° to each other, for instance, about 175° to about 185°, or about 170° to about 190°. The number of baffles present in a tube channel of this invention may vary, for instance depending on the length of the tube or properties of the powder blend to be introduced into the channel. For instance, in a tube of the present invention having a length of 10 inches, 1, 2, 3, 4, or 5 baffles may be placed in the tube channel where the distance between baffles is to be about 2 inches. In a tube having a length of 30 inches, 1, 2, 3, 4, 5, 6, 7, 8, 9, 10, 11, 12, 13, 14, or 15 baffles may be present in the tube. Variations in tube length and spacing between baffles are readily apparent. In an embodiment, the baffles are configured so that the powder blend flowing through a tube of this invention encounters at least 2 baffles; in an embodiment, encountering 2, 3, 4, or more baffles, up to encountering all baffles as the powder blend flows through the tube. In an embodiment, a baffle of this invention extends at least 50% of the way across the interior channel of the tube, for instance as shown in FIG. 10B.

In an embodiment, a baffle is inserted into a baffle slot in the wall of a tube of this invention; in an embodiment, a baffle is removably inserted. In an embodiment, said insertion into the tube is through the exterior surface and the thickness of the tube wall, for instance through a baffle slot as shown in e.g. FIG. 1, so that the baffle extends at least in part through the tube wall into the interior channel of the tube. In an embodiment, a baffle is directly attached to the tube interior. In an embodiment, a baffle inserted into one or more baffle slots on the exterior surface of a tube of this invention will extend through the thickness of the tube and interior surface into the interior channel of the tube at a downward angle determined by the angle of the slot.

Methods

The present invention is directed to methods of using the powder blend segregation testing apparatus of this invention. In an embodiment, this invention is directed to a method of testing a powder blend having at least 2 components by introducing (testing) the powder blend into the stress conditions provided by the segregation testing apparatus of this invention and determining segregation of one or more powder blend components and/or the segregation potential of the powder blend from the post-test powder blend. The method comprises the steps of (a) providing a powder blend comprising at least two components, (b) introducing the powder blend into the first end of the tube of the powder blend segregation testing apparatus to allow flow of the powder blend through the tube interior channel and across 2 or more baffles, said baffles positioned in succession along the length of the tube, first end to second end, and in a cascade formation, as described throughout this application. In an embodiment, in a testing apparatus of this invention, a cascade formation comprises 4 or more baffles positioned in two or more baffle columns. A baffle column is shown for instance in the addition of 2 or more baffles below those shown in FIG. 10B, one on the right and then one on the left, below the other in succession, so that at least 2 baffles form a baffle column on the right side of the tube as shown, and 2 baffles form a baffle column on the left side of the tube as shown. The baffles form a cascade formation that will allow powder blend to cascade from one to the next. It was unexpectedly found that testing a powder blend by flowing the powder blend over baffles positioned in succession and in a cascade formation in the tube of a testing apparatus of this invention provided statistically significant, consistent results in a simple-to-operate apparatus, when comparing powder blend before and after testing in the testing apparatus. As discussed throughout this application, without being bound by theory, the present segregation testing apparatus is believed to provide dynamic, stressed conditions to the powder blend, allowing segregation potential to be determined at the formulation or other desired stage of development or production.

After the powder blend is introduced into the testing apparatus, it cascades over the baffles, and exits the testing apparatus tube, in an embodiment into a powder collector, the segregation of at least one component of a powder blend may be determined for instance by visual measurement of the post-testing powder blend (for instance if a component is a different color than other components of the blend or the blend as a whole, such that segregation may be visualized) and in an embodiment quantified, by spectrophotometric analysis and for instance calculation of content uniformity (for instance as shown in the Examples), or by other methods of measurement, for instance by methods known in the art. In an embodiment, changes in content uniformity of a powder blend tested according to the present invention, or lack of changes in the powder blend after testing, may be visualized or otherwise identified as the blend exits the tube, for instance if a segregated and/or non-segregated component has a different color, texture, or other readily ascertainable characteristic. The segregation potential of the blend may be determined by measuring the amount of segregation of a component in the powder blend before and after introduction of the powder blend into the testing apparatus and cascading the blend over the baffles in succession and comparing the two measurements. If, after testing in the testing apparatus, the powder blend shows an increase in segregation, for instance an increased percentage including a significantly increased percentage, for instance an increase in content uniformity variation (C.V., %) as shown in the Examples, and/or for instance an increase in content uniformity variation (C.V., %) that shows a formulation may exceed regulatory standards, all for instance at the formulation stage, then the determination of segregation potential may indicate that the powder blend should be reformulated.

Another method of the present invention is improving the dynamic stability of a powder blend, comprising the steps of (a) using the SIFT-N-BLEND® intensifier attachment (b) with the intensifier paddle running at speeds of 1500 rpm or higher (c) part of the powder blend being pushed by the paddle at each rotation of the blender shell through the semi-tubular screen and (d) the screening process being repeated throughout the blending cycle, which removes any static agglomerates of the active ingredient by the shearing action of the screening process, which in turn yields a powder blend which resists segregation even when subjected to stressed conditions, such as vibration.

The present invention may be further understood in connection with the examples below and with embodiments described throughout this application. The following non-limiting examples and embodiments described below and throughout this application are provided to illustrate the invention.

Experimental Methodologies

A typical pharmaceutical solid dosage formulation is comprised of, other than the active ingredient itself, inert ingredients such as filler binders, disintegrants, glidant or flow enhancers, lubricants at the minimum, but may also contain specialty ingredients such as binders, sustained-release filler binders, sweeteners, flavoring agents, colors, and the like. The examples below, for the sake of simplicity, use typical instant release tablet formulations, and not intended as limiting.

Formulations

Several formulations, covering the effect of the following experimental variables, were prepared and tested for segregation behavior:

1. Dose of acetaminophen per tablet-4 mg, 0.5 mg and 0.1 mg
2. Type of filler binder used with very different bulk densities-Microcrystalline cellulose and dicalcium phosphate dihydrate (unmilled), individually and in combinations of different proportions,
3. Type of blending intensification attachment used-SIFT-N-BLEND® (SNB), high-speed intensifier bar (HSI) and pin intensifier bar (PIN),
4. Speed of the intensifier attachment-1500, 1000 and 500 rpm.
5. Type of blending technique-dry blending and wet blending
6. Length of the stainless tube used for segregation testing, and
7. Particle sizes of acetaminophen powder-micronized and non-micronized.

Materials Used

Acetaminophen USP, Micronized with average particle size of about 7 microns (Mallinckrodt, SpecGx LLC, 8801 Capital Blvd., Raleigh, NC 27616, USA)—active ingredient Acetaminophen USP, Special Powder, non-micronized, with sieve analysis results of not more than 5% retained on ASTM #60 sieve (250 microns) and 15%-30% retained on ASTM #230 sieve (63 microns) (Granules India Ltd., Madhapur, Hyderabad-500081, India)—active ingredient

- Microcrystalline Cellulose, NF (Vivapur 102, JRS Pharma GMBH & Co., 73494 Resenberg, Germany)—used as a filler
- Dicalcium phosphate Dihydrate unmilled, NF (Innophos, 259 Prospect Plains Rd., Cranbury, NJ 08512—used as a filler
- Croscarmellose Sodium, NF (VIVASOL GF, JRS Pharma GMBH & Co., 73494 Resenberg, Germany)—used as a disintegrant
- Silicon Dioxide, fumed, NF (AEROSIL, Evonik Corporation, 299 Jefferson Rd., Parsippany, NJ 07054)—used as a glidant
- Magnesium Stearate, NF (Ligamed MF-2-K, Edison straat 1, 5928 PG Venlo, Nederland)—used as a lubricant, and
- Ethyl Alcohol, 190 proof, (Everclear) (Luxco, a subsidiary of MGP Ingredients, 100 Commercial Blvd., Atchison, Kansas 66002)—used as a solvent to dissolve acetaminophen Blending Procedure:

Powder blending was done on a lab blender (Maxi-Blend®, FIG. 12A), using either a bottle blending attachment (FIG. 12B) or a 4-quart V-shell equipped with an intensifier attachment—SIFT-N-BLEND® (FIGS. 13A-13C), high-speed intensifier bar (HSI) or pin intensifier bar (PIN). The blender speed was constant at 25 rpm across all the formulations and the intensifier speed was varied from 1500 rpm to 500 rpm. Blending and Intensifier timings and speeds were controlled by a programmable logic controller (PLC) with settings done on a human-machine interface (HMI).

Formulations and the blending procedure for each Example are presented in Tables under each Example.

Common Key for all the Figures and Tables:

Key: SNB-DRY—Dry Blending, SIFT-N-BLEND®; HSI-DRY—Dry Blending, high-speed intensifier bar; PIN-DRY—Dry Blending, pin intensifier bar, SNB-LIQ—Wet Blending, SIFT-N-BLEND®, HSI-LIQ—Wet Blending, High-speed Intensifier Bar Statistical significance is indicated by differences in means at $p<0.05$ (*), $p<0.01$ (), and $p<0.001$ (*); ns—non-significant.

Segregation Test Condition: B—Baseline (not subjected to segregation testing, GFOB—Gravity Flow Over Baffles; GFOB+V20—gravity flow over baffles combined with vibration level 20; GFOB+V30—gravity flow over baffles combined with vibration level 30; GFOB+V40—gravity flow over baffles combined with vibration level 40.

Vibration levels 20, 30 and 40 for the vibration device represent 20, 30 and 40 volt settings respectively on a potentiometer or a programmable logic controller. As the voltage is increased, the vibration amplitude increases. A vibration sensor may be installed on the stainless steel tube or the frame of the vibration device to which the stainless steel tube is attached to monitor the exact vibration level used. Where replicate segregation tests were done, statistical analysis was done.

The abbreviations, REP, SD and SE in statistical analysis tables represent replicate number, standard deviation and standard error respectively.

Segregation Testing

1. Baffles were inserted into all baffle slots on the tube described in FIG. 4, a 30 inch long tube with outer diameter of 2.0" having 13 baffles slots for 13 baffles. The tube was oriented in an upright (vertical) position. All baffles were angled downward and formed a zig zag pattern inside the tube, so that when a powder blend was introduced into the top end of the tube, the powder blend would cascade down the baffles via gravity flow and exit the tube.
2. The protruding ends of the baffles outside of the tube were then taped to prevent the baffles from rattling and the powder from leaking through the baffle slots.

NOTE: Instead of tape, a plastic mesh sleeve or Velcro® bands may be also used.

3. A funnel was placed on the top end of the tube. (Funnel is optional).
4. An assembled split die was placed below the bottom end of the tube to collect the powder blend after it passed through the tube.
5. The segregation test was performed with the powder by Gravity Flow Over Baffles (GFOB) without any vibration applied or GFOB combined with different levels of vibration (V20, V30 and V40). Vibration device used was Syntron Magnetic Feeder, Model F-TO-C and the vibration amplitude controller used was Syntron PowerPulse, Syntron Material Handling, 2730, MS-145, Saltillo, MS 38866. Vibration amplitude was set at 20, 30 and 40 settings using the knob on the Syntron PowerPulse. Settings of 20, 30 and 40 denote 20, 30 and 40 volts, respectively. A vibration sensor is in the process of being installed to display the actual vibration level. About 30 cc volume of the powder blend was poured into the tube into a funnel at the top end. The powder flowed over the baffles and exited at the bottom end of the tube on to the split die.
6. The collected powder on the split die was evenly scraped with a spatula to fill all the cavities of the die. (See FIG. 9).
7. The split die was placed on the base plate of the manual tablet compaction machine and the powder in each cavity was individually compressed into a tablet at a pre-determined pressure to form a tablet.
8. When the powder in all the cavities was compressed into tablets, the top part of the split die, containing the compressed tablets, was placed on an ejection cup and the tablets were ejected individually into the cup using the manual tablet compaction machine.
9. Tablets were then analyzed individually or in groups of 3 tablets to determine the content uniformity of acetaminophen using UV spectrophotometry at a wavelength of 243 nm. The coefficient of variation (C.V.) of the drug content in the tablets was calculated and served as the indicator of content uniformity in the tablets.
10. Running 5 replicate tests with selected formulations and performing statistical analysis (ANOVA, Tukey's, and t-test) to determine statistical significance between different intensifier attachments. Statistical significance is indicated by different letters, highlighting differences in means at $p<0.05$ (*), $p<0.01$ (), and $p<0.001$ (*).

Preparation of Acetaminophen Standard Curve

Acetaminophen standard curve was prepared following the procedure below:

1. Weighed accurately on an analytical balance about 50 mg of acetaminophen micronized powder into a 100 ml volumetric flask.
2. Noted down the actual weight of the acetaminophen powder weighed: 50.19 mg
3. Added about half purified water in the volumetric flask and shook well manually until all acetaminophen was dissolved.

4. Added water to total volume of 100 ml, shook well, and labeled flask as ACETAMINOPHEN STOCK SOLUTION A. Concentration of this solution is 0.5019 mg/ml.
5. Added 5 ml of ACETAMINOPHEN STOCK SOLUTION A to a 100 ml volumetric flask, added water to 100 ml volume, shook well, and labeled flask as ACETAMINOPHEN STOCK SOLUTION B. Concentration of this solution is 0.025595 mg/ml (=25.595 μg/ml).
6. Prepared the following dilutions with water from the ACETAMINOPHEN STOCK SOLUTION B:

| | Dilution | Conc. (μg/ml) | Absorbance |
|---|---|---|---|
| a. | 5 ml to 100 ml | 1.255 | 0.088 |
| b. | 10 ml to 100 ml | 2.510 | 0.168 |
| c. | 15 ml to 100 ml | 3.765 | 0.252 |
| d. | 20 ml to 100 ml | 5.02 | 0.332 |
| e. | 25 ml to 100 ml | 6.275 | 0.422 |
| f. | 35 ml to 100 ml | 8.785 | 0.577 |
| g. | 45 ml to 100 ml | 11.295 | 0.743 |

7. Calculated the concentration of acetaminophen in each of the solutions from Step 6 using the actual acetaminophen weight from Step 2 and noted down in the table in Step 6.
8. Determined absorbance of the solutions in Step 6 using Cole-Palmer (Unico) Model 2800 UV/Visible spectrophotometer (Cole-Parmer, Vernon Hills IL USA) at a wavelength of 243 nm and noted down the results in the table in Step 6.
9. Used GraphPad linear regression calculator from online and performed linear regression analysis entering the concentration values for X axis and absorbance values for Y axis.
10. Saved the linear regression graph and the results.
11 Used 1/slope to calculate the amount of acetaminophen in tablets.

Calculations using the slope and intercept values from linear regression analysis $Y=mx+C$ ($Y$=absorbance, $m$=slope, $X$=concentration of the solution, $C$=intercept on X axis). Equation for X-Y straight line graph:

For the standard curve shown in FIG. 11, Y=0.06555X+0.006006.

$X=(Y-0.006006)/0.06555=Y/0.06555$ Considering the intercept as negligible.

$X$=Absorbance+0.06555 μg/ml=Absorbance×15.32 μg/ml

Determination of Acetaminophen Content Uniformity of Tablets Containing 4 mg Acetaminophen per Dose 1. Labeled ten 100 ml volumetric flasks 1-10 using masking tape.
2. Weighed 10 tablets from each sample individually on an analytical balance, noted down the weight of each tablet and transferred the tablet to the corresponding volumetric flask.
3. Added about half purified water to each flask and mounted all the ten flasks on a shaker machine.
4. Shook the flasks at medium speed (already set) for 10 minutes by setting the timer.
5. Increased the volume in each flask to 100 ml with water and shook well manually.
6. Acquired another set of ten 100 ml volumetric flasks, labeled F1-F10 (F stands for Filtration).

CAUTION: Made sure this set of volumetric flasks was dry; any amount of residual water in the flasks will contribute to error in the results.

7. Filtered the solutions from Step 5 into the corresponding flasks from Step 6 using VWR filter paper 494, which had porosity of 1 μm, or an equivalent filter paper.

CAUTION: Made sure the solution did not exceed the level of the filter paper in the funnels.

8. Labelled a third set of ten 100 ml volumetric flasks from T1-T10 (T stands for Test).
9. Pipetted 15 ml of filtered solution from Step 7 into the corresponding flasks from Step 8.
10. Increased the volume in each flask from Step 9 with water to 100 ml and shook each flask well by inverting it to create space in the flask.

CAUTION: Shaking well is important in this step because once the volume is increased to 100 ml in the flask, there is not much room for the liquid to move around.

11. Read absorbance of the solutions from Step 10 on Unico 2800 UV/Visible Spectrophotometer with the wavelength set to 243 nm (at this wavelength, acetaminophen has maximum UV absorbance) and noted down the absorbance values.
12. Calculated the amount of acetaminophen in each tablet using the following equation from the acetaminophen standard curve:

$$X = \text{Absorbance} \div 0.06555\ \mu g/\text{ml} = \text{Absorbance} \times 15.32\ \mu g/\text{ml}$$

Calculations:

Concentration of acetaminophen in 15 ml of the filtered solution from Step 9=Absorbance from Step 11×15.32×100 μg.

Concentration of acetaminophen in 100 ml of the first solution of the tablet (before filtration) is:

$$(\text{Absorbance from Step } 11 \times 15.32 \times 100 \times 100) \div 15\ \mu g = \text{Absorbance from Step } 11 \times 10{,}213.3\ \mu g/\text{actual tablet weight} = \text{Absorbance from Step } 11 \times 10.213\ \text{mg/actual tablet weight}$$

Amount of acetaminophen normalized to theoretical tablet weight of 125 mg:

$$= (\text{Absorbance from Step } 11 \times 10.213 \times 125) \div \text{Actual tablet weight} = (1276.7 \times \text{absorbance}) \div \text{actual tablet weight.}$$

Determination of Acetaminophen Content Uniformity of Tablets Containing 0.5 mg of Acetaminophen per Dose 1. Labeled ten 200 ml volumetric flasks 1-10 using masking tape.
2. Weighed 3 tablets together on an analytical balance, note down the weight of each tablet and transferred the tablets to the corresponding 200 ml volumetric flask.
3. Added 100 ml water to each flask, using a 100 ml volumetric flask, and mounted all ten flasks on a shaker machine.
4. Shook the flasks at medium speed (already set) for 15 minutes.

5. Acquired another set of ten 100 ml volumetric flasks, labeled F1-F10 (F stands for Filtration.)

CAUTION: Made sure this set of volumetric flasks is dry; any amount of residual water in the flasks will contribute to error in the results.

6. Filtered the solutions from Step 4 into the corresponding flasks from Step 5 using VWR filter paper 494, which has porosity of 1 μm, or an equivalent filter paper.

CAUTION: Made sure the solution did not exceed the level of the filter paper in the funnels.

7. Read absorbance of the solutions from Step 10 on Unico 2800 U V/Visible Spectrophotometer (Cole-Parmer, Vernon Hills, IL, USA) with wavelength set to 243 nm (at this wavelength, acetaminophen has maximum UV absorbance) and noted down the absorbance values.

8. Calculated the amount of acetaminophen in each flask using the following equation from the acetaminophen standard curve:

$$X = \text{Absorbance} \div 0.06555\ \mu g/\text{ml} = \text{Absorbance} \times 15.32\ \mu g/\text{ml}$$

Calculations:

Concentration of acetaminophen in 100 ml of the tablet solution is:

$$\text{Absorbance from Step } 7 \times 15.32 \times 100\ \mu g = \text{Absorbance from Step } 7 \times 1{,}532\ \mu g/\text{actual tablet weight} = \text{Absorbance from Step } 7 \times 1.532\ \text{mg/actual tablet weight}$$

Amount of acetaminophen normalized to theoretical 3 tablet weight of 375 mg:

$$= (\text{Absorbance from Step } 8 \times 1.532\ \text{mg} \times 375) \div \text{Actual 3 tablet weight in mg} = (574.5 \times \text{absorbance}) \div \text{actual 3 tablet weight in mg.}$$

Example 1

Segregation Behavior of Powder Blends Prepared by Bottle Blending Technique with 4 mg of Micronized Acetaminophen Per Dose and Filler Binders Having Different Bulk Densities The objective of Example 1 is to determine the effect of segregation testing on the content uniformity of powder blends formulated with a combination of two filler binders having very different bulk densities, since formulations containing such a combination of filler binders will tend to segregate. Powder blends were prepared by blending the formulations shown in Tables 1-6 in a bottle with a lab blender, shown in FIGS. 12A and 12B, using microcrystalline cellulose (MCC, bulk density of 0.3 g/cc) and dicalcium phosphate dihydrate, unmilled (DCP, bulk density of 0.95 g/cc) as filler binders in different proportions. MCC and DCP were included as filler binders in the powder blends in a MCC-DCP filler mix having different proportions (0 to 100%). Micronized acetaminophen powder was used in this Example.

Table 7 describes the stepwise process for preparing the powder blends. The powder blends were then tested in a powder blend segregation testing apparatus of the present invention for segregation of acetaminophen from the powdered blend, as described under "Segregation Testing" and content uniformity of acetaminophen in the tablets was determined as per the procedure described under "Determination of Acetaminophen Content Uniformity of Tablets Containing 4 mg Acetaminophen per Dose under EXPERIMENTAL METHODOLOGIES section.

Formulations of Powder Blends for Example 1

TABLE 1

Formulation 1 with MCC:DCP::100:0

| Sample # | INGREDIENT | AMOUNT PER UNIT DOSE, mg | AMOUNT PER BATCH, g |
|---|---|---|---|
| 1 | Acetaminophen, Micronized Powder | 4.00 | 6.400 |
| 2 | Microcrystalline Cellulose 102, NF | 116.00 | 185.6 |
| 3 | Silicon Dioxide, NF | 1.25 | 2.00 |
| 4 | Croscarmellose Sodium, NF | 2.50 | 4.00 |
| 5 | Magnesium Stearate, NF | 1.25 | 2.00 |
| | TOTAL | 125 | 200 |

TABLE 2

Formulation 2 with MCC:DCP::80:20

| Sample # | INGREDIENT | AMOUNT PER UNIT DOSE, mg | AMOUNT PER BATCH, g |
|---|---|---|---|
| 1 | Acetaminophen, Micronized Powder | 4.00 | 6.400 |
| 2 | Microcrystalline Cellulose 102, NF | 92.80 | 148.48 |
| 3 | Dicalcium Phosphate, Dihydrate, USP/NF | 23.20 | 37.12 |
| 4 | Silicon Dioxide, NF | 1.25 | 2.00 |
| 5 | Croscarmellose Sodium, NF | 2.50 | 4.00 |
| 6 | Magnesium Stearate, NF | 1.25 | 2.00 |
| | TOTAL | 125 | 200 |

TABLE 3

Formulation 3 with MCC:DCP::60:40

| Sample # | INGREDIENT | AMOUNT PER UNIT DOSE, mg | AMOUNT PER BATCH, g |
|---|---|---|---|
| 1 | Acetaminophen, Micronized Powder | 4.00 | 6.400 |
| 2 | Microcrystalline Cellulose 102, NF | 69.60 | 111.36 |
| 3 | Dicalcium Phosphate, Dihydrate, USP/NF | 46.40 | 74.24 |
| 4 | Silicon Dioxide, NF | 1.25 | 2.00 |
| 5 | Croscarmellose Sodium, NF | 2.50 | 4.00 |
| 6 | Magnesium Stearate, NF | 1.25 | 2.00 |
| | TOTAL | 125 | 200 |

TABLE 4

| Formulation 4 with MCC:DCP::40:60 | | | |
|---|---|---|---|
| Sample # | INGREDIENT | AMOUNT PER UNIT DOSE, mg | AMOUNT PER BATCH, g |
| 1 | Acetaminophen, Micronized Powder | 4.00 | 6.400 |
| 2 | Microcrystalline Cellulose 102, NF | 46.40 | 74.24 |
| 3 | Dicalcium Phosphate, Dihydrate, USP/NF | 69.60 | 111.36 |
| 4 | Silicon Dioxide, NF | 1.25 | 2.00 |
| 5 | Croscarmellose Sodium, NF | 2.50 | 4.00 |
| 6 | Magnesium Stearate, NF | 1.25 | 2.00 |
| | TOTAL | 125 | 200 |

TABLE 5

| Formulation 5 with MCC:DCP::20:80 | | | |
|---|---|---|---|
| Sample # | INGREDIENT | AMOUNT PER UNIT DOSE, mg | AMOUNT PER BATCH, g |
| 1 | Acetaminophen, Micronized Powder | 4.00 | 6.400 |
| 2 | Microcrystalline Cellulose 102, NF | 23.20 | 37.12 |
| 3 | Dicalcium Phosphate, Dihydrate, USP/NF | 92.80 | 148.48 |
| 4 | Silicon Dioxide, NF | 1.25 | 2.00 |
| 5 | Croscarmellose Sodium, NF | 2.50 | 4.00 |
| 6 | Magnesium Stearate, NF | 1.25 | 2.00 |
| | TOTAL | 125 | 200 |

TABLE 6

| Formulation 6 with MCC:DCP::0:100 | | | |
|---|---|---|---|
| Sample # | INGREDIENT | AMOUNT PER UNIT DOSE, mg | AMOUNT PER BATCH, g |
| 1 | Acetaminophen, Micronized Powder | 4.00 | 6.400 |
| 2 | Dicalcium Phosphate, Dihydrate, USP/NF | 116.0 | 185.6 |
| 3 | Silicon Dioxide, NF | 1.25 | 2.00 |
| 4 | Croscarmellose Sodium, NF | 2.50 | 4.00 |
| 5 | Magnesium Stearate, NF | 1.25 | 2.00 |
| | TOTAL | 125 | 200 |

TABLE 7

| Blending Procedure for Formulations of Example 1 | |
|---|---|
| STEP | INSTRUCTIONS |
| 1 | Made sure all utensils to be used are clean. |
| 2 | Calibrated the scale and the analytical balance. |
| 3 | Weighed the filler binders, silicon dioxide and croscarmellose sodium into a suitable size, square plastic bottle. |
| 4 | Weighed acetaminophen micronized powder on an analytical balance and transfer to the bottle above. |
| 5 | Hand mixed the ingredients in Step 4 by tumbling manually for a few minutes. |
| 6 | Passed the blend from Step 5 through a 30 mesh screen by hand and transferred it back to the bottle. |
| 7 | Mounted the bottle on the large bottle blending attachment on the MaxiBlend ® Lab Blender (GlobePharma, Monmouth Junction, NJ, USA) and blended for 10 minutes.<br>Response: Blender settings for blending time, time for intensifier attachment use and the speed of the intensifier bar/paddle are done as per the instructions, using HMI (human-machine interphase) display on the blender. |
| 8 | Weighed magnesium stearate and transferred it to the bottle in Step 7. |
| 9 | Blended for 5 minutes. |
| 10 | Labeled the bottle with the formulation number and stored in a dry place. (50 ± 1% Relative Humidity) |

The results of segregation testing of the 6 powder blends prepared as described above are presented in Table 8 and FIG. 14. Table 8 shows the content uniformity of acetaminophen in the 6 powder blends formulated according to Example 1, before segregation testing (BT) and after segregation testing (AT) of the powder blends by gravity flow over baffles (GFOB) without any vibration applied in a powder blend segregation testing apparatus of this invention.

TABLE 8

Content Uniformity of Acetaminophen in Formulations of Example 1

| Sample No. | MCC:DCP | Content Uniformity of Acetaminophen in the Blend Coefficient of Variation, % (C.V., %) Before Segregation Test | After Segregation Test |
|---|---|---|---|
| 1 | 100:0 | 1.41 | 9.09 |
| 2 | 80:20 | 6.11 | 7.57 |
| 3 | 60:40 | 6.81 | 16.21 |
| 4 | 40:60 | 3.67 | 20.66 |
| 5 | 20:80 | 2.63 | 28.7 |
| 6 | 0:100 | 2.18 | 9.84 |

Figure 14:
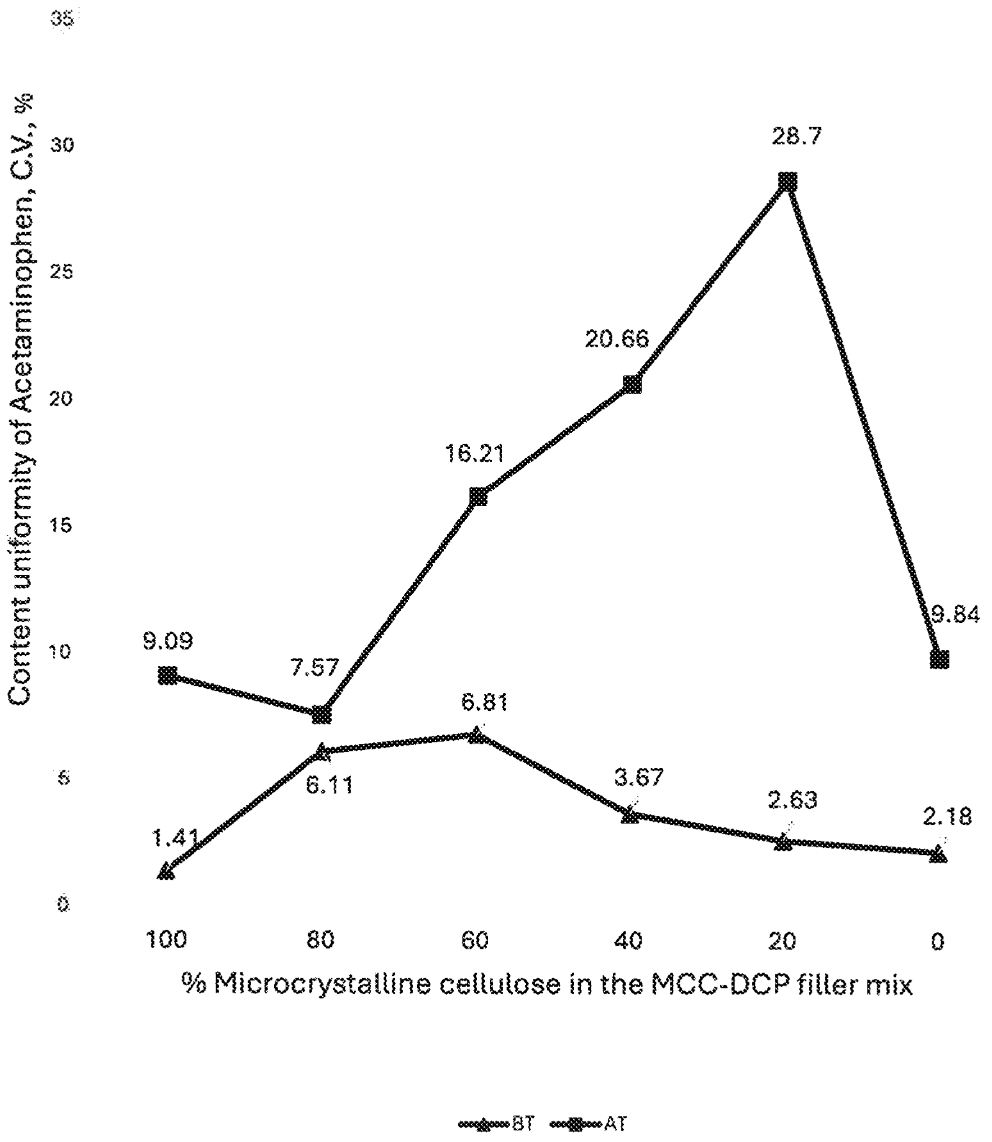

FIG. 14 is a graph showing content uniformity of acetaminophen in powder blends including 4 mg of acetaminophen per dose. The powder blends were prepared by bottle blending the formulations described in Tables 1-6, in the lab blender shown in FIGS. 12A and 12B as per the procedure described in Table 7. Fillers, microcrystalline cellulose (MCC) and dicalcium phosphate dihydrate (DCP) were used in the powder blends in MCC-DCP filler mix having different proportions (0 to 100%). The content uniformity of acetaminophen in the powder blends was tested before segregation testing (BT) and after segregation testing (AT) using gravity flow over baffles (GFOB) method in a powder blend segregation testing apparatus of the present invention having a 30" long tube. Powder blends were prepared by bottle blending at 25 rpm of the blender shell (no intensifier bar) on lab blender using microcrystalline cellulose (MCC) and dicalcium phosphate dihydrate (DCP) in different proportions before and after segregation testing on a 30" tube under gravity flow over baffles.

As can be seen from Table 8 and FIG. 14, all the powder blends were susceptible to segregation, with content uniformity of acetaminophen before testing (bottom line, dark triangles) ranging from (coefficient of variation; C.V.) 1.41% to 6.81%, and after testing (top line, dark squares) ranging from C.V. 7.57% to 28.7%. A lower C.V. (%) shows little segregation of powder blend components and good content uniformity, and a higher C.V. (%) shows segregation of powder blend components and less desirable content uniformity. Without being bound by theory, a powder blend's susceptibility to segregation was expected at least in part because of wide differences in the bulk densities of the two filler binders. As can be seen from the data, the blend containing MCC:DCP in an 80:20 ratio demonstrated the lowest segregation potential, with only a difference of 1.46% (C.V. 7.57%-6.11%) before and after testing; and the blend containing the MCC:DCP in 20:80 ratio had the highest segregation potential with only a difference of 26.07% (C.V. 28.7%-2.63%) before and after testing. Thus, a formulator can select the right proportions of filler binders to prepare a powder blend with the least segregation potential. No statistical analysis was done in this example as this was the preliminary experiment done to check if the apparatus is able to distinguish between different formulations.

Example 2

Segregation Behavior of Powder Blends Prepared by SIFT-N-BLEND® Dry Blending Technique with 0.5 mg of Micronized Acetaminophen Per Dose and Filler Binders Having Different Bulk Densities The experiments in Example 2 were designed to determine the effect of dry blending using only the SIFT-N-BLEND® intensifier attachment (FIG. 13A-13C) on segregation of acetaminophen in powder blends prepared with the same combinations of MCC and DCP as in Example 1, except (a) a 4 quart V-shell on a lab blender, equipped with SIFT-N-BLEND®, was used instead of bottle blending, and (b) the dose of acetaminophen is 0.5 mg instead of 4 mg. Micronized acetaminophen powder was used in this Example. Formulations of Example 2 are presented in Tables 9-14 and the process for preparing these powder blends is presented in Table 15. The prepared blends were then tested for segregation of acetaminophen, as described in Example 1. No replicate testing was done in this Example as it is still a proof-of-concept experiment. The segregation test results for this Example are presented in FIG. 15.

It is to be noted that the batch sizes for the formulations of Example 2 are different to maintain the same volume of powder in the blender, because volume of powder in the blender is one of the critical factors to achieve good content uniformity when an intensifier is used. This aspect is not important in bottle blending of Example 1 because there was plenty of space in the bottle for the powder to tumble and no intensifier attachment is used.

TABLE 9

Formulation A: With MCC:DCP::100:0

| Sample # | INGREDIENT | AMOUNT PER UNIT DOSE, mg | AMOUNT PER BATCH, g |
|---|---|---|---|
| 1 | Acetaminophen, Micronized Powder | 0.500 | 5.00 |
| 2 | Microcrystalline Cellulose 102, NF | 119.50 | 1,195 |
| 3 | Silicon Dioxide, NF | 1.25 | 12.5 |
| 4 | Croscarmellose Sodium, NF | 2.50 | 25.0 |
| 5 | Magnesium Stearate, NF | 1.25 | 12.5 |
| | TOTAL | 125.0 | 1,250 |

TABLE 10

Formulation C with MCC:DCP::80:20

| Sample # | INGREDIENT | AMOUNT PER UNIT DOSE, mg | AMOUNT PER BATCH, g |
|---|---|---|---|
| 1 | Acetaminophen, Micronized Powder | 0.5 | 5.875 |
| 2 | Microcrystalline Cellulose 102, NF | 95.6 | 1,123.3 |
| 3 | Dicalcium Phosphate, Dihydrate, USP/NF | 23.9 | 280.825 |

TABLE 10-continued

| Formulation C with MCC:DCP::80:20 | | | |
|---|---|---|---|
| Sample # | INGREDIENT | AMOUNT PER UNIT DOSE, mg | AMOUNT PER BATCH, g |
| 4 | Silicon Dioxide, NF | 1.25 | 14.6875 |
| 5 | Croscarmellose Sodium, NF | 2.50 | 29.375 |
| 6 | Magnesium Stearate, NF | 1.25 | 14.6875 |
| | TOTAL | 125.0 | 1468.75 |

TABLE 11

| Formulation E with MCC:DCP::60:40 | | | |
|---|---|---|---|
| Sample # | INGREDIENT | AMOUNT PER UNIT DOSE, mg | AMOUNT PER BATCH, g |
| 1 | Acetaminophen Micronized Powder | 0.5 | 6.875 |
| 2 | Microcrystalline Cellulose 102, NF | 71.70 | 985.875 |
| 3 | Dicalcium Phosphate, Dihydrate, USP/NF | 47.8 | 657.25 |
| 4 | Silicon Dioxide, NF | 1.25 | 17.1875 |
| 5 | Croscarmellose Sodium, NF | 2.50 | 34.375 |
| 6 | Magnesium Stearate, NF | 1.25 | 17.1875 |
| | TOTAL | 125.0 | 1718.75 |

TABLE 12

| Formulation G with MCC:DCP::40:60 | | | |
|---|---|---|---|
| Sample # | INGREDIENT | AMOUNT PER UNIT DOSE, mg | AMOUNT PER BATCH, g |
| 1 | Acetaminophen Micronized Powder | 0.5 | 8.375 |
| 2 | Microcrystalline Cellulose 102, NF | 47.80 | 800.65 |
| 3 | Dicalcium Phosphate, Dihydrate, USP/NF | 71.7 | 1200.975 |
| 4 | Silicon Dioxide, NF | 1.25 | 20.9375 |
| 5 | Croscarmellose Sodium, NF | 2.50 | 41.875 |
| 6 | Magnesium Stearate, NF | 1.25 | 20.9375 |
| | TOTAL | 125.0 | 2,093.75 |

TABLE 13

| Formulation I with MCC:DCP::20:80 | | | |
|---|---|---|---|
| Sample # | INGREDIENT | AMOUNT PER UNIT DOSE, mg | AMOUNT PER BATCH, g |
| 1 | Acetaminophen, Micronized Powder | 0.5 | 10.75 |
| 2 | Microcrystalline Cellulose 102, NF | 23.9 | 513.85 |
| 3 | Dicalcium Phosphate, Dihydrate, USP/NF | 95.6 | 2055.4 |
| 4 | Silicon Dioxide, NF | 1.25 | 26.875 |
| 5 | Croscarmellose Sodium, NF | 2.50 | 53.75 |
| 6 | Magnesium Stearate, NF | 1.25 | 26.875 |
| | TOTAL | 125.0 | 2687.5 |

TABLE 14

| Formulation J with MCC:DCP::0:100 | | | |
|---|---|---|---|
| Sample # | INGREDIENT | AMOUNT PER UNIT DOSE, mg | AMOUNT PER BATCH, g |
| 1 | Acetaminophen, Micronized Powder | 0.5 | 15.00 |
| 2 | Dicalcium phosphate dihydrate, unmilled | 100 | 3000 |
| 3 | Silicon Dioxide, NF | 1.05 | 31.5 |
| 4 | Croscarmellose Sodium, NF | 2.1 | 62.8 |
| 5 | Magnesium Stearate, NF | 1.05 | 31.5 |
| | TOTAL | 104.7 | 3140.6 |

TABLE 15

| Blending procedure for formulations of Example 2 | |
|---|---|
| STEP | INSTRUCTIONS |
| 1 | Made sure all the utensils to be used were clean. |
| 2 | Calibrated the scale and the analytical balance. |
| 3 | Weighed microcrystalline cellulose 102 and/or dicalcium phosphate dihydrate, silicon dioxide and croscarmellose sodium, and loaded into a 4 qt V-shell on the lab blender, equipped with SIFT-N-BLEND ® |
| 4 | Weighed acetaminophen micronized powder on an analytical balance and transferred to the blender above. |
| 5 | Blended the ingredients in Step 4 for 5 minutes WITHOUT using SIFT-N-BLEND ® |
| 6 | Blended for 10 minutes using SIFT-N-BLEND ® at1500 rpm. |
| 7 | Added magnesium stearate and blended for 5 minutes WITHOUT using SIFT-N-BLEND ®. |

Formulations A-J of Example 2 were subjected to "Segregation Testing" and content uniformity analysis was done as described in "Determination of Acetaminophen Content Uniformity in Tablets Containing 0.5 mg Acetaminophen per Dose" under EXPERIMENTAL METHODOLOGIES section. Sample analysis was done using groups of 3 tablets.

Figure 15:
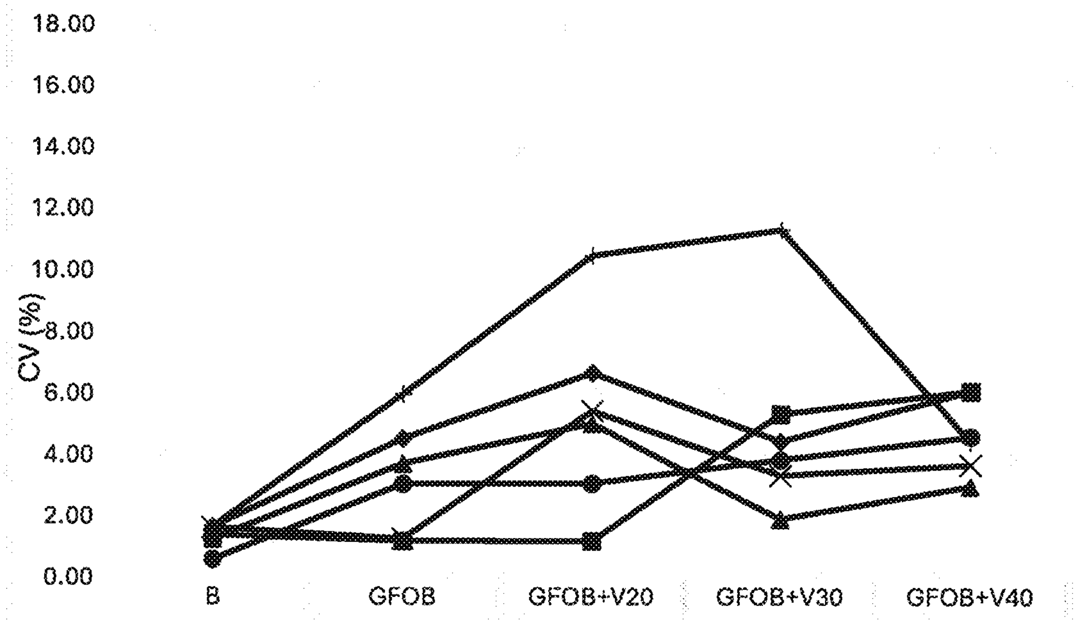

FIG. 15 is a graph showing content uniformity of acetaminophen in powder blends including 0.5 mg acetaminophen per dose after gravity flow of the powder blends over baffles of a powder blend segregation testing apparatus of this invention, optionally with vibration also added to the tube and baffles of the apparatus. Powder blends were prepared by dry blending formulations A, C, E, G, I, and J described in Tables 9-14, using the MaxiBlend® lab V-blender shown in FIG. 12A with a SIFT-N-BLEND® intensifier attachment as shown in FIGS. 13A-13C. The lab blender was run at 25 rpm speed and the intensifier was engaged at 1500 rpm speed. Microcrystalline cellulose (MCC) and dicalcium phosphate dihydrate (DCP) were included in the powder blends in different proportions and subjected to segregation testing in the powder segregation testing apparatus of the present invention, under conditions of gravity flow over baffles alone, as well as stressed conditions of gravity flow over baffles in combination with different levels of vibration. Formulation A included a proportion of MCC:DCP of 100% MCC:0% DCP; Formulation C included a MCC:DCP proportion of 80%: 20% (80:20), Formulation E included a MCC:DCP proportion of 60:40, Formulation G included a MCC:DCP proportion of 40:60, Formulation I included a MCC:DCP proportion of 20:80, and), Formulation E included a MCC:DCP proportion of 0:100.

As can be seen from FIG. 15, at baseline, the % CV values are low and similar for all the formulations, but the powder blends behave quite differently after segregation testing; Formulation G with MCC:DCP at 40:60 ratio especially seemed to be least resistant to segregation. However, in Example 1 (FIG. 14), which used a bottle blending technique, MCC:DCP::80:20 blend showed the least segregation potential, while MCC:DCP::20:80 blend showed the highest segregation potential. As compared to bottle blending (Example 1), SIFT-N-BLEND® showed better content uniformity at baseline (ranging from 0.61-1.69% CV, compared with 1.41-6.81% CV, shown in FIG. 14 after bottle blending. Also, SIFT-N-BLEND® showed better content uniformity after segregation testing by gravity flow over baffles (GFOB), ranging from 1.22-6.00% CV after GFOB testing with a powder blend prepared with SIFT-N-BLEND (FIG. 15) compared with 7.57-28.7% CV after GFOB testing of powder blend prepared with bottle blending (FIG. 14). Thus, powder blends prepared with the SIFT-N-BLEND® blending technique proved to be much better in resisting segregation than the powder blends prepared with the bottle blending technique.

The effects of vibration (V20, V30, V40) added to gravity flow over baffles (GFOB) on segregation potential are shown in columns 3, 4, and 5 in FIG. 15.

Example 3

Segregation Behavior of Micronized Acetaminophen in Powder Blends with 0.5 mg Acetaminophen per Dose Prepared by Dry Blending Technique with Different Types of Intensifier Attachments The experiments in Example 3 were designed to determine the effect of segregation testing on content uniformity of acetaminophen in powder blends prepared by dry blending using different types of intensifier attachments inside the V-blender. A second goal of this example is to perform five replicate segregation tests of each formulation, at each test condition, and determine statistical significance in the content uniformity results.

A lab blender (FIG. 12A) with a 4-quart V-shell, equipped with three types of attachments-SIFT-N-BLEND® (FIGS. 13A-13C), high-speed intensifier bar (FIG. 13D) or a pin intensifier bar (FIG. 13E) inside the V-shell. The purpose of any of these attachments inside the V-shell is to improve homogeneity of the powder blend. The SIFT-N-BLEND® attachment was granted patents to the present inventor (U.S. Pat. Nos. 8,235,582; 8,827,545; CA 2736942C; CA 2821188C and EP2703072B1). The high-speed intensifier bar and the pin intensifier bar are the traditional intensifier bars which have been used in powder blending. The purpose of the experiments in Example 3 is to determine the segregation potential of the powder blends prepared with the above three attachments, using the powder blend segregation tester of the present invention. Dose of acetaminophen used was 0.5 mg to represent low dose formulations, and only microcrystalline cellulose was used as the filler binder. Micronized acetaminophen powder was used in this Example. The formulations and procedures of Example 3 are presented in Tables 16 and 17. It is to be noted that the three formulations and blending times of this example are identical, and only the intensifier attachment used in each case is different. Thus, only one formulation is shown in Table 16 and a common blending procedure is presented in Table 17 to avoid unnecessary repetition.

TABLE 16

Formulation of Example 3

| Sample # | INGREDIENT | AMOUNT PER UNIT DOSE, mg | AMOUNT PER BATCH, g |
|---|---|---|---|
| 1 | Acetaminophen, micronized powder | 0.5 | 5.00 |
| 2 | Microcrystalline Cellulose 102, NF | 119.50 | 1,195 |
| 3 | Silicon Dioxide, NF | 1.25 | 12.5 |
| 4 | Croscarmellose Sodium, NF | 2.50 | 25.0 |
| 5 | Magnesium Stearate, NF | 1.25 | 12.5 |
| | TOTAL | 125.0 | 1,250 |

TABLE 17

Blending Procedure for Formulations of Example 3

| STEP | INSTRUCTIONS |
|---|---|
| 1 | Made sure all the utensils to be used are clean. |
| 2 | Calibrated the scale and the analytical balance. |
| 3 | Weighed microcrystalline cellulose 102, silicon dioxide and croscarmellose sodium and loaded into a 4 qt V-shell on the lab blender, equipped with one of the three intensifier attachments - SIFT-N-BLEND ® with 40 mesh screen (SNB), high-speed intensifier bar (HSI) or the pin intensifier bar (PIN) |
| 4 | Weighed acetaminophen micronized powder on an analytical balance and transferred to the blender above. |
| 5 | Blended the ingredients in Step 4 for 5 minutes WITHOUT using the intensifier attachment. |
| 6 | Blended for 10 minutes using the intensifier attachment at 1500 rpm |
| 7 | Added magnesium stearate and blended for 5 minutes WITHOUT using the intensifier attachment |

Segregation potential testing of the formulations of Example 3 was carried out as described under "Segregation Testing" in EXPERIMENTAL METHODOLOGIES section using the conditions of gravity flow over baffles and gravity flow over baffles in combination with three different levels of vibration.

Five replicate segregation tests were done at each test condition. Groups of 3 tablets were analyzed at baseline and at each test condition for acetaminophen content as described under "Determination of Acetaminophen Content Uniformity in Tablets Containing 0.5 mg Acetaminophen per Dose" in EXPERIMENTAL METHODOLOGIES section.

Figure 16:
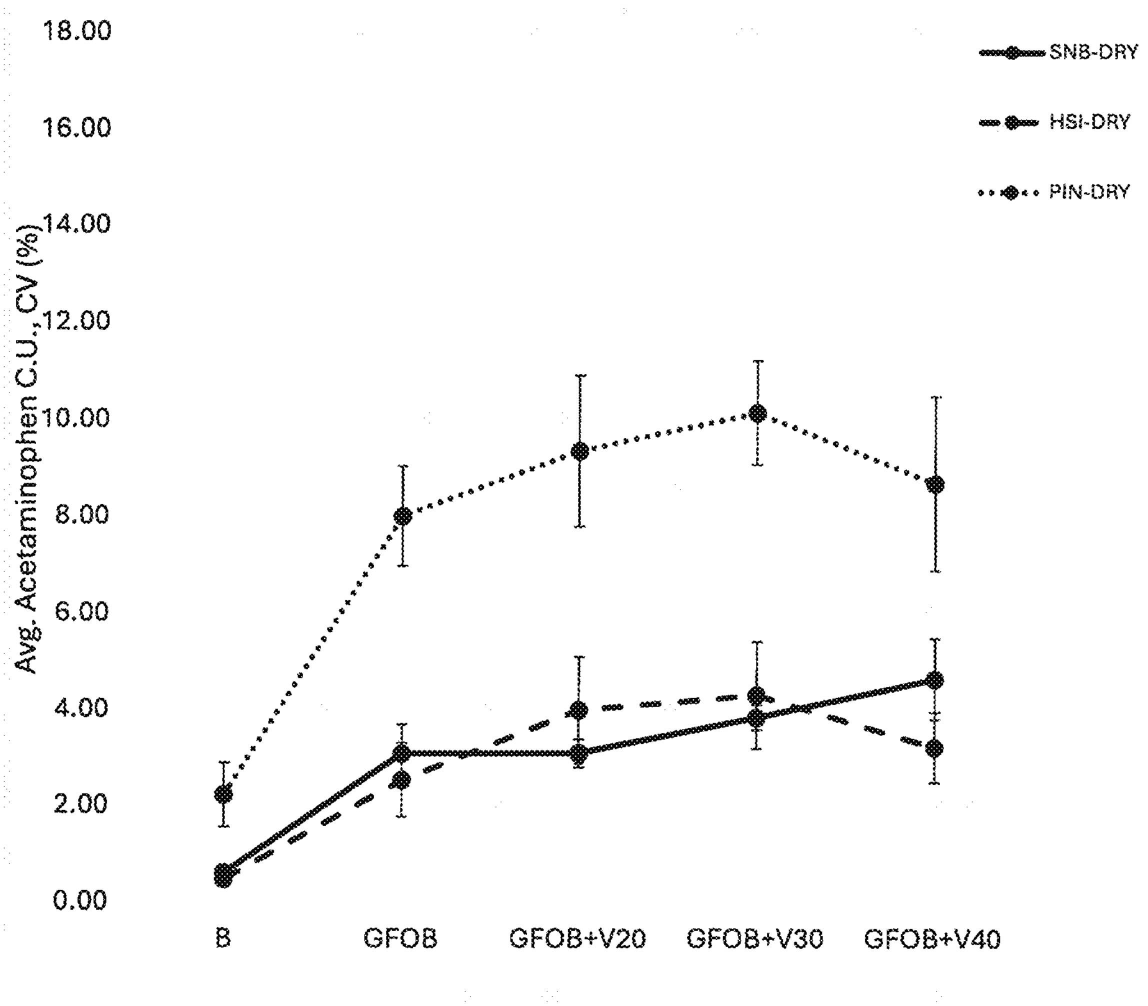

Acetaminophen content uniformity results, expressed as coefficient of variation (CV, %) for the three formulations of Example 3, prepared by different dry blending techniques, and with 5 replicate results of segregation testing at each test condition, along with the results of statistical analysis (ANOVA) are presented in Tables 18A-18C and 19, respectively. FIG. 16 depicts these results.

TABLE 18A

Content Uniformity of Acetaminophen in the Dry Powder Blend Prepared Using SIFT-N-BLEND ® (C.V., %) for Example 3

| REP | B | GFOB | GFOB + V20 | GFOB + V30 | GFOB + V40 |
|---|---|---|---|---|---|
| 1 | 0.65 | 1.5 | 1.95 | 4.42 | 5.96 |
| 2 | 0.55 | 3.2 | 3.25 | 3.05 | 5.37 |
| 3 | 0.55 | 5.2 | 3.35 | 3.65 | 6.49 |
| 4 | 0.52 | 2.92 | 3.22 | 3.63 | 2.1 |

TABLE 18A-continued

Content Uniformity of Acetaminophen in the Dry Powder Blend Prepared Using SIFT-N-BLEND ® (C.V., %) for Example 3

| REP | B | GFOB | GFOB + V20 | GFOB + V30 | GFOB + V40 |
|---|---|---|---|---|---|
| 5 | 0.79 | 2.56 | 3.65 | 4.38 | 3.22 |
| AVERAGE | 0.612 | 3.076 | 3.084 | 3.826 | 4.628 |
| SD | 0.111 | 1.351 | 0.656 | 0.577 | 1.882 |
| SE | 0.050 | 0.606 | 0.294 | 0.259 | 0.844 |

TABLE 18B

Content Uniformity of Acetaminophen in the Dry Blend Prepared Using High-speed Intensifier Bar (C.V., %) for Example 3

| REP | B | GFOB | GFOB + V20 | GFOB + V30 | GFOB + V40 |
|---|---|---|---|---|---|
| 1 | 0.39 | 0.54 | 1.18 | 0.63 | 0.62 |
| 2 | 0.44 | 4.5 | 1.91 | 4.94 | 3.81 |
| 3 | 0.57 | 2.57 | 7.29 | 5.42 | 4.39 |
| 4 | 0.45 | 1.14 | 4.5 | 7.2 | 4.55 |
| 5 | 0.52 | 3.9 | 5.03 | 3.26 | 2.65 |
| AVERAGE | 0.474 | 2.530 | 3.982 | 4.290 | 3.204 |
| SD | 0.071 | 1.707 | 2.473 | 2.481 | 1.626 |
| SE | 0.032 | 0.765 | 1.109 | 1.113 | 0.729 |

TABLE 18C

Content Uniformity of Acetaminophen in the Dry Blend Prepared Using Pin Intensifier Bar (C.V., %) for Example 3

| REP | B | GFOB | GFOB + V20 | GFOB + V30 | GFOB + V40 |
|---|---|---|---|---|---|
| 1 | 0.56 | 10.61 | 14.3 | 13.36 | 14.15 |
| 2 | 2.3 | 4.29 | 10.94 | 8.22 | 7.77 |
| 3 | 4.6 | 8.7 | 7.34 | 7.87 | 3.26 |
| 4 | 1.78 | 8.15 | 8.95 | 11.9 | 7.7 |
| 5 | 1.87 | 8.24 | 5.21 | 9.35 | 10.5 |
| AVERAGE | 2.222 | 7.998 | 9.348 | 10.140 | 8.676 |
| SD | 1.478 | 2.299 | 3.477 | 2.394 | 4.012 |
| SE | 0.663 | 1.031 | 1.559 | 1.074 | 1.799 |

TABLE 19

Analysis of Variance (ANOVA) followed by Tukey's test of acetaminophen content uniformity between powder blends prepared using different dry blending techniques (SNB-DRY, HSI-DRY, and PIN-DRY) at 1500 rpm speed and subjected to segregation potential testing using 30" long tube for Example 3

| | Mean Diff. | 95.00% CI of diff. | Significance level | Adjusted P Value |
|---|---|---|---|---|
| B | | | | |
| SNB-DRY vs. HSI-DRY | 0.1380 | −1.308 to 1.584 | ns | 0.9650 |
| SNB-DRY vs. PIN-DRY | −1.610 | −3.056 to −0.1641 | * | 0.0292 |
| HSI-DRY vs. PIN-DRY | −1.748 | −3.194 to −0.3021 | * | 0.0185 |
| GFOB | | | | |
| SNB-DRY vs. HSI-DRY | 0.5460 | −2.538 to 3.630 | ns | 0.8855 |
| SNB-DRY vs. PIN-DRY | −4.922 | −8.006 to −1.838 | ** | 0.0030 |
| HSI-DRY vs. PIN-DRY | −5.468 | −8.552 to −2.384 | ** | 0.0013 |

TABLE 19-continued

Analysis of Variance (ANOVA) followed by Tukey's test of acetaminophen content uniformity between powder blends prepared using different dry blending techniques (SNB-DRY, HSI-DRY, and PIN-DRY) at 1500 rpm speed and subjected to segregation potential testing using 30" long tube for Example 3

| | Mean Diff. | 95.00% CI of diff. | Significance level | Adjusted P Value |
|---|---|---|---|---|
| GFOB + V20 | | | | |
| SNB-DRY vs. HSI-DRY | −0.8980 | −5.104 to 3.308 | ns | 0.8385 |
| SNB-DRY vs. PIN-DRY | −6.264 | −10.47 to −2.058 | ** | 0.0049 |
| HSI-DRY vs. PIN-DRY | −5.366 | −9.572 to −1.160 | * | 0.0134 |
| GFOB + V30 | | | | |
| SNB-DRY vs. HSI-DRY | −0.4640 | −3.870 to 2.942 | ns | 0.9302 |
| SNB-DRY vs. PIN-DRY | −6.314 | −9.720 to −2.908 | *** | 0.0009 |
| HSI-DRY vs. PIN-DRY | −5.850 | −9.256 to −2.444 | ** | 0.0017 |
| GFOB + V40 | | | | |
| SNB-DRY vs. HSI-DRY | 1.424 | −3.175 to 6.023 | ns | 0.6946 |
| SNB-DRY vs. PIN-DRY | −4.048 | −8.647 to 0.5506 | ns | 0.0869 |
| HSI-DRY vs. PIN-DRY | −5.472 | −10.07 to −0.8734 | * | 0.0203 |

Table 19 shows the results of analysis of variance (ANOVA) followed by Tukey's test of acetaminophen content uniformity between powder blends prepared using different dry blending techniques (SNB-DRY, HSI-DRY, and PIN-DRY) at 1500 rpm speed and subjected to segregation potential testing using a 30" long tube with 13 baffles.

Interpretation of the statistical analysis of the content uniformity results of Example 3:

At baseline level (B), a significant difference in the acetaminophen content uniformity was recorded between SNB-DRY and PIN-DRY and also between HSI-DRY and PIN-DRY ($p<0.05$). However, no significant difference was recorded between SNB-DRY and HSI-DRY.

At gravity flow level (GFOB), a significant difference in the acetaminophen content uniformity was recorded between SNB-DRY and PIN-DRY and also between HSI-DRY and PIN-DRY ($p<0.01$). However, no significant difference was recorded between SNB-DRY and HSI-DRY.

At vibration level 20 (GFOB+V20), a significant difference in the acetaminophen content uniformity was recorded between SNB-DRY and PIN-DRY and also between HSI-DRY and PIN-DRY ($p<0.01$ and $p<0.05$, respectively). However, no significant difference was recorded between SNB-DRY and HSI-DRY.

At vibration level 30 (GFOB+V30), a significant difference in the acetaminophen content uniformity was recorded between SNB-DRY and PIN-DRY and also between HSI-DRY and PIN-DRY ($p<0.001$ and $p<0.01$, respectively). However, no significant difference was recorded between SNB-DRY and HSI-DRY.

At vibration level 40 (GFOB+V40), a significant difference in the acetaminophen content uniformity was recorded between HSI-DRY and PIN-DRY ($p<0.05$). However, no significant difference was recorded between SNB-DRY and HSI-DRY or between SNB-DRY and PIN-DRY.

TABLE 19A

Summary of Statistical Analysis Between Different Intensifier Attachments at 1500 rpm Intensifier Speed, Example 3

| | SNB-DRY and HSI-DRY | SNB-DRY and PIN-DRY | HSI-DRY and PIN-DRY |
|---|---|---|---|
| B | ns | * | * |
| GFOB | ns | ** | ** |
| GFOB + V20 | ns | ** | * |
| GFOB + V30 | ns | *** | ** |
| GFOB + V40 | ns | ns | * |

FIG. 16 is a graph showing average content uniformity of acetaminophen in powder blends including 0.5 mg of acetaminophen per dose. Powdered blends were prepared by different dry blending techniques, specifically, with a SIFT-N-BLEND® intensifier attachment (see FIG. 13A-13C) ("SNB-DRY"), with a High-Speed I-Bar intensifier attachment (see FIG. 13D) ("HSI-DRY"), or with a PIN I-Bar intensifier attachment (see FIG. 13E) ("PIN-DRY"). Only microcrystalline cellulose (MCC) was used as a filler binder. The lab blender run at 25 rpm speed and the intensifier was engaged at 1500 rpm speed. Powder blends were subjected to segregation testing in a powder blend segregation testing apparatus of the present invention having a 30" long tube. Powder blends were subjected to five replicates of segregation potential testing. Statistical significance is indicated by different letters, highlighting differences in means at $p<0.05$ (*), $p<0.01$ (), and $p<0.001$ (*).

FIG. 16 shows the dry blends prepared by using SIFT-N-BLEND® and the high-speed intensifier bar at 1500 rpm are similar in their resistance to segregation (Table 19A). The significantly higher segregation potential of powder blends prepared with a pin intensifier bar indicate the powder blends may not hold up well during subsequent manufacturing operations, such as tableting, encapsulation or powder filling into pouches or jars.

An important result to be noted is that the three formulations have acceptable baseline (static) acetaminophen content uniformity and, without dynamic segregation testing, may mislead the formulator to think that all the formulations meet the specification of not more than 6% CV in content uniformity, while, in fact, the formulation made with pin intensifier bar may not retain its content uniformity under dynamic conditions encountered in manufacturing operations.

Another interesting observation is that the more homogeneous the blend, the more reproducible the segregation test results.

Example 4

Segregation Behavior of Micronized Acetaminophen in Powder Blends with 0.5 mg of Acetaminophen per Dose Prepared by Dry Blending Techniques at Intensifier Speed of 1000 rpm and 500 rpm In Example 4, the objective was to determine the effect of segregation testing on content uniformity of acetaminophen in dry blends, with 0.5 mg acetaminophen per dose, prepared by using SIFT-N-BLEND® (FIGS. 13A-13C) and high-speed r intensifier bar (FIG. 13D) attachments at slower speeds of 1000 rpm and 500 rpm, instead of the 1500 rpm speed used in the previous examples. Formulation and process for preparation of blends for Example 3 (TABLES 16 & 17) were used, with the intensifier changed to 1000 rpm or 500 rpm. Blender was run at 25 rpm speed, as in the previous Examples. Five replicate segregation tests were done in each case using 30" long tube, as described under segregation potential testing in Example 2, and t-test was performed to determine statistical significance. The content uniformity results, and t-test results are presented in Tables 20 and 21 and in FIGS. 17 and 18, respectively. Pin intensifier bar (FIG. 13E) was not included in this example since it did not perform well at 1500 rpm speed and is likely to perform worse at slower speeds.

TABLE 20

Summary of Statistical Analysis Between SIFT-N-BLEND ® and High-speed Intensifier Bar at 1000 rpm Intensifier Speed, Example 4

| Testing Status | P-value | Significance level |
|---|---|---|
| B | 0.185462 | Ns |
| GFOB | 0.708766 | Ns |
| GFOB + V20 | 0.951408 | Ns |
| GFOB + V30 | 0.604909 | Ns |
| GFOB + V40 | 0.905481 | Ns |

combined with Vibration Level 30; GFOB+V40-Gravity Flow Over Baffles combined with Vibration Level 40.

TABLE 21

Summary of Statistical Analysis Between SIFT-N-BLEND ® and High-speed Intensifier Bar at 500 rpm Intensifier Speed, Example 4

| Testing Status | P-value | Significance level |
|---|---|---|
| B | 0.014604 | * |
| GFOB | 0.040826 | * |
| GFOB + V20 | 0.141834 | Ns |
| GFOB + V30 | 0.555687 | Ns |
| GFOB + V40 | 0.167817 | Ns |

Figure 17:
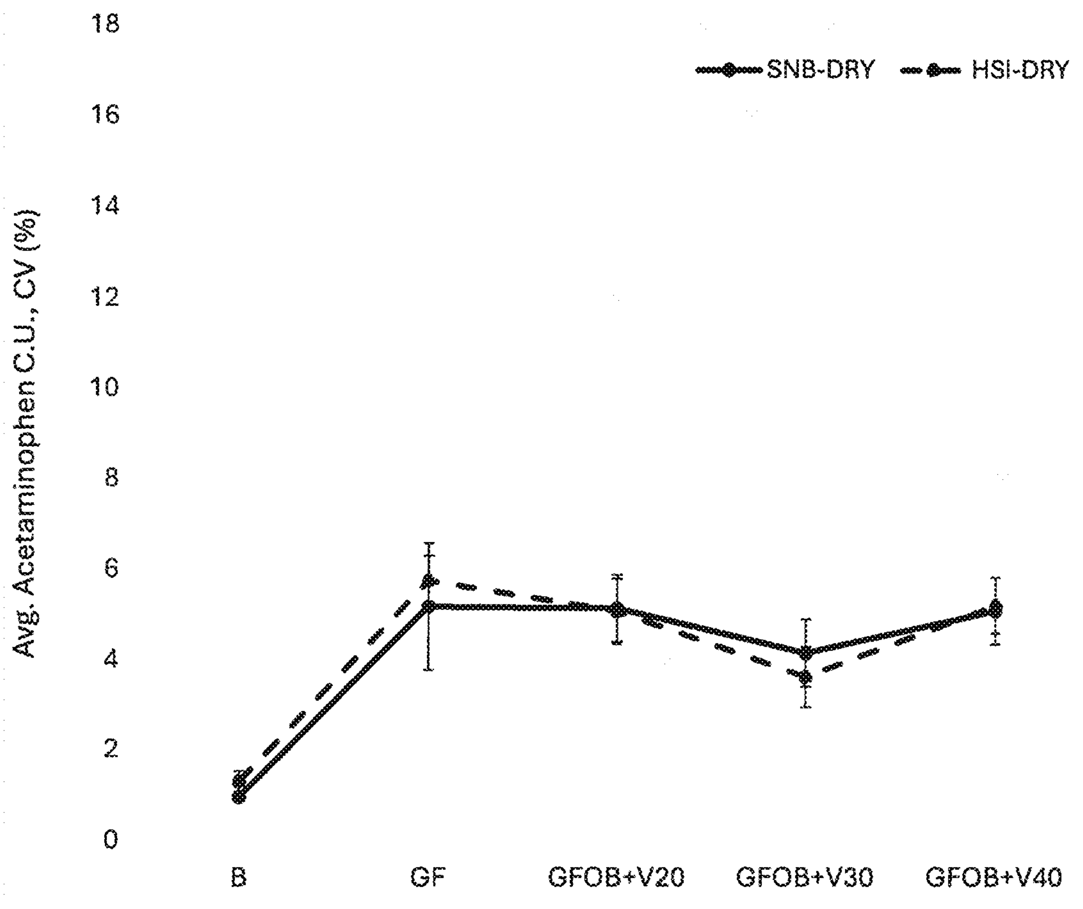

FIG. 17 is a graph showing average content uniformity of acetaminophen in powder blends having 0.5 mg of acetaminophen per dose. Powder blends were prepared by different dry blending techniques, specifically, with a SIFT-N-BLEND® intensifier attachment (see FIG. 13A-13C) ("SNB-DRY"), or with a High-Speed I-Bar intensifier attachment (see FIG. 13D) ("HSI-DRY"). Only microcrystalline cellulose was used as a filler binder. The lab blender was run at 25 rpm speed and the intensifier was engaged at 1000 rpm speed. Powder blends were subjected to five replicates of segregation potential testing. Powder blends were subjected to segregation testing in a powder blend segregation testing apparatus of the present invention having a 30" long tube.

Figure 18:
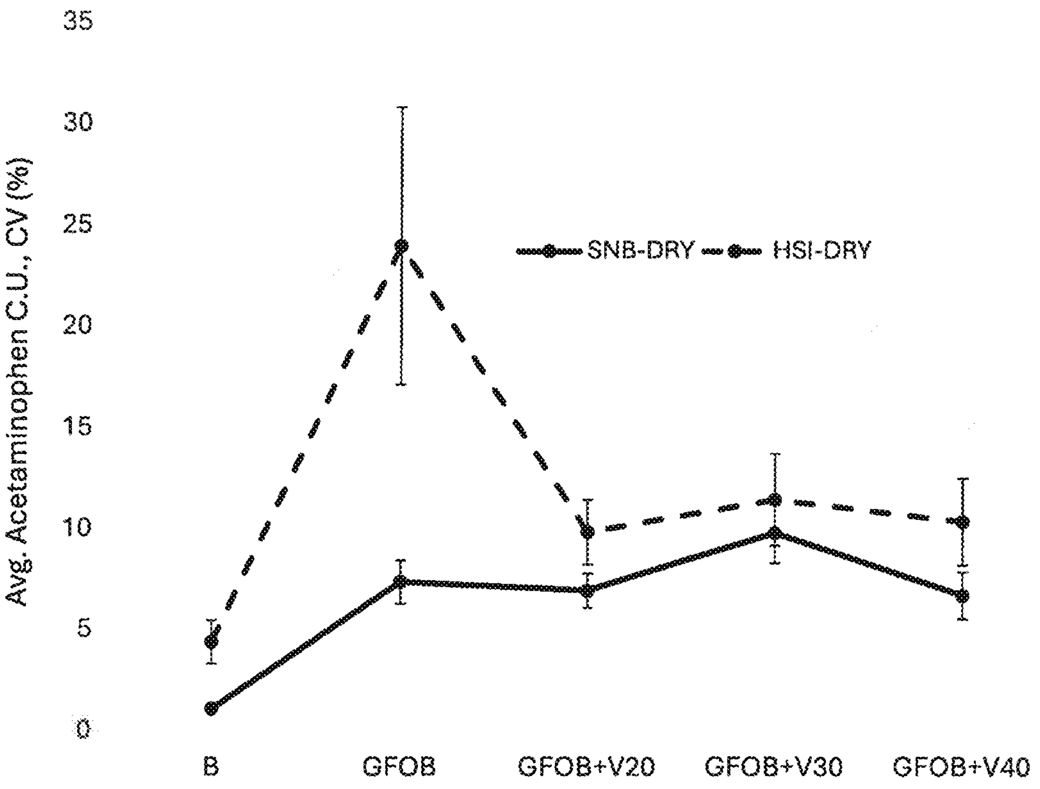

FIG. 18 is a graph showing average content uniformity of acetaminophen in powder blends including 0.5 mg of acetaminophen per dose. Powdered blends were prepared by different dry blending techniques, specifically, with a SIFT-N-BLEND® intensifier attachment (see FIG. 13A-13C)) ("SNB-DRY"), or with a High-Speed I-Bar intensifier attachment (see FIG. 13D) ("HSI-DRY"). Only microcrystalline cellulose was used as a filler binder. The lab blender was engaged at 500 rpm speed. Powder blends were subjected to segregation testing in a powder blend segregation testing apparatus of the present invention having a 30" long tube. Powder blends were subjected to five replicates of segregation potential testing. Statistical significance is indicated by different letters, highlighting differences in means at $p<0.05$ (*).

As seen from FIG. 17, both SIFT-N-BLEND® and the high-speed intensifier bar, at 1000 rpm speed, performed similarly with no statistically significant difference at any test condition (Table 20). However, the coefficient of variation is higher at all test conditions compared to the coefficient of variation results at 1500 rpm (FIG. 16, Table 19A), indicating that content uniformity of the blend is getting worse as the intensifier speed is reduced from 1500 rpm to 1000 rpm.

FIG. 18 shows that both SIFT-N-BLEND® and the high-speed intensifier bar, at 500 rpm speed, performed poorly, with content uniformity getting further worse, compared to 1000 rpm speed. It is to be noted that, at 500 rpm speed, SIFT-N-BLEND® performed significantly better ($p<0.05$, Table 21) than the high-speed intensifier bar at the baseline and gravity flow over baffles. It can be inferred from these results that a minimum speed of 1000 rpm is needed to achieve acceptable content uniformity of acetaminophen.

Example 5

Segregation Behavior of Micronized Acetaminophen in Powder Blends with 0.5 mg Acetaminophen per Dose Prepared by Dry Blending Techniques and Segregation Testing done with Reduced Tube Length and Decreased Number of Baffles In Example 5, the dry blending formulations with 0.5 mg acetaminophen dose, prepared by using SIFT-N-BLEND® (FIGS. 13A-13C), high-speed intensifier bar (FIG. 13D) and the pin intensifier bar (FIG. 13E), at 1500 rpm speed, and were subjected to segregation potential testing with a tube of smaller length, 10" long, instead of the 30" long tube used in earlier experiments, but of the same diameter of 2.0" as the 30" long tube." Five baffles were used with the 10" long tube. Micronized acetaminophen was used in this Example. The results with the 10" long tube and comparison with the results with the 30" long tube are shown in FIGS. 19-22.

Figure 19:
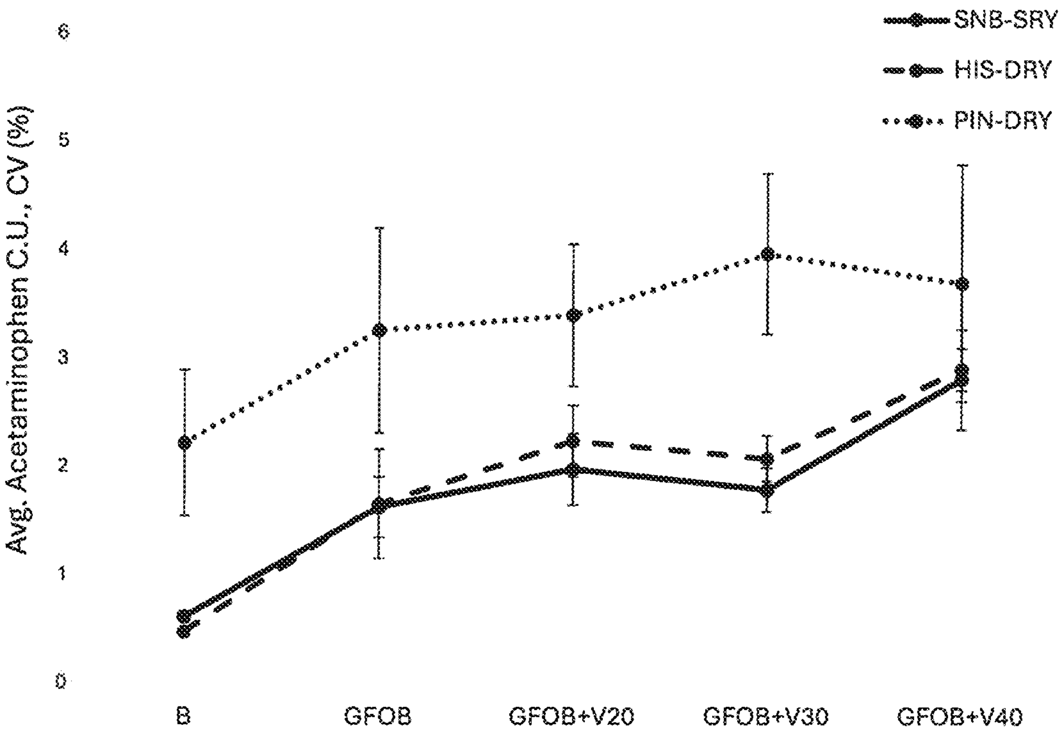

FIG. 19 is a graph showing average content uniformity of acetaminophen in powder blends having 0.5 mg of acetaminophen per dose. Powder blends were prepared by different dry blending techniques, specifically, with a SIFT-N-BLEND® intensifier attachment (FIG. 13A-13C) ("SNB-DRY"), a High-Speed I-Bar intensifier attachment (FIG. 13D) ("HSI-DRY") or Pin Bar (FIG. 13E). Only microcrystalline cellulose was used as a filler binder. Micronized acetaminophen was used. The lab blender was run at 25 rpm speed and the intensifier was engaged at 1500 rpm speed. Powder blends were subjected to segregation testing in a powder blend segregation testing apparatus of the present invention having a 10" long tube. Five replicates of testing were done and statistical analysis performed.

TABLE 21

Summary of Statistical Analysis Between Different Intensifier Attachments at 1500 rpm Intensifier Speed and 10" Long Tube for Segregation Testing Example 5

| | SNB-DRY and HSI-DRY | SNB-DRY and PIN-DRY | HSI-DRY and PIN-DRY |
|---|---|---|---|
| B | ns | * | * |
| GFOB | ns | Ns | ns |
| GFOB + V20 | ns | Ns | ns |
| GFOB + V30 | ns | * | * |
| GFOB + V40 | ns | Ns | ns |

Figure 20:
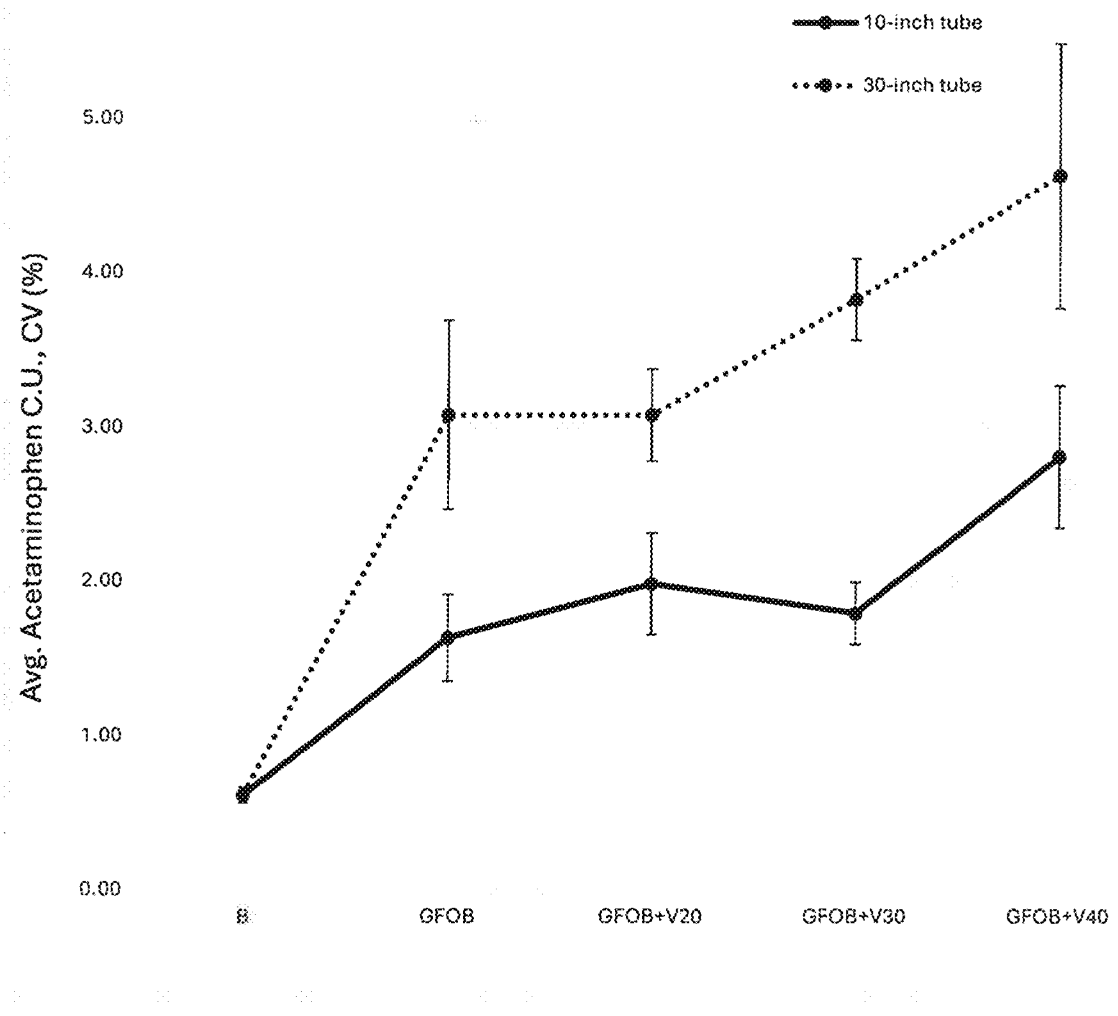
FIG. 20 is a graph showing comparison of average content uniformity of 0.5 mg acetaminophen powder blends, prepared by SIFT-N-BLEND® (FIG. 13A-13C) dry blending technique (SNB-DRY), using only microcrystalline cellulose as a filler binder and running the lab blender at 25 rpm and the intensifier at 1500 rpm speed, and segregation testing done with 10" and 30" tubes.

FIG. 20 is a graph comparing average content uniformity of acetaminophen in powder blends having 0.5 mg of acetaminophen per dose, prepared by SIFT-N-BLEND® dry blending technique (SNB-DRY) and segregation testing conducted using 10" long tube (Example 5, FIG. 19) and 30" long tube (Example 3, FIG. 16).

TABLE 21C

Summary of Statistical Analysis Between 10" and 30" Long Tubes for Segregation Testing of Powder Blend Prepared with SIFT-N-BLEND ® at 1500 rpm Intensifier Speed

| | 10" and 30" tube |
|---|---|
| B | Ns |
| GFOB | Ns |
| GFOB + V20 | * |
| GFOB + V30 | *** |
| GFOB + V40 | Ns |

Figure 21:
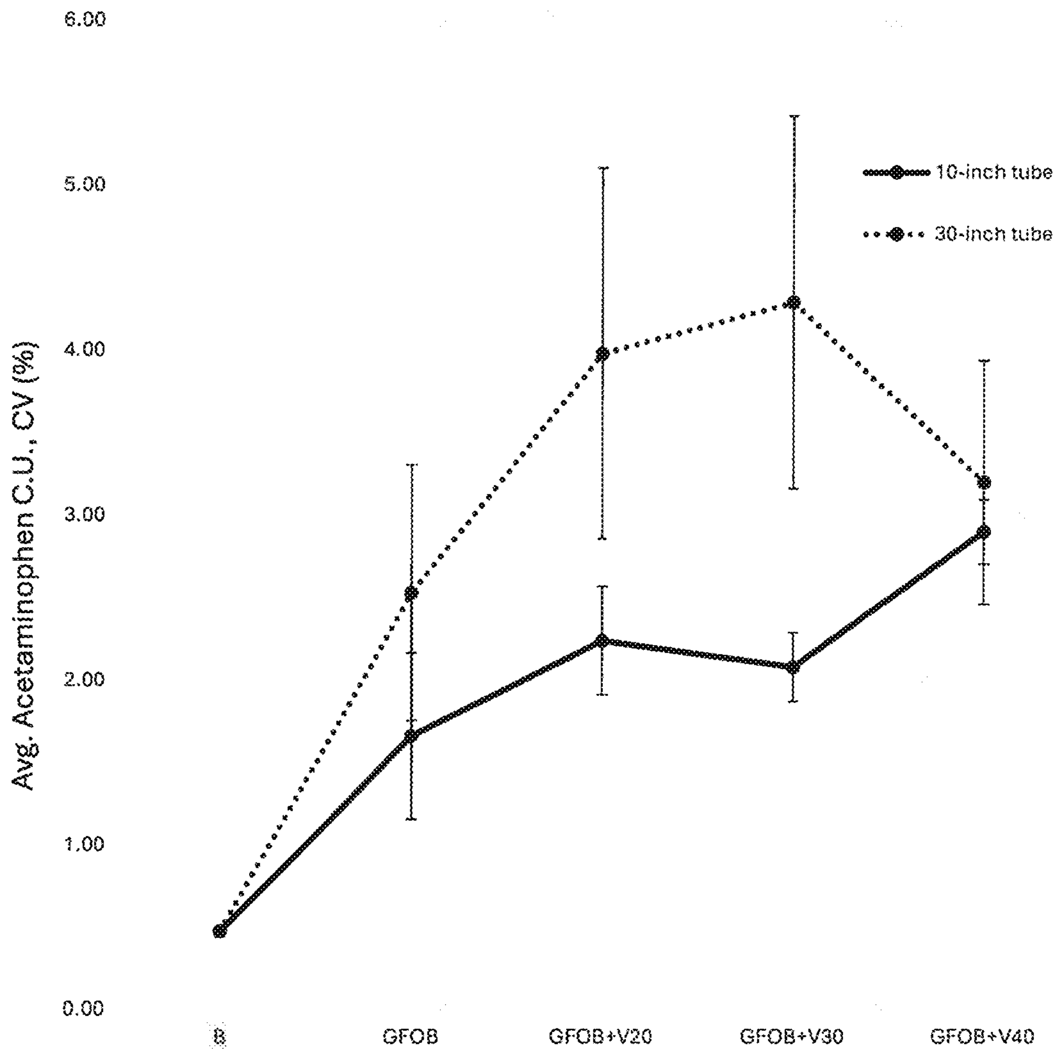
FIG. 21 is a graph showing comparison of average content uniformity of 0.5 mg acetaminophen powder blends, prepared by high-speed intensifier bar (FIG. 13D) dry blending technique (HSI-DRY), using only microcrystalline cellulose as a filler binder and running the lab blender at 25 rpm and the intensifier at 1500 rpm speed, and segregation testing done with 10" and 30" tubes.

FIG. 21 is a graph comparing average content uniformity of acetaminophen in powder blends having 0.5 mg of acetaminophen per dose, prepared by high-speed intensifier bar dry blending technique (HSI-DRY) and segregation testing conducted using 10" long tube (Example 5, FIG. 19) and 30" long tube (Example 3, FIG. 16).

TABLE 21D

Summary of Statistical Analysis Between 10" and 30" Long Tubes for Segregation Testing of Powder Blend Prepared with High-speed Intensifier Bar at 1500 rpm Intensifier Speed

| | 10" and 30" tube |
|---|---|
| B | ns |
| GFOB | ns |
| GFOB + V20 | ns |
| GFOB + V30 | ns |
| GFOB + V40 | ns |

Figure 22:
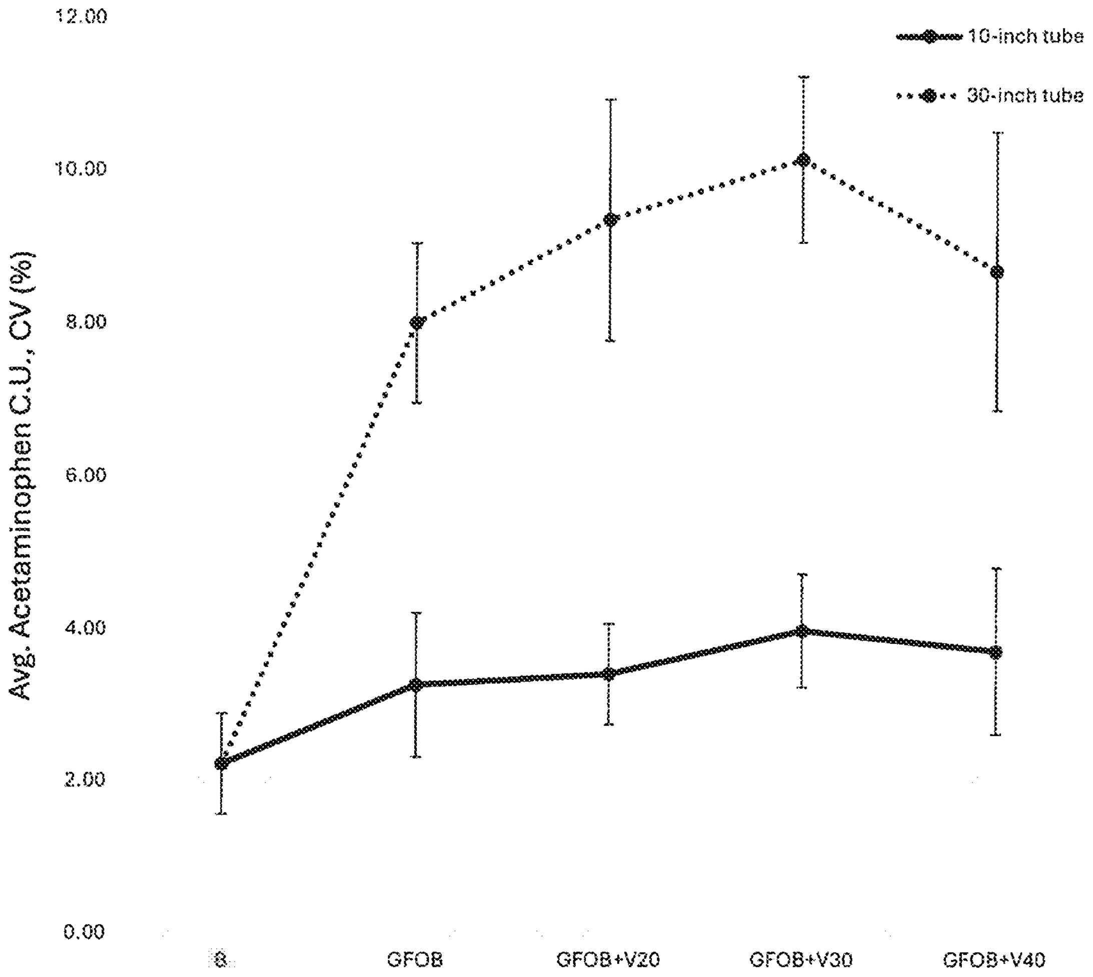
FIG. 22 is a graph showing comparison of average content uniformity of 0.5 mg acetaminophen powder blends, prepared by Pin bar (FIG. 13E) dry blending technique (PIN-DRY), using only microcrystalline cellulose as a filler binder and running the lab blender at 25 rpm and the intensifier at 1500 rpm speed, and segregation testing done with 10" and 30" tubes.

FIG. 22 is a graph comparing average content uniformity of acetaminophen in powder blends having 0.5 mg of acetaminophen per dose, prepared by Pin Bar dry blending technique (PIN-DRY) and segregation testing conducted using 10" long tube (Example 5, FIG. 19) and 30" long tube (Example 3, FIG. 16).

TABLE 21E

Summary of Statistical Analysis Between 10" and 30" Long Tubes for Segregation Testing of Powder Blend Prepared with PIN Intensifier Bar at 1500 rpm Intensifier Speed

| | 10" and 30" tube |
|---|---|
| B | ns |
| GFOB | ** |
| GFOB + V20 | ** |
| GFOB + V30 | *** |
| GFOB + V40 | ** |

It is clear from FIGS. 19-22 that the 10" tube length, with 5 baffles, is not enough to provide enough travel path for the powder to truly distinguish between the three formulations in their resistance to segregation, indicating that a tube length more than 10" is needed to be able to distinguish between different formulations. However, this observation is based on only one active ingredient (acetaminophen) formulation, and formulations with different active ingredients may work differently with different tube lengths. In addition, shorter length tubes may also work well if more baffles are used, say for example, a baffle every inch of the tube length, instead of every two inches.

Example 6

Segregation Behavior of Micronized Acetaminophen in Powdered Blends with a Very Low Dose (0.1 mg) of Acetaminophen per Dose and Prepared by Dry Blending Techniques Example 6 formulation was designed to determine the segregation potential of a blend prepared with a lower dose of 0.1 mg of acetaminophen, by dry blending using SIFT-N-BLEND® (FIGS. 13A-13C) and high-speed intensifier bar (FIG. 13D) at 1500 rpm speed and subjected to segregation testing using 30" long tube, as per the procedure under segregation potential testing in Example 2. The formulation is given in Table 22. The procedure for preparing the blend is the same as presented earlier in Table 17. Analytical procedure of 0.5 mg acetaminophen tablets, presented earlier, was used with adjusted dilutions. Results are presented in FIG. 23.

TABLE 22

Formulation with 0.1 mg Acetaminophen Dose

| Sample # | INGREDIENT | AMOUNT PER UNIT DOSE, mg | AMOUNT PER BATCH, g |
|---|---|---|---|
| 1 | Acetaminophen, Micronized Powder | 0.1 | 1.000 |
| 2 | Microcrystalline Cellulose 102, NF | 119.9 | 1,199 |
| 3 | Silicon Dioxide, NF | 1.25 | 12.5 |
| 4 | Croscarmellose Sodium, NF | 2.50 | 25.0 |
| 5 | Magnesium Stearate, NF | 1.25 | 12.5 |
| | TOTAL | 125.0 | 1,250 |

FIG. 23 is a graph showing content uniformity of acetaminophen in powder blends, including 0.1 mg acetaminophen per dose. Powder blends were prepared by dry blending in a V-shell on a lab blender using a SIFT-N-BLEND® intensifier attachment (SNB-DRY) or a high-speed intensifier bar (HSI-DRY). Microcrystalline cellulose was used as a filler binder. The lab blender was run at 25 rpm and the intensifier was engaged at 1500 rpm speed. Powder blends were subjected to segregation testing in a powder blend segregation testing apparatus of the present invention having a 30" long tube, as per the procedure described under segregation potential testing of Example 2. No replicate testing was done.

The objective of Experiment 6 is to determine which dry blending technique provides more dynamically stable blend, resisting segregation, when the dosage form contains a very low dose of the active (0.1 mg of acetaminophen) per dose. As can be seen from FIG. 23, the blend prepared with the SIFT-N-BLEND® technique stayed dynamically very stable up to vibration level V30, while the blend prepared with the high-speed intensifier bar technique started to lose dynamic stability at all conditions of testing. Thus, SIFT-N-BLEND® technique provided a more dynamically stable blend than high-speed intensifier bar even with a very low dose formulation of acetaminophen.

Example 7

Segregation Behavior of Acetaminophen in Powdered Blends with 0.5 mg of Micronized Acetaminophen Per Dose and Prepared by Wet Blending Techniques Using SIFT-N-BLEND® and High-Speed Intensifier Bar The objective of Example 7 is to determine the effect of wet blending as opposed to dry blending used in all the previous examples. Formulation was prepared with 0.5 mg of acetaminophen dose by wet granulation in the V-shell on the lab blender (FIG. 12A) using SIFT-N-BLEND® (FIGS. 13A-13C) or high-speed intensifier bar (FIG. 13D) at 1500 rpm. Acetaminophen was dissolved in ethyl alcohol, 190 proof, (Everclear, USA) and introduced into the V-blender while the excipient powders are being mixed in there. After wet granulation, the wet material is dried in an oven and further dry blended. The formulation and the preparation method are presented in Tables 23 and 24, respectively. Five replicates of segregation tests were done in each case using 30" long tube, as per the procedure under "Segregation Testing" and content uniformity was determined as per the procedure for "Determination of Acetaminophen Content Uniformity in Powder Blends with 0.5 mg of Acetaminophen per Dose" in EXPERIMENTAL METHODOLOGIES, and t-test was performed to determine statistical significance.

TABLE 23

Formulation of Example 7

| Sample # | INGREDIENT | AMOUNT PER UNIT DOSE, mg | AMOUNT PER BATCH, g |
|---|---|---|---|
| 1 | Acetaminophen, Micronized Powder | 0.500 | 5.000 |
| 2 | Ethanol, 95 proof | — | 200 |
| 3 | Ethanol, 95 proof | — | 50 |
| 4 | Microcrystalline Cellulose 102, NF | 119.50 | 1,195 |
| 5 | Silicon Dioxide, NF | 1.25 | 12.5 |
| 6 | Croscarmellose Sodium, NF | 2.50 | 25.0 |
| 7 | Magnesium Stearate, NF | 1.25 | 12.5 |
| | TOTAL | 125.0 | 1,250 |

TABLE 24

Blending Procedure for Formulations of Example 7

| STEP | INSTRUCTIONS |
|---|---|
| 1 | Made sure all the utensils to be used are clean. |
| 2 | Calibrated the scale and the analytical balance. |
| 3 | Weighed microcrystalline cellulose 102, silicon dioxide and croscarmellose sodium and loaded into a 4 qt V-shell on the lab blender, equipped with SIFT-N-BLEND ® or high-speed intensifier bar. |
| 4 | Pre-blended the ingredients for 5 minutes WITHOUT using. SIFT-N-BLEND ® or high-speed intensifier bar |
| 5 | Weighed acetaminophen micronized powder on analytical balance and dissolved 200 g of ethanol. |
| 6 | Blended for 15 minutes using SIFT-N-BLEND ® or high-speed intensifier bar at 500 rpm while spraying the Acetaminophen solution from step 5 into blender slowly (peristaltic pump set at 5 rpm) followed by 50 g ethanol to rinse the drive shaft. |
| 7 | Discharged the blend and dried in hot air oven for 2 hours at 60° C. |

TABLE 24-continued

| Blending Procedure for Formulations of Example 7 | |
|---|---|
| STEP | INSTRUCTIONS |
| 8 | Loaded the dried material from step 7 back to the blender and blended for 10 minutes with SIFT-N-BLEND ® or high-speed intensifier bar at 1500 rpm. |
| 9 | Added magnesium stearate and blended for 5 minutes WITHOUT using SIFT-N-BLEND ® or high-speed intensifier bar. |

The content uniformity results, and t-test results are presented in Tables 25A-25B and 26, respectively.

TABLE 25A

Content uniformity data (CV, %) of acetaminophen in the wet blend prepared using SIFT-N-BLEND ® at 1500 rpm Intensifier Speed for Example 7

| REP | B | GFOB | GFOB + V20 | GFOB + V30 | GFOB + V40 |
|---|---|---|---|---|---|
| 1 | 0.44 | 0.34 | 0.72 | 0.56 | 0.6 |
| 2 | 0.5 | 0.56 | 0.45 | 0.55 | 0.51 |
| 3 | 0.31 | 4.07 | 2.17 | 0.82 | 1.3 |
| 4 | 0.44 | 0.32 | 0.72 | 0.56 | 0.6 |
| 5 | 1.03 | 3.06 | 2.24 | 0.62 | 0.88 |
| Average | 0.544 | 1.670 | 1.260 | 0.622 | 0.778 |
| SD | 0.280 | 1.769 | 0.870 | 0.114 | 0.323 |
| SE | 0.126 | 0.793 | 0.390 | 0.051 | 0.145 |

TABLE 25B

Content uniformity data (CV, %) of acetaminophen in the wet blend prepared using High-speed Intensifier Bar at 1500 rpm Intensifier Speed (C.V., %) for Example 7

| REP | B | GFOB | GFOB + V20 | GFOB + V30 | GFOB + V40 |
|---|---|---|---|---|---|
| 1 | 1.38 | 1.26 | 1.14 | 1.21 | 1.58 |
| 2 | 0.39 | 0.54 | 1.18 | 0.63 | 0.62 |
| 3 | 1.02 | 3.81 | 2.51 | 2.26 | 1.09 |
| 4 | 1.07 | 1.63 | 0.69 | 0.64 | 0.82 |
| 5 | 0.73 | 0.43 | 0.92 | 0.78 | 0.49 |
| AVERAGE | 0.918 | 1.534 | 1.288 | 1.104 | 0.920 |
| SD | 0.375 | 1.367 | 0.711 | 0.688 | 0.433 |
| SE | 0.168 | 0.613 | 0.319 | 0.308 | 0.194 |

TABLE 26

Summary of Statistical Analysis Between SIFT-N-BLEND ® and High-speed Intensifier Bar at 1500 rpm Intensifier Speed in Wet Blending for Example 7

| Testing Status | P-value | Significance level |
|---|---|---|
| B | 0.1117 | ns |
| GFOB | 0.8951 | ns |
| GFOB + V20 | 0.9569 | ns |
| GFOB + V30 | 0.1607 | ns |
| GFOB + V40 | 0.5729 | ns |

FIG. 24 is a graph showing content uniformity of acetaminophen in powder blends including 0.5 mg of acetaminophen per dose. Powder blends were prepared by wet blending in a V-shell on a lab blender using SIFT-N-BLEND® (“SNB-LIQ”) or high-speed intensifier bar (“HSI-LIQ”). Wet blending: Acetaminophen was added in the form of an alcoholic solution while blending. The lab blender was engaged at 1500 rpm speed. using only microcrystalline cellulose as a filler binder, at 1500 rpm and subjected to segregation testing with 30" long tube.

As can be inferred from FIG. 24, both the wet blends, prepared by SIFT-N-BLEND® and the high-speed intensifier bar, remained dynamically stable after segregation testing at all the test conditions, with the % CV remaining below 6%. Table 26 shows there is no statistically significant difference between the % CV values obtained in this experiment with SIFT-N-BLEND® and the high-speed intensifier bar.

Example 8

Segregation Behavior of Micronized and Non-micronized Acetaminophen in Powdered Blends with 0.5 mg of Acetaminophen per Dose and Prepared by Dry Blending Techniques It is known that blends made with an active ingredient having a finer particle size will yield a blend with better content uniformity than an active ingredient with a coarser particle size.

The objective of the experiment in Example 8 is to demonstrate how effective the powder blend segregation tester of the present invention is in distinguishing between powder blend formulations prepared with acetaminophen powder of two different particle sizes in resisting segregation.

Acetaminophen USP, Special Powder (Granules India Ltd., Madhapur, Hyderabad-500081, India), with sieve analysis results of not more than 5% retained on ASTM #60 sieve (250 microns) and 15%-30% retained on ASTM #230 sieve (63 microns), was used as non-micronized grade. Dry powder blends of this non-micronized acetaminophen powder were prepared, containing 0.5 mg of acetaminophen per dose, using the SIFT-N-BLEND® and the high-speed intensifier attachments at 1500 rpm intensifier speed as per the formulation in Table 16 and the procedure in Table 17. Five replicates of the segregation test were done using the 30" long tube and statistical analyses were done. Results are presented in Tables 27A, 27B, 28A and 28B Segregation test results and statistical analytical results for the powder blends prepared with micronized acetaminophen powder, containing 0.5 mg acetaminophen per dose, using SIFT-N-BLEND® and high-speed intensifier bar at 1500 rpm speed from Example 3 were used for comparison with the results of the non-micronized acetaminophen blends of Example 8. FIGS. 25 and 26 show the graphs comparing the segregation potential of blends prepared with acetaminophen of two different particle sizes.

TABLE 27A

Content uniformity data (CV, %) of non-micronized acetaminophen in a dry blend prepared using SIFT-N-BLEND ® at 1500 rpm Intensifier Speed (C.V., %) for Example 8

| REP | B | GFOB | GF + V20 | GF + V30 | GF + V40 |
|---|---|---|---|---|---|
| 1 | 1.83 | 6.09 | 7.48 | 8.72 | 10.18 |
| 2 | 3.54 | 5.66 | 12.49 | 12.36 | 15.21 |
| 3 | 3.24 | 14.87 | 14.56 | 12.04 | 9.6 |
| 4 | 3.19 | 12.62 | 17.23 | 11.35 | 13.27 |
| 5 | 4.36 | 16.72 | 11.88 | 15.66 | 11.97 |
| AVERAGE | 3.23 | 11.19 | 12.73 | 12.03 | 12.05 |
| SD | 0.91 | 5.07 | 3.60 | 2.49 | 2.29 |
| SE | 0.42 | 2.30 | 1.64 | 1.13 | 1.04 |

TABLE 27B

Summary of Statistical Analysis of non-micronized acetaminophen in a dry blend prepared using SIFT-N-BLEND ® at 1500 rpm Intensifier Speed for Example 8

| Level | F-value | p-value | Significant |
|---|---|---|---|
| B | 40.5702 | 0.0002 | *** |
| GFOB | 11.9697 | 0.0086 | ** |
| GF + V20 | 34.6622 | 0.0004 | *** |
| GF + V30 | 51.6523 | 0.0001 | *** |
| GF + V40 | 31.3143 | 0.0005 | *** |

FIG. 25 is a graph showing average content uniformity of acetaminophen in powder blends prepared with acetaminophen powders having different particle sizes. Powder blend containing 0.5 mg of acetaminophen per dose was prepared by dry blending technique with a SIFT-N-BLEND® intensifier attachment (see FIG. 13A-13C) ("SNB-DRY") Only microcrystalline cellulose (MCC) was used as a filler binder. The lab blender was run at 25 rpm speed and the intensifier was engaged at 1500 rpm speed. Powder blends were subjected to segregation testing in a powder blend segregation testing apparatus of the present invention having a 30" long tube. Five replicate tests were done in each case and statistical analysis was done. Results are shown in TABLES 27-A and 27-B. Statistical significance is indicated by different letters, highlighting differences in means at p<0.05 (*), p<0.01 (**), and p<0.001 (*).

TABLE 28A

Content Uniformity Data (CV, %) of Non-micronized Acetaminophen in a Dry Blend Prepared Using High-speed Intensifier Bar at 1500 rpm Intensifier Speed (C.V., %) for Example 8

| REP | B | GFOB | GF + V20 | GF + V30 | GF + V40 |
|---|---|---|---|---|---|
| 1 | 6.59 | 14.75 | 12.61 | 12.56 | 13.39 |
| 2 | 6.56 | 14.23 | 13.48 | 15.11 | 14.54 |
| 3 | 1.78 | 14.27 | 11.42 | 17 | 7.6 |
| 4 | 2.22 | 12.08 | 10.47 | 11.67 | 11.89 |
| 5 | 4.57 | 13.39 | 13.11 | 11.61 | 9.81 |
| AVERAGE | 4.34 | 13.74 | 12.22 | 13.59 | 11.45 |
| SD | 2.30 | 1.05 | 1.25 | 2.38 | 2.78 |
| SE | 1.04 | 0.48 | 0.57 | 1.08 | 1.27 |

TABLE 28B

Summary of Statistical Analysis of non-micronized acetaminophen in a dry blend prepared using High-speed Intensifier Bar at 1500 rpm Intensifier Speed for Example 8

| Level | F-value | p-value | Significant |
|---|---|---|---|
| B | 14.1882 | 0.0055 | ** |
| GFOB | 156.5005 | 0.0000 | *** |
| GF + V20 | 44.2071 | 0.0002 | *** |
| GF + V30 | 36.6249 | 0.0003 | *** |
| GF + V40 | 32.6693 | 0.0004 | *** |

FIG. 26 is a graph showing average content uniformity of acetaminophen in powder blends prepared with acetaminophen powders having different particle sizes. Powder blend containing 0.5 mg of acetaminophen per dose was prepared by dry blending technique with a high-speed intensifier bar attachment (see FIG. 13D) ("HSI-DRY"). Only microcrystalline cellulose (MCC) was used as a filler binder. The lab blender was run at 25 rpm speed and the intensifier was engaged at 1500 rpm speed. Powder blends were subjected to segregation testing in a powder blend segregation testing apparatus of the present invention having a 30" long tube. Five replicate tests were done in each case and statistical analysis was done. Results are shown in TABLES 28-A and 28-B. Statistical significance is indicated by different letters, highlighting differences in means at p<0.05 (*), p<0.01 (), and p<0.001 (*).

As can be seen from FIGS. 25 and 26 and TABLES 27-28, blends prepared with micronized acetaminophen powder resisted segregation at the levels of segregation testing conditions with both SIFT-N-BLEND® and the high-speed intensifier bar and maintained content uniformity within the specification of not more than 5% CV, whereas the blends prepared with non-micronized acetaminophen powder failed USP specification for blend content uniformity at all segregation testing conditions. It is also important to note that at baseline, the content uniformity of the blend prepared with the non-micronized acetaminophen powder also passed the USP specification, which may mislead a formulator to accept such a blend, unless dynamic segregation testing is done using the powder blend segregation tester of the present invention.

FIG. 27 is a graph showing comparison of average content uniformity of powder blends of Example 8, prepared with non-micronized acetaminophen powder using SIFT-N-BLEND® (SNB-DRY) and high-speed intensifier bar (HSI-DRY) dry blending techniques. It can be seen from this graph and TABLE 29 that both the intensifier attachments performed similarly without any statistical difference in their performance.

TABLE 29

Summary of Statistical Analysis Between SIFT-N-BLEND ® and High-speed Intensifier Bar at 1500 rpm Intensifier Speed with a non-micronized acetaminophen Dry Blend for Example 8

| Level | F-value | p-value | Significant |
|---|---|---|---|
| B | 1.0125 | 0.3438 | ns |
| GFOB | 1.2153 | 0.3023 | ns |
| GF + V20 | 0.0894 | 0.7725 | ns |
| GF + V30 | 1.0341 | 0.3390 | ns |
| GF + V40 | 0.1385 | 0.7195 | ns |

The experiments with acetaminophen powder described in Examples 1-8 above illustrate the powder blend segregation testing apparatus and methods of this invention offer an invaluable tool to formulation scientists in the pharmaceutical, food, personal care industries, and any other industry which uses powders, to optimize the formulation at the R&D stage so that powder blend segregation problems can be minimized during commercial production scale batches. Such an approach is called "Quality by Design" by the regulatory authorities-quality is built into the product!

Powder blends prepared with the three intensifier attachments studied had acceptable content uniformity when the blends are static, but the segregation behavior of the powder blends changed when the powder blends were subjected to dynamic and stressed conditions, which are characteristic of production scale manufacturing, by making the powder blend flow over baffles in a tube either by gravity alone or by gravity combined with different levels of vibration. The pin intensifier bar does not seem to provide blends which resisted segregation in a dynamic state, which means true blend content uniformity was not achieved with this intensifier. The high-speed intensifier bar worked better than the pin intensifier bar in providing true blend content uniformity; however, it did not perform as effectively as the SIFT-N-BLEND® attachment, which provided the overall best blend content uniformity, even at the smallest dose tested, and at the lowest intensifier speed tested.

In addition, the blends prepared with SIFT-N-BLEND® resisted segregation the most under dynamic and stressed conditions, which means it provided true blend content uniformity, which was unexpected.

The terms powder blend and powder, in the context of this invention, are used interchangeably. The use of the terms "a," "an," "the," and similar references in the context of describing the present invention (especially in the context of the claims) are to be construed to cover both the singular and the plural, unless otherwise indicated herein or clearly contradicted by context. Recitation of ranges of values herein are intended as a shorthand method of referring individually to each separate value falling within the range (including values expressly named in the range), including unless otherwise indicated. Each separate value is incorporated by reference into the specification as if it were individually recited herein. Use of the term "about" is intended to describe values either above or below the stated value according to standard mathematical "rounding up" or other reasonable rules. In an embodiment, "about" is +1% a stated value. In an embodiment, "about" is +2% a stated value. In an embodiment, "about" is +3% a stated value. In an embodiment, "about" is +4% a stated value. In an embodiment, "about" is +5% a stated value. All method steps described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise stated.

The invention claimed is:

1. A powder blend segregation testing apparatus baffle comprising a smooth striking surface, wherein said baffle is rigid and impermeable to powder, and is sized for insertion into a baffle slot of the wall of the tube of a powder blend segregation testing apparatus, said apparatus comprising a tube comprising a first end, a second end, and a wall defining an interior channel and connecting said first end of the tube to said second end of the tube, said wall comprising said baffle slot for inserting the baffle, wherein when inserted said smooth striking surface faces the first end of the tube and said baffle extends from said tube wall into said interior channel and away from said first end of the tube at a baffle angle of about 130° to about 160°.

2. The baffle of claim 1, wherein said tube comprises a diameter of about 2 inches.

3. The baffle of claim 1, wherein said baffle is about 1/16 inch (0.0625 inch) to about 1/12 inch (0.083 inch) thick.

4. The baffle of claim 1, wherein said baffle is about 0.06 inch thick.

5. The baffle of claim 1, wherein said baffle is made of stainless steel, other metal, or plastic.

6. The baffle of claim 1, wherein said baffle is removable from the baffle slot.

7. The baffle of claim 1, wherein said baffle has a smaller end that fits through the baffle slot and extends into the interior channel, and a larger end to hold the baffle in place.

8. The baffle of claim 1, wherein said smaller end has a diameter of about 1.8 inches and said larger end has a diameter of about 2 inches.

9. The baffle of claim 1, wherein said baffle angle is 130° to 160°.

10. A method of testing a powder blend for segregation of a powder blend component or segregation potential of the powder blend comprising the steps of:

a. providing a powder blend comprising at least two components and providing a powder blend segregation testing apparatus comprising a tube and 2 or more baffles, said tube comprising a first end, a second end, a wall, and an interior channel, wherein said wall of the tube defines said interior channel and connects said first end of the tube to said second end of the tube; and each baffle comprises a striking surface facing the first end of the tube, wherein said baffle extends from said tube wall into said interior channel and away from said first end of the tube at a baffle angle of about 130° to about 160°; and wherein 2 or more baffles are positioned along the length of the interior channel in succession in a cascade formation;

b. introducing the powder blend into the first end of the tube of the powder blend segregation testing apparatus to allow flow of the powder blend through the tube interior channel and across the 2 or more baffles positioned in the tube interior channel in succession in a cascade formation; and c. determining the segregation of a powder blend component from the powder blend or the segregation potential of the powder blend;

wherein during said determining step the powder blend is collected to aid in measuring or calculating the segregation of a powder blend component or the segregation potential of the powder blend.

11. The method of claim 10, wherein during said determining step the content uniformity of a component in the post-testing powder blend is calculated to determine the segregation of a component of the powder blend, and/or, the content uniformity of a component in the pre-testing and post-testing powder blend is calculated to determine the segregation potential of the powder blend.

12. The method of claim 10, wherein the tube along with the baffles is subjected to vibration from a vibration device while the powder sample is passing through the tube for segregation testing.

13. The method of claim 10, wherein the tube is subjected to a vacuum.

14. The method of claim 10, wherein flow of the powder blend is across 2 to 30 baffles.

15. The method of claim 14, wherein flow of the powder blend is across 13 baffles.

16. The method of claim 10, wherein during said determining step the powder blend segregation testing apparatus is positioned vertically.

17. The method of claim 16, wherein the flow across the baffles is gravity flow.

18. The method of claim 10, wherein during said determining step the powder blend is collected and compressed into a tablet.

19. The method of claim 10, wherein said baffle angle is 130° to 160°.

20. A method of improving the dynamic stability of a powdered blend comprising the steps of:

a. providing two or more powder blends, each blend formulated with 2 or more components including at least 1 component in common between the blends, b. introducing a first powder blend into the first end of the tube of a powder blend segregation testing apparatus to allow flow of the powder blend through the tube interior channel and across 2 or more baffles positioned in succession in a cascade formation;

c. repeating step b with a second powder blend, and separately repeating step b for each other powder blend provided, d. calculating the segregation potential of each powder blend and selecting the powder blend formulation with the lowest or otherwise most desirable segregation potential to assure the dynamic stability of the formulation blend during subsequent steps of processing;

wherein said powder blend segregation testing apparatus comprises a tube and 2 or more baffles, said tube comprising a first end, a second end, a wall, and an interior channel, wherein said wall of the tube defines said interior channel and connects said first end of the tube to said second end of the tube; and each baffle comprises a striking surface facing the first end of the tube, wherein said baffle extends from said tube wall into said interior channel and away from said first end of the tube at a baffle angle of about 130° to about 160°; and wherein 2 or more baffles are positioned along the length of the interior channel in succession in a cascade formation.

21. The method of claim 20, wherein the powder blend testing apparatus is positioned vertically.

22. The method of claim 20, wherein at least the baffles of the testing apparatus are subjected to vibration from a vibration device.

23. The method of claim 20, wherein the tube is subjected to a vacuum.

24. The method of claim 20 wherein the powder blend is a pharmaceutical, food, beverage, cosmetic, or chemical blend.

25. The method of claim 20, wherein said method is to improve the uniformity, stability, effectiveness, taste, appearance, safety, efficacy, texture, longevity, solubility, performance, consistency, production scalability, or other characteristic of the powder blend.

26. The method of claim 20, wherein said baffle angle is 130° to 160°.

* * * * *